United States Patent
Chen et al.

(10) Patent No.: US 11,146,503 B1
(45) Date of Patent: Oct. 12, 2021

(54) RESOURCE SCHEDULING METHODS USING POSITIVE AND NEGATIVE CACHING, AND RESOURCE MANAGER IMPLEMENTING THE METHODS

(71) Applicant: HUAWEI TECHNOLOGIES CO., LTD., Guangdong (CN)

(72) Inventors: Chen Chen, Toronto (CA); Hao Hai Ma, Kleinburg (CA); Jason T. S. Lam, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/078,433

(22) Filed: Oct. 23, 2020

(51) Int. Cl.
| | |
|---|---|
| *G06F 15/16* | (2006.01) |
| *H04L 12/911* | (2013.01) |
| *G06F 12/0802* | (2016.01) |
| *H04L 29/08* | (2006.01) |

(52) U.S. Cl.
CPC .......... *H04L 47/82* (2013.01); *G06F 12/0802* (2013.01); *H04L 67/10* (2013.01); *H04L 67/2842* (2013.01); *G06F 2212/60* (2013.01)

(58) Field of Classification Search
CPC ..... H04L 47/82; H04L 67/10; H04L 67/2842; G06F 12/0802
USPC .................. 709/220, 224, 226, 228, 232
See application file for complete search history.

(56) References Cited

U.S. PATENT DOCUMENTS

| | | | |
|---|---|---|---|
| 9,052,942 B1* | 6/2015 | Barber | G06F 3/0604 |
| 9,417,917 B1* | 8/2016 | Barber | G06F 9/5027 |
| 2019/0258631 A1* | 8/2019 | Pal | G06F 16/24545 |
| 2019/0258632 A1* | 8/2019 | Pal | G06F 16/2465 |
| 2019/0258635 A1* | 8/2019 | Pal | G06F 16/2272 |
| 2019/0258636 A1* | 8/2019 | Bhattacharjee | G06F 16/2228 |
| 2019/0258637 A1* | 8/2019 | Bhattacharjee | G06F 16/24549 |
| 2020/0050586 A1* | 2/2020 | Pal | G06F 16/13 |
| 2020/0050607 A1* | 2/2020 | Pal | G06F 9/4881 |
| 2020/0065303 A1* | 2/2020 | Bhattacharjee | G06F 16/278 |
| 2020/0364223 A1* | 11/2020 | Pal | G06F 16/24539 |
| 2021/0117425 A1* | 4/2021 | Rao | H04L 67/18 |

* cited by examiner

*Primary Examiner* — Khanh Q Dinh
(74) *Attorney, Agent, or Firm* — BCF LLP

(57) ABSTRACT

Resource scheduling methods and a resource manager define leaf buckets, each of which have coordinates in corresponding dimensions in a coordinate space. Nodes having resource values in the corresponding dimensions are mapped on the leaf buckets. A task request identifies candidate nodes and requested resources that relate to the coordinate space dimensions. The leaf buckets are scanned to find a fittable node among the list of candidates. A result of the scan is stored in a positive or a negative cache entry. When a next task request of a same task group is received, scanning of the leaf buckets is performed using information from the positive or negative cache entry. For a positive cache entry, the scanning is initiated from a point where the previous scanning has ended. For a negative cache entry, the scanning ignores nodes that were found not to contain the requested resources in the previous scanning.

19 Claims, 23 Drawing Sheets

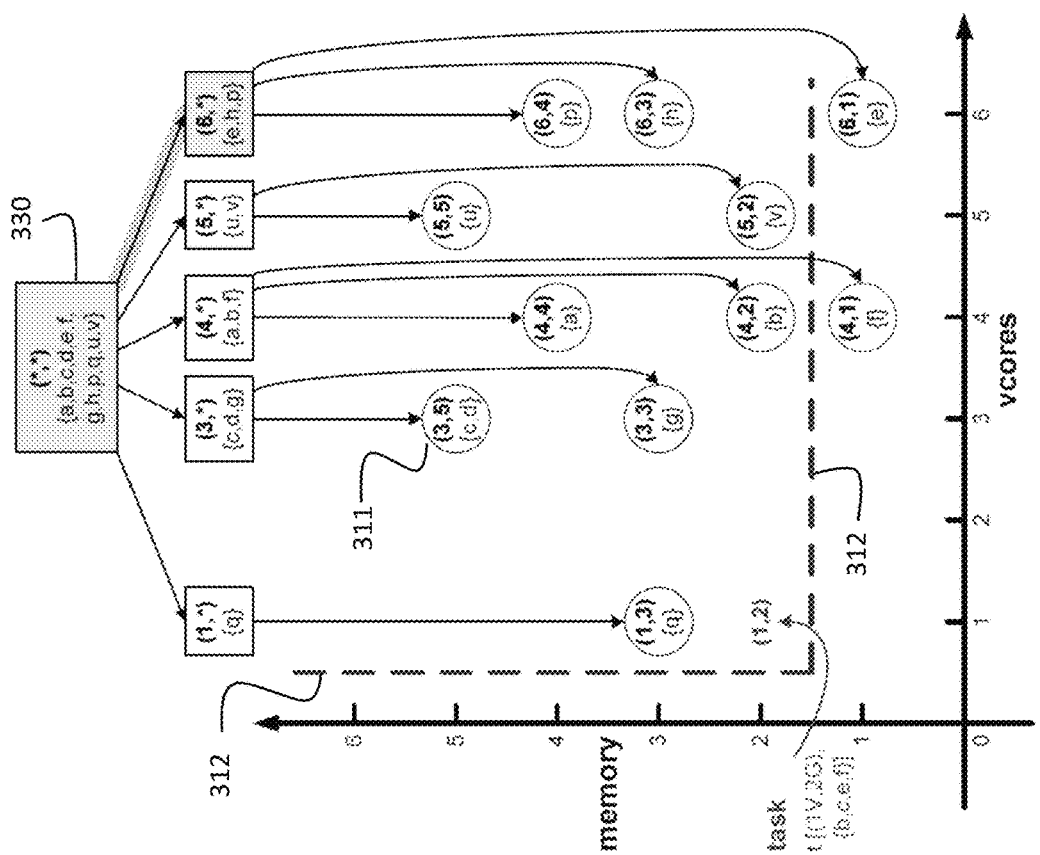
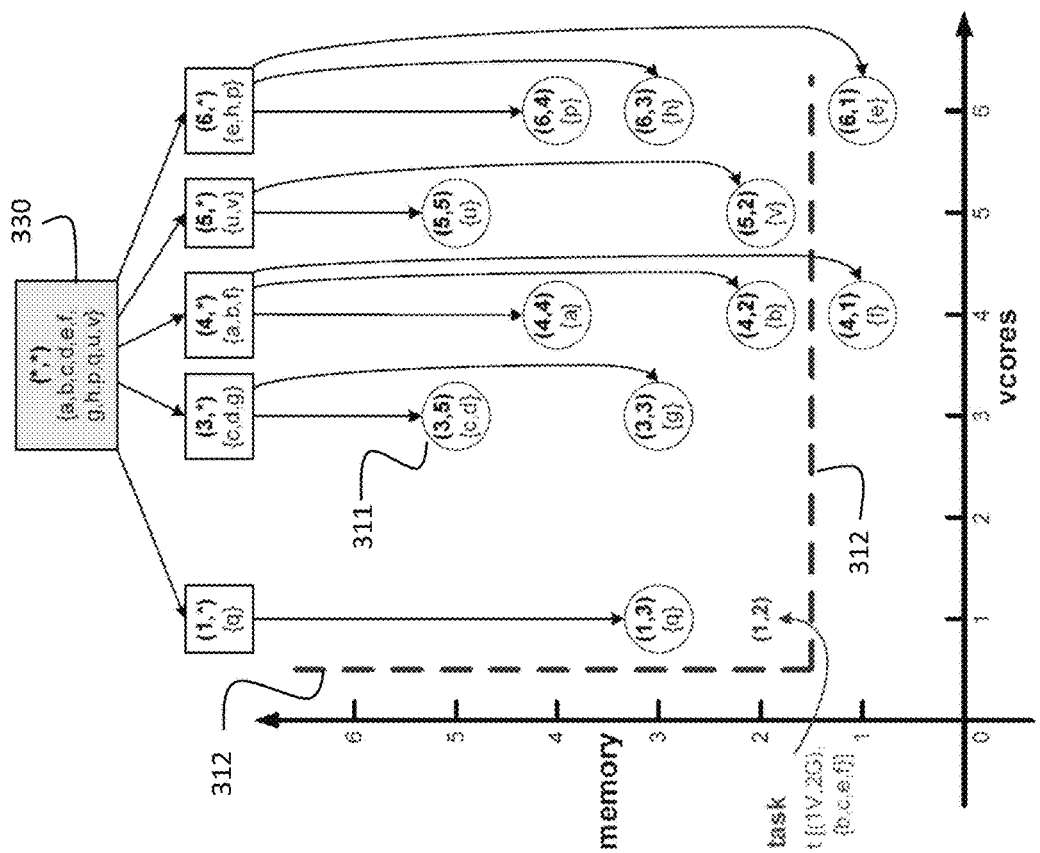
Figure 5b
Figure 5a

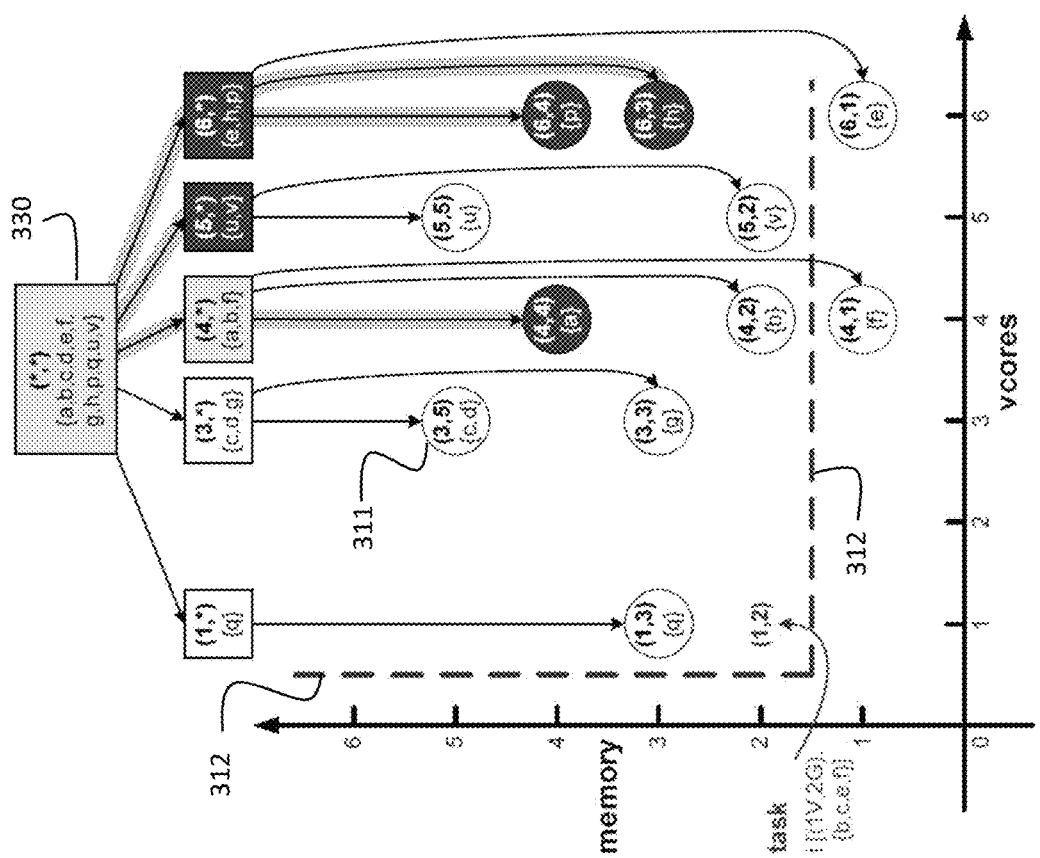
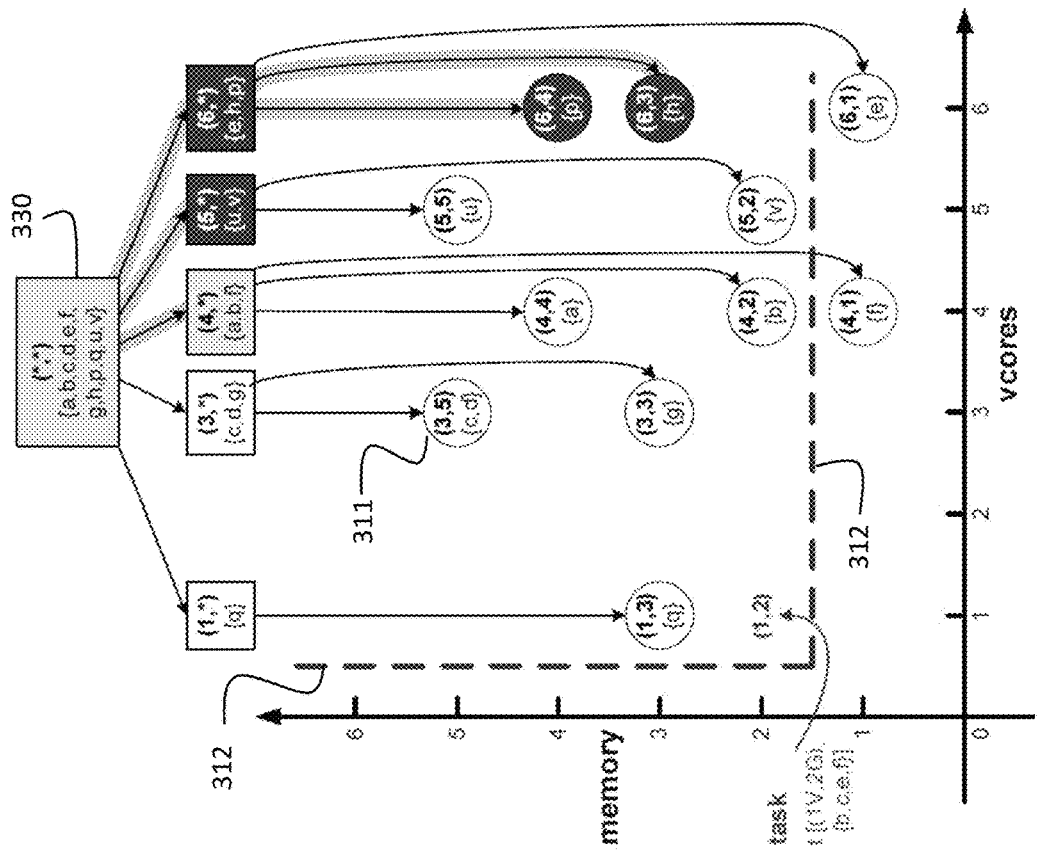
Figure 5h
Figure 5g

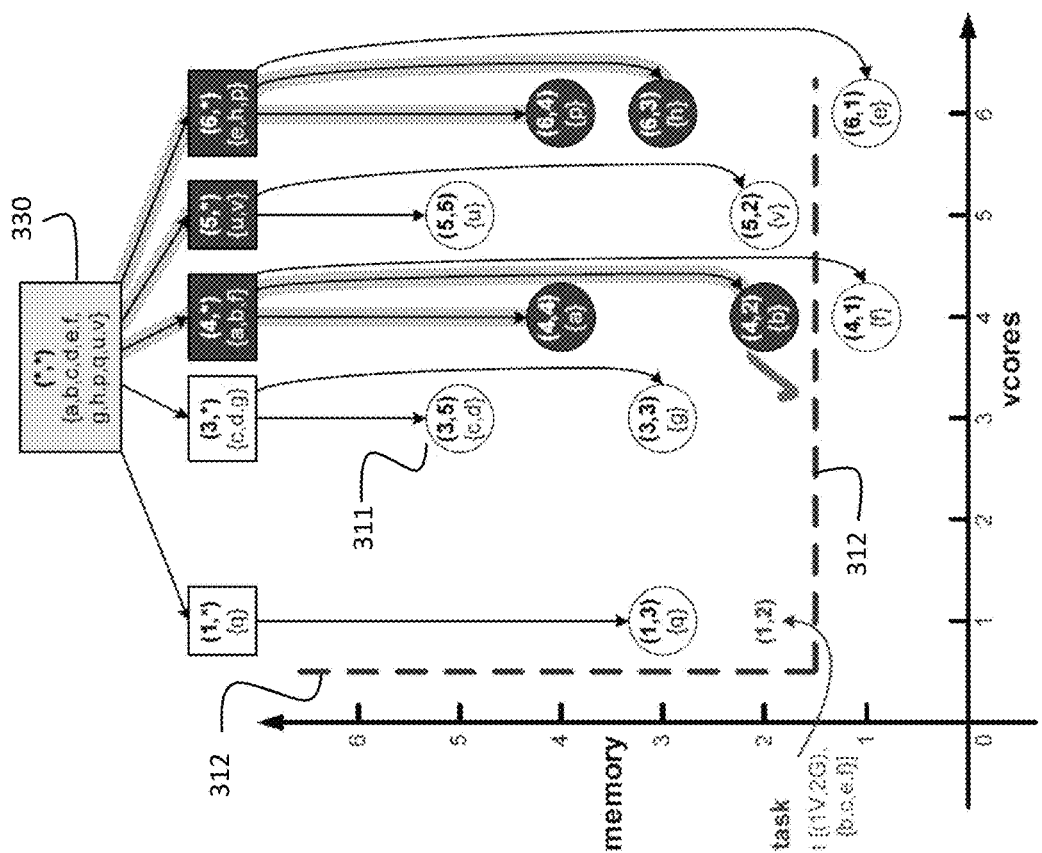
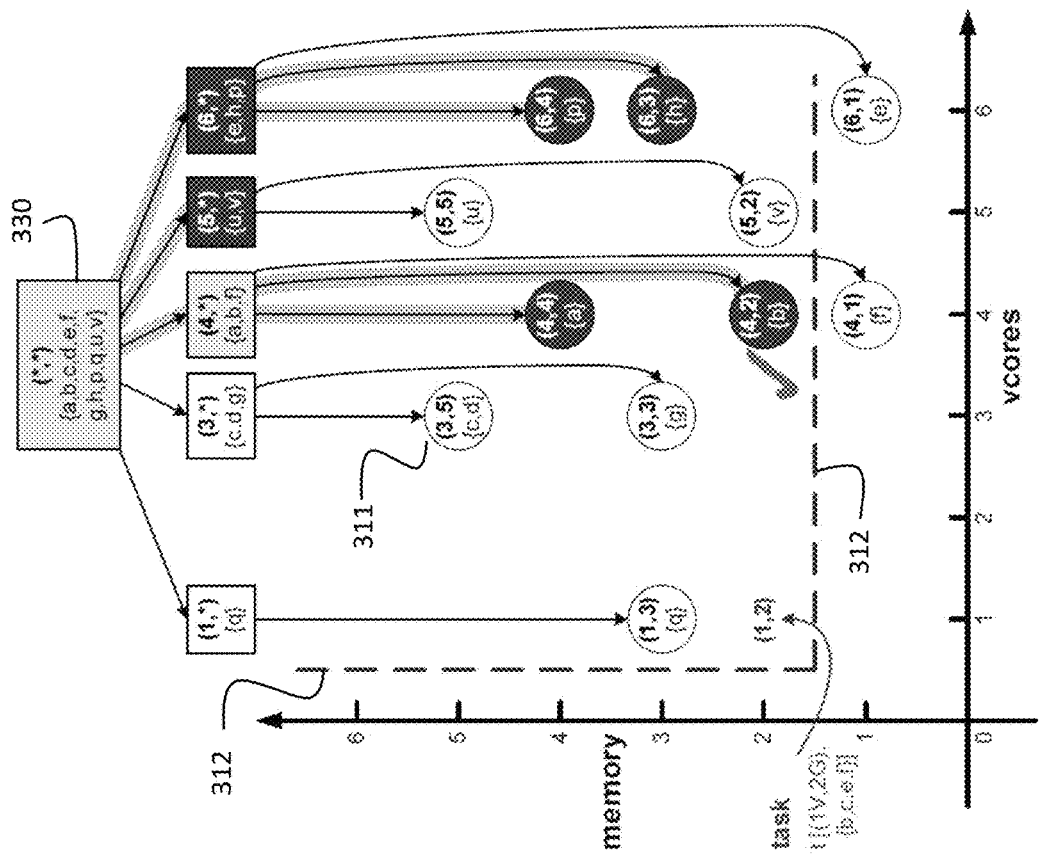
Figure 5j
Figure 5i hard negative cache H⁻

Figure 8:
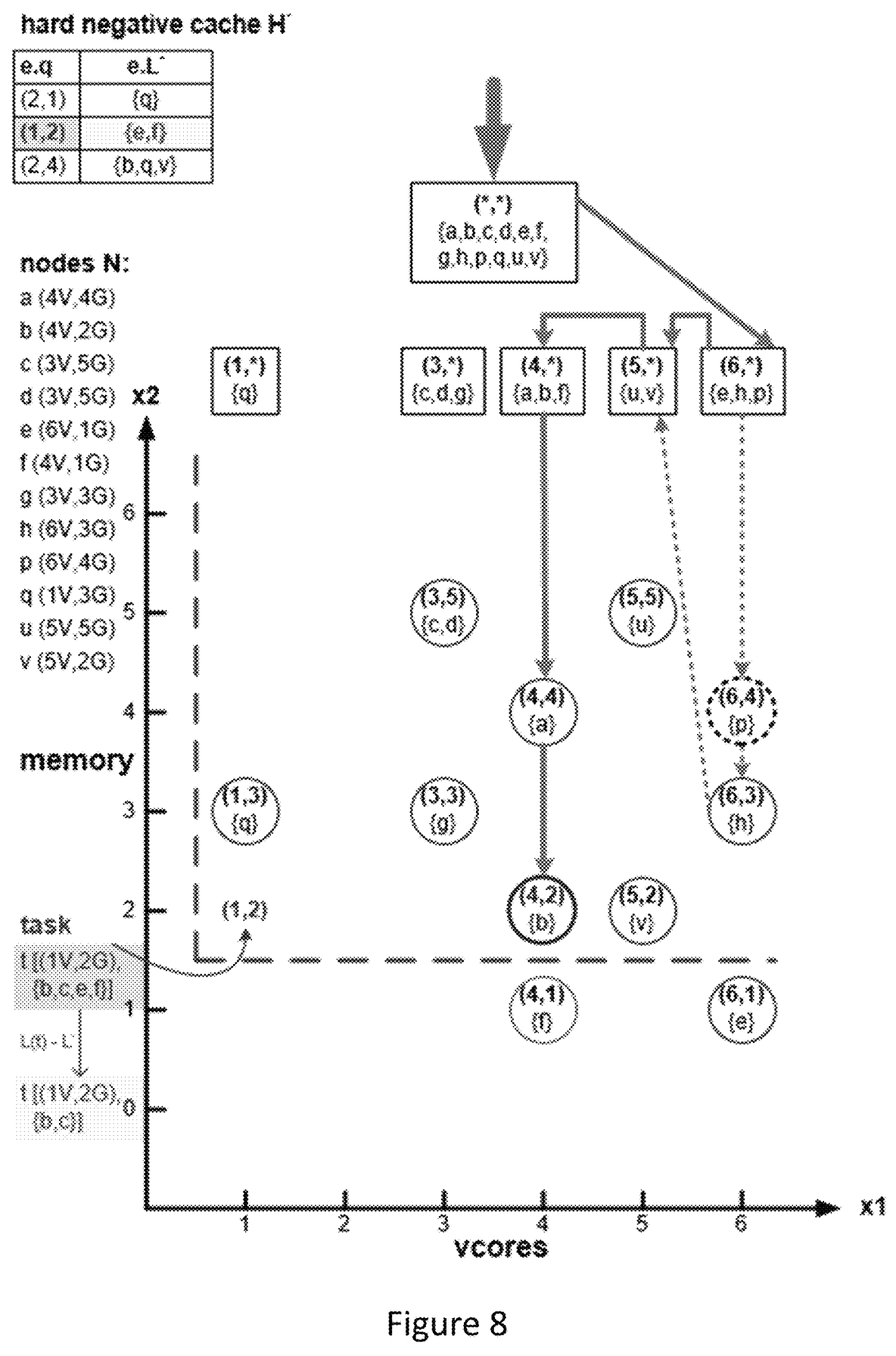

| e.q | e.L⁻ |
|---|---|
| (2,1) | {q} |
| (1,2) | {e,f} |
| (2,4) | {b,q,v} | nodes N:
a (4V,4G)
b (4V,2G)
c (3V,5G)
d (3V,5G)
e (6V,1G)
f (4V,1G)
g (3V,3G)
h (6V,3G)
p (6V,4G)
q (1V,3G)
u (5V,5G)
v (5V,2G)

task
t [(1V,2G), {b,c,e,f}]

RESOURCE SCHEDULING METHODS USING POSITIVE AND NEGATIVE CACHING, AND RESOURCE MANAGER IMPLEMENTING THE METHODS

CROSS-REFERENCE TO RELATED APPLICATIONS

This is the first application filed for the instantly disclosed technology.

FIELD OF THE INVENTION

The present invention generally relates to the field of resource scheduling of resource nodes of a computer cluster or a cloud computing platform.

BACKGROUND

Computer clusters and cloud computing platforms provide computer system resources on demand. Computer system resources of computer clusters and cloud computing platforms are usually organized as resource nodes. Resource nodes may, for example, be physical machines in a computer cluster, virtual machines in cloud computing platform, or hosts. Each resource node may include one or more processors and one or more memory devices. Each resource node may support separable groups of resources including virtual cores (called "vcores") and corresponding memory values.

Numerous users of computer clusters and cloud computing platforms send computer jobs for execution on a set of resource nodes in a computer cluster or cloud computing platform. Computer jobs generally contend for available resource nodes of a computer cluster or of a cloud computing platform. Each computer job may comprise one or multiple tasks. Various requirements provided in the tasks and various resource scheduling methods may need to be taken into account in order to assign the available resource nodes to the tasks.

The tasks may specify diverse resource requirements. For example, one task may specify such desired resource requirements as a vcores value and a memory value of a resource node. The task may also specify a locality constraint which identifies a set of so-called "candidate nodes" where the task may be executed. Moreover, when assigning available resource nodes to the tasks, a resource manager may need to take into account various additional optimization criteria, such as, for example, scheduling throughput, overall utilization, fairness, and/or load balance.

Resource scheduling serves as a key building block in modern schedulers for data-intensive clusters and clouds. As data explodes in volume, velocity and variety, a stream of tasks from many jobs submitted by different tenants or applications contend for the same pool of resources in shared clusters and clouds. Thus, a resource manager needs to efficiently assign tasks contained in computer jobs to the resource nodes based on the availability of the resource nodes, numerous node attributes, and numerous requirements and constraints.

Tasks in these modern systems are highly diverse in both resource requirements and locality constraints. In particular, tasks have multiple dimensions, including amounts of vcores, memory, GPU, disk, and network. Besides, each task may specify a locality constraint, i.e., a task t may be restricted to only be dispatched or executed on a particular set of nodes, which are referred to as the candidate set for the task t. The cardinality of the candidate set can be any integer from 1 to N, in which N is the total number of nodes in the system.

Nodes in the resource pool are frequently heterogeneous, and the availability of each node may constantly change with jobs being executed. Some nodes can have abundant central processing units (CPU) or memories, which fit CPU-intensive or memory-intensive tasks, while graphical processing units (GPU) may be only accessible at a particular set of nodes. Given job diversity and resource heterogeneity, resource scheduling needs to assign tasks to nodes under the constraints of availability and locality while respecting different optimization criteria.

Conventional systems and methods for resource scheduling of tasks of computer jobs are naively implemented and, therefore, resource scheduling of tasks of computer jobs by conventional systems and methods may be time-consuming. Most state-of-the-art systems are built on top of naive resource scheduling implementations and suffer from prohibitive computational complexity. For instance, the computational complexity for selecting a node n among N for a single task t may be on the order of $O(N)$ or $O(\log N)$.

SUMMARY

An object of the present disclosure is to provide methods and apparatuses for resource scheduling of resource nodes of computer clusters or of cloud computing platforms, the method and apparatuses overcoming the inconveniences of the current technology.

The apparatuses and methods for resource scheduling of resource nodes of computer clusters or cloud computing platforms as described herein may help to improve resource scheduling of resource nodes of computer clusters or cloud computing platforms, in order to efficiently allocate resource nodes for tasks that are parts of computer jobs. The methods and systems described herein may help to efficiently select a resource node from a pool of resource nodes for each task of a received set of tasks. Embodiments of the present disclosure take into account the availability of the resource nodes, various node attributes and various specifications received in the tasks. In particular, the present disclosure provides for caching positive and negative search results to accelerate resource scheduling, accounting for multi-dimensionality and locality of resources. For the purposes of the present disclosure, a task is a resource request unit of a computer job.

In accordance with this objective, an aspect of the present disclosure provides a resource scheduling method for a plurality of nodes mapped on a coordinate space defining a plurality of leaf buckets, each leaf bucket having one or more coordinates in one or more dimensions in the coordinate space, the method comprising:

mapping the plurality of nodes on the leaf buckets, each node having an identity, each node also having one or more resource values corresponding to the one or more coordinates of the leaf bucket on which the node is mapped;

receiving a request for a first task, the first task specifying one or more requested resource values corresponding to the one or more dimensions on the coordinate space, the first task also specifying a list of candidate nodes;

scanning at least one of the plurality of leaf buckets in the coordinate space to select a first node among the list of candidate nodes in which each of the one or more resource values is at least equal to the one or more requested resource values, the at least one of the plurality of leaf buckets being scanned in a first direction in the coordinate space;

recording the leaf bucket containing the first node in a positive cache entry;

assigning the first node to the first task in a resource schedule;

reducing the one or more resource values of the first node by the one or more requested resource values; and repositioning the first node among the plurality of leaf buckets according to the reduced one or more resource values of the first node.

In at least one embodiment, the first task is part of a first task group, each one of a plurality of tasks in the first task group comprising the one or more requested resource values and the list of candidate nodes defined by the first task.

In at least one embodiment, a plurality of positive cache entries are defined for a corresponding plurality of task groups.

In at least one embodiment, the method further comprises: receiving a request for a next task, the next task being part of the first task group; scanning at least one of the plurality of leaf buckets in the coordinate space to select a next node among the list of candidate nodes in which each of the one or more resource values is at least equal to the one or more requested resource values, the at least one of the plurality of leaf buckets being scanned in the first direction in the coordinate space starting from the leaf bucket recorded in the positive cache entry; overwriting the positive cache entry with the leaf bucket containing the next node; assigning the next node to the next task in the resource schedule; reducing the one or more resource values of the next node by the one or more requested resource values; and repositioning the next node on the coordinate space according to the reduced one or more resource values of the next node.

In at least one embodiment, the method further comprises: receiving a request for a next task, the next task specifying the one or more requested resource values of the first task group, the next task specifying a subset of the list of candidate nodes of the first task group; scanning at least one of the plurality of leaf buckets in the coordinate space to select a next node among the subset of the list of candidate nodes in which each of the one or more resource values is at least equal to the one or more requested resource values, the at least one of plurality of leaf buckets being scanned in the first direction in the coordinate space starting from the leaf bucket recorded in the positive cache entry; overwriting the positive cache entry with the leaf bucket containing the next node; assigning the next node to the next task in the resource schedule; reducing the one or more resource values of the next node by the one or more requested resource values; and repositioning the next node on the coordinate space according to the reduced one or more resource values of the next node.

In at least one embodiment, a context tag is attached to the first task; and recording the leaf bucket containing the first node in the positive cache entry comprises recording the context tag in the positive cache entry; the method further comprising: receiving a request for a next task, the next task specifying the one or more requested resource values and the context tag of the first task group, the next task specifying a subset of the list of candidate nodes of the first task group, scanning at least one of the plurality of leaf buckets in the coordinate space to select a next node among the subset of the list of candidate nodes in which each of the one or more resource values is at least equal to the one or more requested resource values, the at least one of plurality of leaf buckets being scanned in the first direction in the coordinate space starting from the leaf bucket recorded in the positive cache entry, wherein the context tag of the first task group is used to identify the positive cache entry, overwriting the positive cache entry with the leaf bucket containing the next node, assigning the next node to the next task in the resource schedule, reducing the one or more resource values of the next node by the one or more requested resource values, and repositioning the next node on the coordinate space according to the reduced one or more resource values of the next node.

In at least one embodiment, the following buckets are further defined in the coordinate space: a root bucket encompassing all dimensions of the coordinate space; and a plurality of child buckets, each child bucket being defined by a coordinate vector including a first coordinate for a first one of the one or more dimensions of the coordinate space; wherein: each leaf bucket is associated to one of the child buckets, a first coordinate of the leaf bucket being equal to the first coordinate of the child bucket to which it is associated; and scanning at least one of the plurality of leaf buckets in the first direction in the coordinate space comprises scanning the leaf buckets associated to a first child bucket before scanning the leaf buckets associated to a next child bucket.

In at least one embodiment, scanning the at least one of the plurality of leaf buckets to select the first node among the list of candidate nodes comprises: executing an outer loop scan of the leaf buckets to select a fittable bucket; and executing an inner loop scan of the fittable bucket to select the first node.

Another aspect of the present disclosure provides a resource scheduling method for a plurality of nodes mapped on a coordinate space defining a plurality of leaf buckets, each leaf bucket having one or more coordinates in one or more dimensions in the coordinate space, the method comprising:

mapping the plurality of nodes on the leaf buckets, each node having an identity, each node also having one or more resource values corresponding to the one or more coordinates of the leaf bucket on which the node is mapped;

receiving a request for a first task, the first task specifying one or more requested resource values corresponding to the one or more dimensions on the coordinate space, the first task also specifying a list of candidate nodes;

scanning at least one of the plurality of leaf buckets in the coordinate space to select a first node among the list of candidate nodes in which each of the one or more resource values is at least equal to the one or more requested resource values, the at least one of the plurality of leaf buckets being scanned in a first direction in the coordinate space;

recording in a negative cache entry zero or more nodes of the list of candidate nodes within scanned leaf buckets that have less than the one or more requested resource values;

assigning the first node to the first task in a resource schedule;

reducing the one or more resource values of the first node by the one or more requested resource values; and repositioning the first node among the plurality of leaf buckets according to the reduced one or more resource values of the first node.

In at least one embodiment, the first task is part of a first task group, each one of a plurality of tasks in the first task group comprising the one or more requested resource values and the list of candidate nodes defined by the first task.

In at least one embodiment, a plurality of negative cache entries are defined for a corresponding plurality of task groups.

In at least one embodiment, the method further comprises: receiving a request for a next task, the next task being part of the first task group; scanning at least one of the plurality of leaf buckets in the coordinate space to select a next node among the list of candidate nodes in which each of the one or more resource values is at least equal to the one or more requested resource values, the at least one of the plurality of leaf buckets being scanned in the first direction in the coordinate space, the scanning ignoring the zero or more nodes contained in the negative cache entry; recording in the negative cache entry zero or more additional nodes of the list of candidate nodes within newly scanned leaf buckets that have less than the one or more requested resource values; assigning the next node to the next task in the resource schedule; reducing the one or more resource values of the next node by the one or more requested resource values; and repositioning the next node on the coordinate space according to the reduced one or more resource values of the next node.

In at least one embodiment, the method further comprises: receiving a request for a next task, the next task specifying the one or more requested resource values of the first task group, the next task specifying a subset of the list of candidate nodes of the first task group; scanning at least one of the plurality of leaf buckets in the coordinate space to select a next node among the subset of the list of candidate nodes in which each of the one or more resource values is at least equal to the one or more requested resource values, the scanning ignoring the zero or more nodes contained in the negative cache entry; recording in the negative cache entry zero or more additional nodes of the list of candidate nodes within newly scanned leaf buckets that have less than the one or more requested resource values; assigning the next node to the next task in the resource schedule; reducing the one or more resource values of the next node by the one or more requested resource values; and repositioning the next node on the coordinate space according to the reduced one or more resource values of the next node.

In at least one embodiment, a context tag is attached to the first task; and recording zero or more nodes of the list of candidate nodes in the negative cache entry comprises recording the context tag in the negative cache entry; the method further comprising: receiving a request for a next task, the next task specifying the one or more requested resource values and the context tag of the first task group, the next task specifying a subset of the list of candidate nodes of the first task group, scanning at least one of the plurality of leaf buckets in the coordinate space to select a next node among the subset of the list of candidate nodes in which each of the one or more resource values is at least equal to the one or more requested resource values, the scanning ignoring the zero or more nodes contained in the negative cache entry, wherein the context tag of the first task group is used to identify the negative cache entry, recording in the negative cache entry zero or more additional nodes of the list of candidate nodes within newly scanned leaf buckets that have less than the one or more requested resource values, assigning the next node to the next task in the resource schedule, reducing the one or more resource values of the next node by the one or more requested resource values, and repositioning the next node on the coordinate space according to the reduced one or more resource values of the next node.

In at least one embodiment, a root bucket encompassing all dimensions of the coordinate space is further defined in the coordinate space.

In at least one embodiment, the coordinate space also defines a plurality of child buckets, each child bucket being defined by a coordinate vector including a first coordinate for a first one of the one or more dimensions of the coordinate space, each leaf bucket being associated to one of the child buckets, a first coordinate of the leaf bucket being equal to the first coordinate of the child bucket to which it is associated; and scanning at least one of the plurality of leaf buckets in the first direction in the coordinate space comprises scanning the leaf buckets associated to a first child bucket before scanning the leaf buckets associated to a next child bucket.

A further aspect of the present disclosure provides a resource manager, comprising:
 a memory device adapted to store:
  a coordinate space defining a plurality of leaf buckets, each leaf bucket having one or more coordinates in one or more dimensions in the coordinate space,
  a mapping of a plurality of nodes on the leaf buckets, each node having an identity, each node also having one or more resource values corresponding to the one or more coordinates of the leaf bucket on which the node is mapped, and
  one or more positive cache entries;
 an input/output device adapted to receive a request for a first task, the first task specifying one or more requested resource values corresponding to the one or more dimensions on the coordinate space, the first task also specifying a list of candidate nodes;
 a processor operatively connected to the memory and to the input/output device, the processor being configured to:
  receive the request for the first task from the input/output device,
  scan, in the memory device, at least one of the plurality of leaf buckets in the coordinate space to select a first node among the list of candidate nodes in which each of the one or more resource values is at least equal to the one or more requested resource values, the at least one of the plurality of leaf buckets being scanned in a first direction in the coordinate space;
  record, in a positive cache entry of the memory device, the leaf bucket containing the first node,
  assign the first node to the first task in a resource schedule,
  reduce, in the memory device, the one or more resource values of the first node by the one or more requested resource values,
  reposition, in the memory device, the first node among the plurality of leaf buckets according to the reduced one or more resource values of the first node, and
  cause the input/output device to transmit the assignment of the first node to the first task.

In at least one embodiment, the processor is further configured to scan the at least one of the plurality of leaf buckets to select the first node among the list of candidate nodes by: executing an outer loop scan of the leaf buckets to select a fittable bucket; and executing an inner loop scan of the fittable bucket to select the first node.

Yet another aspect of the present disclosure provides a resource manager, comprising:
 a memory device adapted to store:
  a coordinate space defining a plurality of leaf buckets, each leaf bucket having one or more coordinates in one or more dimensions in the coordinate space, the coordinate space also defining a plurality of child buckets, each child bucket being defined by a coordinate vector including a first coordinate for a first one of the one or more dimensions of the coordinate space, each leaf bucket being associated to one of the child buckets, a first coordinate of the leaf bucket being equal to the first coordinate of the child bucket to which it is associated, a mapping of a plurality of nodes on the leaf buckets, each node having an identity, each node also having one or more resource values corresponding to the one or more coordinates of the leaf bucket on which the node is mapped, and one or more negative cache entries;

an input/output device adapted to receive a request for a first task, the first task specifying one or more requested resource values corresponding to the one or more dimensions on the coordinate space, the first task also specifying a list of candidate nodes;

a processor operatively connected to the memory and to the input/output device, the processor being configured to:
receive the request for the first task from the input/output device,
scan, in the memory device, at least one of the plurality of leaf buckets in the coordinate space to select a first node among the list of candidate nodes in which each of the one or more resource values is at least equal to the one or more requested resource values, the at least one of plurality of leaf buckets being scanned in a first direction in the coordinate space,
record, in a negative cache entry of the memory device, zero or more nodes of the list of candidate nodes within scanned leaf buckets that have less than the one or more requested resource values,
assign the first node to the first task in a resource schedule,
reduce, in the memory device, the one or more resource values of the first node by the one or more requested resource values,
reposition, in the memory device, the first node among the plurality of leaf buckets according to the reduced one or more resource values of the first node, and
cause the input/output device to transmit the assignment of the first node to the first task.

Implementations of the present disclosure each have at least one of the above-mentioned objects and/or aspects, but do not necessarily have all of them. It should be understood that some aspects of the present disclosure that have resulted from attempting to attain the above-mentioned object may not satisfy this object and/or may satisfy other objects not specifically recited herein.

Additional and/or alternative features, aspects and advantages of implementations of the present disclosure will become apparent from the following description, the accompanying drawings and the appended claims.

BRIEF DESCRIPTION OF THE FIGURES

Further features and advantages of the present disclosure will become apparent from the following detailed description, taken in combination with the appended drawings, in which:

FIG. 8 illustrates a reduced bucket trajectory obtained using a negative caching strategy in accordance with non-limiting embodiments of the present disclosure;

Figure 1:
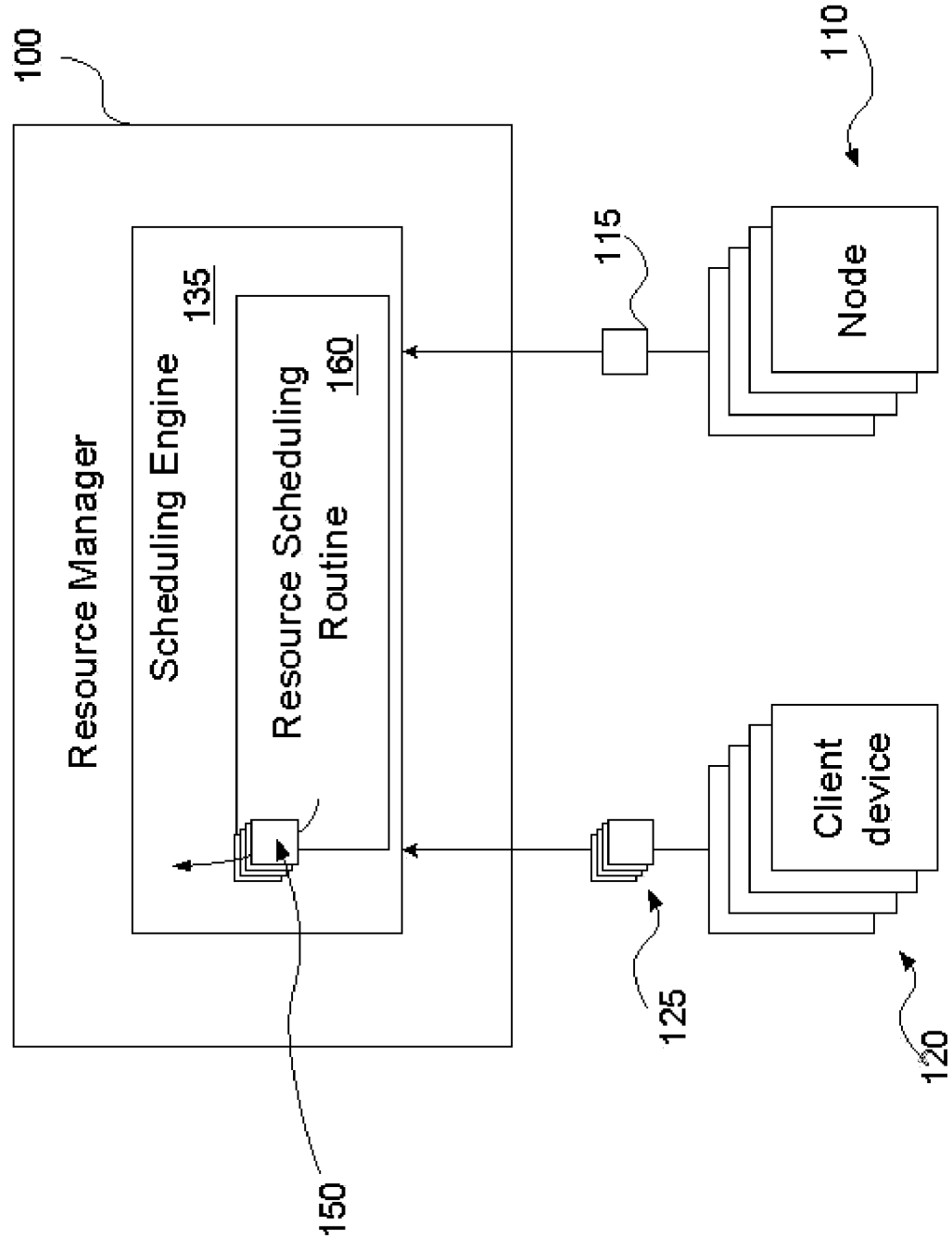
FIG. 1 illustrates a schematic diagram of a resource manager suitable for implementing non-limiting embodiments of the present disclosure.

It is to be understood that throughout the appended drawings and corresponding descriptions, like features are identified by like reference characters. Furthermore, it is also to be understood that the drawings and ensuing descriptions are intended for illustrative purposes only and that such disclosures do not provide a limitation on the scope of the claims.

DETAILED DESCRIPTION

The present disclosure addresses at least some of the deficiencies of the current technology. In particular, the present disclosure describes resource scheduling methods and systems. These methods and systems allow caching positive and negative search results in view of resource scheduling, accounting for multi-dimensionality and locality of resources.

Generally speaking, the present technology facilitates the assignment of tasks to nodes by using a representation of the nodes in a multi-dimensional coordinate space. In this space, coordinates represent the available resources of each node. The nodes may include one, two, three or more resource types that are mapped on corresponding one, two, three or more coordinates of this multi-dimensional space. Nodes having the same number of resources in all dimensions of the coordinate space are grouped in buckets, which are called leaf buckets. Leaf buckets that share a common value for a first coordinate of the coordinate space are grouped in child buckets. All child buckets are grouped in a common root bucket. The root bucket contains one or more child buckets, each of which contain one or more leaf buckets.

This arrangement of the nodes in this bucket structure allows to define a scanning direction of the coordinate space when a request to allocate a task to a node is received in a resource manager. In that context, the scanning direction is understood as a trajectory used in the scanning of the child and leaf buckets of the coordinate space, in its multiple dimensions. When a scan performed in a first direction is complete for a first task request, a result of this scan may be stored in a positive cache or in a negative cache. Upon receiving a next task request, the resource manager may use the content of the positive cache, or the content of the negative cache, to facilitate the scanning of the coordinate space. The positive cache may be used to provide a starting point for scanning the coordinate space in a same first direction as in the first scan. The negative cache may be used to ignore any node that was found not to contain the needed resources when scanning for the first task.

Without limiting the generality of the present disclosure, the present disclosure may complement or supplement the embodiments disclosed in Chen et al.: "Methods and Apparatus for Resource Scheduling of Resource Nodes of a Computing Cluster or a Cloud Computing Platform", U.S. patent application Ser. No. 16/720,410 filed on Dec. 19, 2019, the disclosure of which is incorporated by reference herein in its entirety.

The present disclosure contains a number of key terminologies as follows:
- cluster: a group of loosely coupled processing devices, for example computers, that work together to execute tasks from multiple jobs. A cluster may be located within a data center or deployed across multiple data centers.
- cloud: also called a "cloud computing platform", a group of loosely coupled virtual machines that work together to execute tasks from multiple jobs. A cloud may be located within a data center or deployed across multiple data centers.
- node: a resource entity, for example a computer in a cluster or a virtual machine in the cloud, the node being characterized by available and reserved resources in multiple dimensions, such as amounts of vcores, memory, and GPU. Each Node instance may have a unique node ID.
- job: work item submitted by users and to be executed in a set of nodes in cluster or cloud.
- Task: a resource request unit of a job. Each job may contain one or many tasks; each task is executed on one node; different tasks for one job may be executed on different nodes. Each node consumes a certain amount of resource in multiple dimensions, such as for example 2 vcores and 16 GB of memory.
- locality constraint: a given task may specify a locality constraint, meaning that the given task may only be executed at a specific set of nodes.
- bucket: a group of one or more nodes sharing a number of features.

A notation used throughout the present disclosure is summarized as follows. Typically, vectors (or functions to return a vector) are expressed in lowercase characters, for example as r, q, $\varphi$, and x. The elements of the vector are identified by writing its name in italic typeface, with a subscript. For example, the first element of x is $x_1$, the second is $x_2$, and so on. Elements of a vector are explicitly presented as a row enclosed in brackets: $x=(x_1, \ldots, x_2)$. Vectors may be thought of as identifying points in a coordinate space, which may also be called a feature space, with each element defining coordinates along various axes of the coordinate space. Generally, arithmetic operations (for example +, −, ≤, ≥) on vectors are applied element-wise, for example when adding vectors x and y as follows: $x+y=(x_1+y_1, \ldots x_D+y_D)$.

Figure 2:
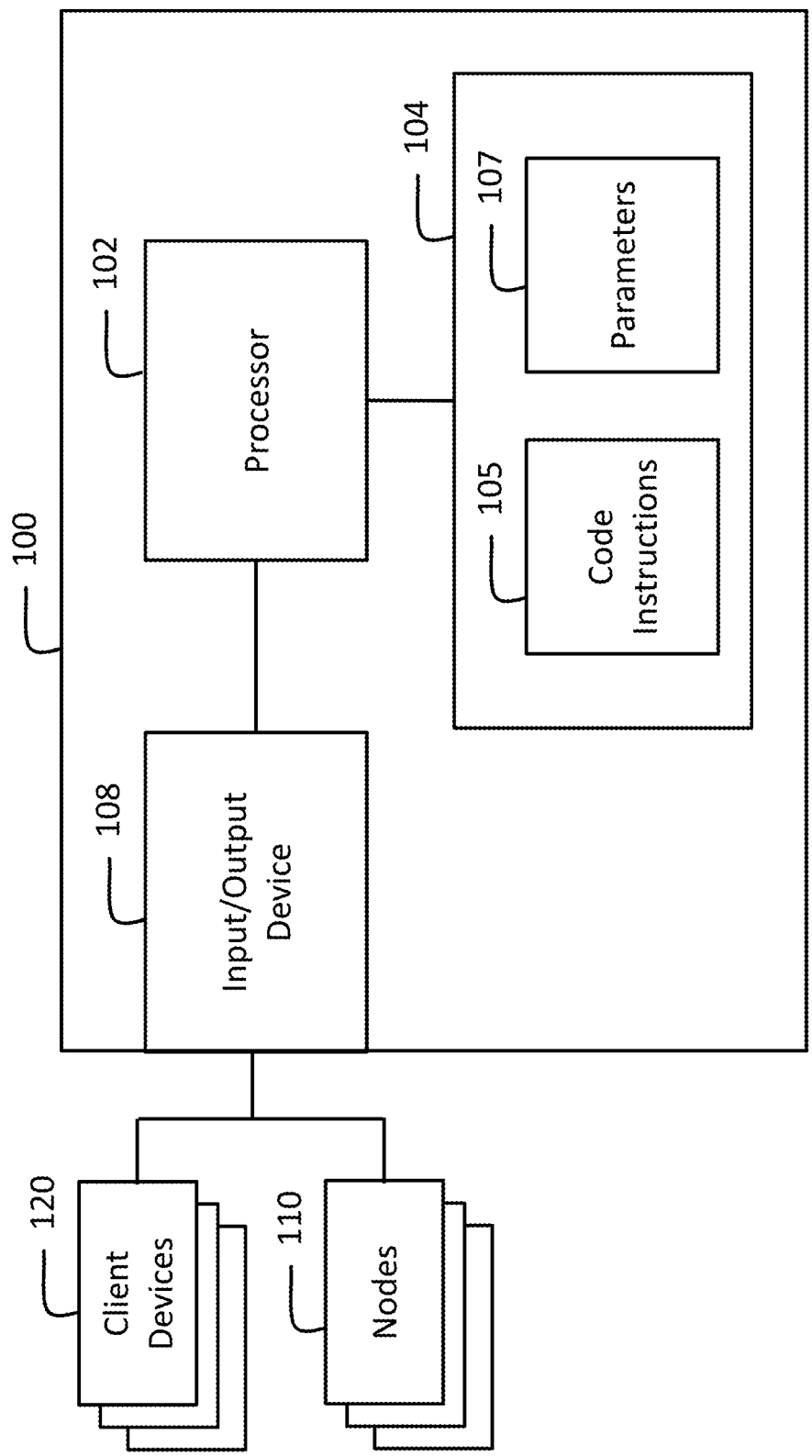
FIG. 2 is a block diagram showing components of the resource manager of FIG. 1 in accordance with non-limiting embodiments of the present disclosure.

Referring now to the drawings, FIG. 1 illustrates a schematic diagram of resource manager suitable for implementing non-limiting embodiments of the present disclosure. FIG. 2 is a block diagram showing components of the resource manager of FIG. 1. Referring to FIGS. 1 and 2, a resource manager (RM) 100 comprises a processor or a plurality of cooperating processors (represented as a processor 102 for simplicity), an memory device or a plurality of memory devices (represented as a single memory device 104 for simplicity), an input/output device or a plurality of input/output devices (represented as an input/output device 108 for simplicity). Separate input and output devices may be present instead of the input/output device 108. The processor 104 is operatively connected to the memory device 104 and to the input/output device 108. The memory device 104 may comprise a non-transitory computer-readable medium 105 for storing code instructions that are executable by the processor 102. The memory device 104 may also comprise a database 107 for storing data which may include, for example, various parameters described hereinbelow.

The RM 100 receives requests for tasks 125 from client devices 120 that run computer applications (not shown). The RM 100 assigns the tasks 125 received from the client devices 120 to various nodes 110. To this end, the RM 100 implements a scheduling engine 135 for allocating the tasks 125 to the nodes 110. The scheduling engine 135 performs the various methods described herein.

In operation, the RM 100 receives, at its input/output device 108, the tasks 125 from the client devices 120 and node data 115 from the nodes 110. The node data 115 comprises a set of node identities (ID) and other data, such as node attributes, as described hereinbelow. In the RM 100, the processor 102 causes the memory device 104 to store the node IDs, node attributes and positions of the nodes in the coordinate space, as well as current occupancy of the nodes and information about current tasks in the database 107. The RM 100 will allocate the tasks 125 to the nodes 110 as expressed hereinbelow.

Figure 3:
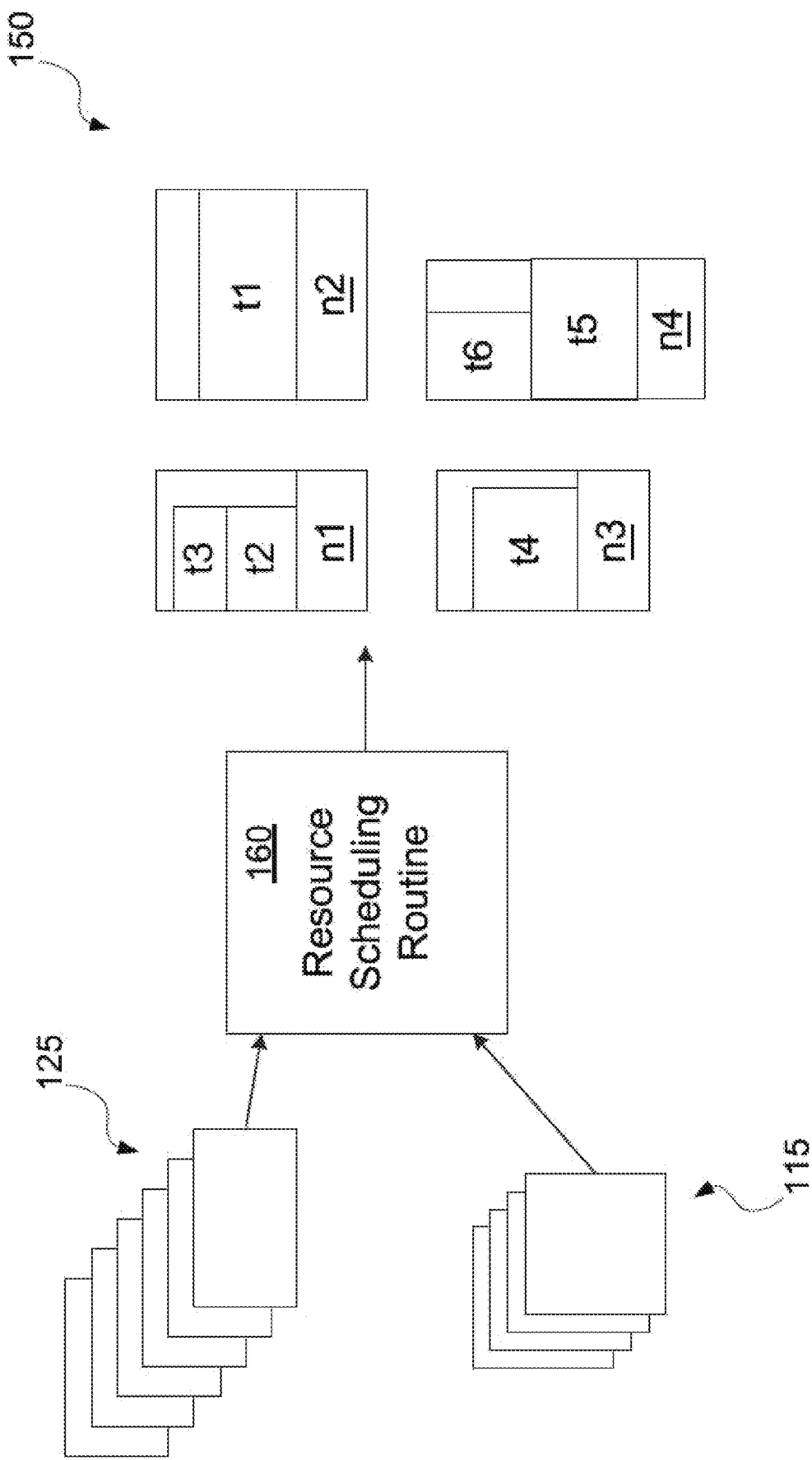
FIG. 3 illustrates a resource scheduling routine and a scheduling scheme generated by the resource scheduling routine in accordance with non-limiting embodiments of the present disclosure.

In particular, the methods as described herein may be performed by a resource scheduling routine (RSR) 160 of the scheduling engine 135, according to code instructions stored in the non-transitory computer-readable medium 105. FIG. 3 illustrates a resource scheduling routine and a scheduling scheme generated by the resource scheduling routine. The RSR 160 generates a scheduling scheme 150 based on the received node data 115 and the received tasks 125. The scheduling scheme 150 has each task (shown as t1, t2, etc. in the scheduling scheme 150) being mapped to one node (shown as n1, n2, etc. in the scheduling scheme 150) while satisfying various criteria described hereinbelow. On FIG. 3, tasks t2 and t3 are assigned to node n1, task t1 is assigned to node n2, task t4 is assigned to node n3, and task t5 and t6 are assigned to node n4. In each of the nodes n1-n4, the sum of assigned tasks does not exceed the amount of available resources (remaining resources, if any, are schematically represented by blank areas in each node). The scheduling scheme 150 may implement various functions described hereinbelow.

Along with each node ID, node data 115 received by RSR 160 may comprise values of the node attributes corresponding to each one of nodes 110.

The node attributes received by RSR 160 specify a maximum of the available node attributes of the corresponding node. The maximum of the available node attributes may not be exceeded when the nodes are allocated by RSR 160. For example, if one of the node attributes for a given node, such as memory, is specified as 2 GB, then the allocated tasks may not use more than 2 GB when executed in the given node.

A number of node attributes is also referred to herein as a "number of resource dimensions" for the node. The number of resource dimensions determines a number of dimensions of the coordinate space to which the resource nodes may be mapped in the manner described hereinbelow.

In view of the above, a problem to be solved may be formulated as a Resource Scheduling problem with Multi-dimensionality and Locality, or RESOURCESCHEDULE-ML for short. Informally speaking, given a finite resource pool of nodes and a sequence of tasks, the goal is for the RSR 160 to efficiently select one of the nodes 110 for each request for tasks 125 received from the client devices 120 with respect to practical constraints of availability and locality. RESOURCESCHEDULE-ML covers a broad family of problems with different optimization objectives, such as makespan, scheduling throughput, overall utilization, fairness, and load balancing.

This RESOURCESCHEDULE-ML problem may be solved using an algorithm "Alg. 1" implemented in a non-limiting embodiment of the RSR 160, which is described in the form of pseudo-code in Table I:

TABLE I

| Alg. 1: SeqRSA |
| --- |
| input: M,T,N,L,q,r |
| output: A |
| 1  A ← ∅ |
| 2  initialize( ) |
| 3  foreach t ∈ T sequentially do |
| 4    n ← schedule(t) |
| 5    A ← A +⟨t,n⟩ |
| 6    update(t,n) |
| 7  return A |

Other algorithms are also presented in the form of pseudo-code hereinbelow.

In this embodiment of the RSR 160, Alg. 1 uses inputs M, N, T, r, q, L and produces an output A. These inputs M, N, T, r, q, L, the output A, and other information elements are summarized in Table II:

TABLE II

| Inputs and Output of the problem to be solved and Alg. 11 | |
| --- | --- |
| M | This input represents a number of resource dimensions |
| T | This input represents the task sequence, in which a smaller sequence number indicates a higher priority to be scheduled |
| N | This input represents the node set |
| L | This input represents a locality function $L : T \therefore 2^N$, that maps each task $t \in T$ to its candidate set $L(t) \subseteq N$ a node subset that may schedule t |

TABLE II-continued

| | |
| --- | --- |
| q | This input represents a request function vector $q : T \to R^M$, that maps each task $t \in T$ to its requested resources as a M-dimensional vector $q(t) \in R^M$ |
| r | This input represents a resource function vector $r :: N \to R^M$, that maps each node $n \in N$ to its availability as a M-dimensional vector $r(n) \in R^M$ |
| A | The output schedule, that maps each task $t \in T$ to one node $n \in N$ or NIL, i.e. $A(t) \in N \cup \{NIL\}$ |
| Common variables | |
| $m \in [1,M]$ | dimension index of some resource |
| $t \in T$ | a variable task t |
| $n \in N$ | a variable node n |
| $L(t)$ | set of nodes that may schedule task $L(t) \subseteq N$ |
| $q(t), q_m(t)$ | resource request vector of task t and its $m^{th}$ entry |
| $r(n), r_m(n)$ | resource availability vector of node n and its $m^{th}$ entry |
| $A(t)$ | scheduled output for task t |
| Bucket, coordinate and basis function | |
| $B \subseteq N$ | a bucket, subset of nodes as an equivalence class |
| B.x | a coordinate of bucket B |
| $\varphi$ | basis function vector $\varphi = (\varphi_1, \ldots, \varphi_D)$ |
| D | number of dimensions in the coordinate space |
| Attributes of a bucket for scanning iterations | |
| B.β | neighbor of bucket B being explored |
| B.color | color of bucket B |
| B.discover | discovering time of bucket B |
| B.finish | finishing time of bucket B |
| Special buckets | |
| N | the root bucket coordinated at $(*, \ldots, *)$ |
| $B_0$ | the virtual bucket with no valid coordinate |
| $B_\infty$ | the virtual bucket coordinated at $(\infty, \ldots, \infty)$ |
| $B_{-\infty}$ | the virtual bucket coordinated at $(-\infty, \ldots, -\infty)$ |
| Coordinate variables | |
| $x, x_d$ | a coordinate and its crh element |
| $x^{(n)}, x^{(t)}$ | coordinate of a node n or a task t |
| Global variables in Alg. 1 | |
| $\mathcal{G} = (\mathcal{V}, \mathcal{E})$ | the directed graph over buckets |
| $\mathcal{V}$ | vertex set of buckets |
| $\mathcal{E}$ | edge set to represent the partial order over buckets |
| Global variables for positive or negative caching | |
| $H^+$ | hard positive cache for sequential scanning iteration |
| $S^+$ | soft positive cache for sequential scanning iteration |
| $C^+$ | soft positive cache with contextual function for sequential scanning iteration |
| $H^-$ | hard negative cache for random scanning iteration |
| $S^-$ | soft negative cache for random scanning iteration |
| $C^-$ | soft negative cache with contextual function for random scanning iteration |
| c | contextual function to label tasks, $c:T \to \{1, \ldots, C\}$ |

It should be noted that some of the information elements listed in Table II may not be present in some embodiments.

The RSR 160 selects the scheduled output A for a task t to satisfy the following capacity and locality constraints:

Availability constraint: tasks scheduled at any node do not exceed its availability in all dimensions:

$$\Sigma_{t:A(t)=n} q_m(t) \leq r_m(n), m \in [1,M], \forall n \in N$$

For simplicity, the above expression may be rewritten as equation (1) by vectorization with element-wise arithmetic operations:

$$\Sigma_{t:A(t)=n} q(t) \leq r(n), \forall n \in N \quad (1)$$

Locality constraint: the selected node for each task $t \in T$ comes from the candidate set $L(t)$ if it is not NIL, as defined in equation (2):

$$A(t) \in L(t) \cup \{NIL\}, \forall t \in T \quad (2)$$

The problem to be solved may be tackled in this embodiment of the RSR 160 using methods for organizing the nodes 110, matching the tasks 125 against the nodes 110, ranking the nodes 110 according to various comparison rules, and filtering the allocation of the tasks 125 to the nodes 110 according to locality constraints. For simplicity, the present disclosure makes extensive use of non-limiting examples involving resource of two dimensions, namely vcores and memory. Using examples presented in two dimensions makes it particularly easy to illustrate the present teachings in a graphical manner. It should however be understood that the teachings described herein are applicable to coordinate spaces of many dimensions including, for example and without limitation, a memory input/output bandwidth of any type of memory that may permanently store data (in other words, how much data may be retrieved from the memory and how fast that data may be retrieved), network parameters value and GPU parameter values, such as, for example, a voltage value and a clock speed value.

Sequential Resource Scheduling Algorithm (SeqRSA)

In a non-limiting example of implementation of the RSR 160, Alg. 1 specifies a Sequential Resource Scheduling Algorithm (SeqRSA), a generic algorithmic framework for the problem to be solved described hereinabove as RESOURCESCHEDULE-ML. In SeqRSA, Line 1 starts with an empty schedule A, Line 2 performs initialization, and Lines 3-6 build A by iteratively scanning through the tasks 125 sequentially. Each scanning iteration picks a task $t \in T$ in order, and tries to schedule a node for the task t Line 4 calls a function schedule( ) to select a node $n \in N$ for the task t, The node n being selected for the task t, Line 5 adds to A the new task-node pair $\langle t, n \rangle$ (i.e. a particular task 125 allocated to a particular node 110), and Line 6 updates the amount of remaining available resources in the node n following its selection for the task t.

In SeqRSA, schedule( ), initialize( ), and update( ) are declared as virtual functions, that may be overridden by concrete algorithms with specific policies. The data structures in the RSR 160 may support efficient implementations for these three functions with regard to a variety of scheduling policies. Examples of suitable scheduling policies include:

- LeastFit, which schedules a task 125 to a node 110 having the highest availability among the nodes 110 that are "fittable", in the sense that they meet the constraints of both capacity and locality. LeastFit attempts to create the largest availability hold after each allocation, thus increasing the possibility that the subsequent tasks 125 may fit the remaining resources. Additionally, LeastFit tends to balance the load across the nodes 110.
- BestFit, which schedules a task 125 to a node 110 having the smallest availability among the allocable nodes 110. BestFit tries to find a node 110 whose resource availability is close to the actual request of the task 125.
- FirstFit, which schedules a task 125 to the first allocable node 110 it finds in some iteration-based search.
- NextFit, which is a modification of FirstFit. NextFit begins as FirstFit to find an allocable node 110 but, when called next time, starts searching from where it left off instead of from the beginning.
- Random, is a scheduling policy in which a task 125 is randomly scheduled to an allocable node 110.

Without limiting the generality of the present disclosure, examples are presented with the RSR 160 applying the LeastFit scheduling policy and its variations to provide efficient implementations under the SeqRSA algorithm pattern. The RSR 160 may apply the SeqRSA pattern to other scheduling polices, including for example and without limitation the above mentioned scheduling policies.

Framework of Schedule( )

An algorithm "Alg. 2" implemented in a non-limiting embodiment of the RSR 160 is described in Table III:

TABLE III

| Alg. 2: schedule( ) and fit( ) for SeqRSA |
|---|
| 1      function schedule (t) |
| 2        do// Outer iteration across buckets |
| 3          B ← nextBucket( ) |
| 4          do// Inner iteration within bucket |
| 5            n ← nextNode(B) |
| 6            if fit (t, n) then |
| 7              return n |
| 8          while n ≠ NIL |
| 9        while B ≠ $B_0$ |
| 10        return NIL |
| 11     function fit (t, n) |
| 12        if (q(t) ≤ r(n)) ∧ (n ∈ L(t)) then |
| 13          return true |
| 14        else |
| 15          return false |
| 16     function fit (t, B) |
| 17        $x^{(t)} \leftarrow \phi(q(t))$ |
| 18        if $(x^{(t)} \subseteq B.x) \wedge (L(t) \cap B \neq \emptyset)$ then |
| 19          return true |
| 20        else |
| 21          return false |

In this embodiment of the RSR 160, Alg. 2 implements the function schedule( ) for SeqRSA, which systematically searches for a fittable node n for a given task t by two levels of nested scanning iterations. The outer loop in Lines 2-9 iterates through a sequence of bucket instances, where each bucket $B \subseteq N$ represents an equivalence class of nodes regarding resource capacity; the inner loop in Lines 4-7 iterates through nodes within each bucket B one by one and returns a node n immediately if the node $n \in B$ meets both availability and locality constraints for scheduling the task t. If no node is found from these scanning iterations, Line 10 returns NIL for t.

Function nextBucket( ) in Line 3 and nextNode(B) in Line 5 define the outer and inner iterators, respectively. The function nextBucket( ) in Line 3 returns the next bucket B in the outer loop across buckets. The function nextNode(B) in Line 5 returns the next node in a given bucket B. Function fit( ) in Line 6 checks whether task t may be scheduled on node n. Implementation of these functions is discussed hereinbelow.

Caching

It is computationally expensive to iteratively scan through buckets and nodes for a task, and significant redundant work reduction may be obtained by carefully caching both positive and negative evaluation results across different tasks. The present disclosure proposes general caching strategies that enable efficient implementations for a variety of resource scheduling policies.

In more details, in some embodiments of the RSR 160, the outer and inner scanning iterations in Alg. 2 may either be sequential or random. Given a set of members (for example buckets or nodes), sequential scanning iteration follows a specific order to visit each member, while random scanning iteration arbitrarily picks a non-visited member.

In other embodiments, the RSR 160 may use a positive caching strategy for sequential scanning iteration. Considering that Alg. 2 may adopt the sequential scanning iteration for the outer loop over buckets in Lines 2-9, then given a task t, calling nextBucket( ) repeatedly in Line 3 leads to iteratively scanning buckets based on the sequence $S=\langle B_1, B_2, \ldots, B_k, \ldots, B_z \rangle$, where z is the index of the last bucket in the sequence and $B_z=B_\varnothing$. Then, considering that Alg. 2 may terminate the outer scanning iteration at $B_k$, where $k \in [1,z]$, Alg. 2 may later schedule another task t', which exhibits the same resource requests and locality constraint as t. As a result, the outer scanning iteration for t' may resume from $B_k$, i.e., the bucket sequence that guides the scanning iteration of Alg. 2 becomes $S'=\langle B_k, \ldots, B_z \rangle$.

In yet other embodiments, the RSR 160 may use a negative caching strategy for random scanning iteration. Considering that Alg. 2 may adopt the random scanning iteration for the inner loop over nodes within a bucket in Lines 4-7, if Line 6 returns false on some node n for task t, then node n cannot fit any future task t' that have the same resource requests as t, and n may safely be excluded for scheduling t'.

The remainder of present disclosure is organized as follows: An algorithm for LeastFit without caching is first described, followed by a description of various embodiments of strategies using positive and negative caching.

Algorithm for LeastFit

The outline of SeqRSA in Alg. 1 has been shown hereinabove. An embodiment of the present disclosure exemplifies the implementation in the RSR 160 of the functions initialize( ), update( ), and schedule( ) for the LeastFit scheduling policy, which may also be extended for other scheduling polices. The following paragraphs introduce core data structures of buckets and coordinates, which are then ordered. A few common functions with nodes, tasks, buckets and coordinates are introduced. The functions initialize( ) and update( ) are implemented by maintaining a global directed graph over the buckets. The function schedule( ) with an efficient implementation of the bucket scanning iteration based on graph traversal is then presented.

Figure 4:
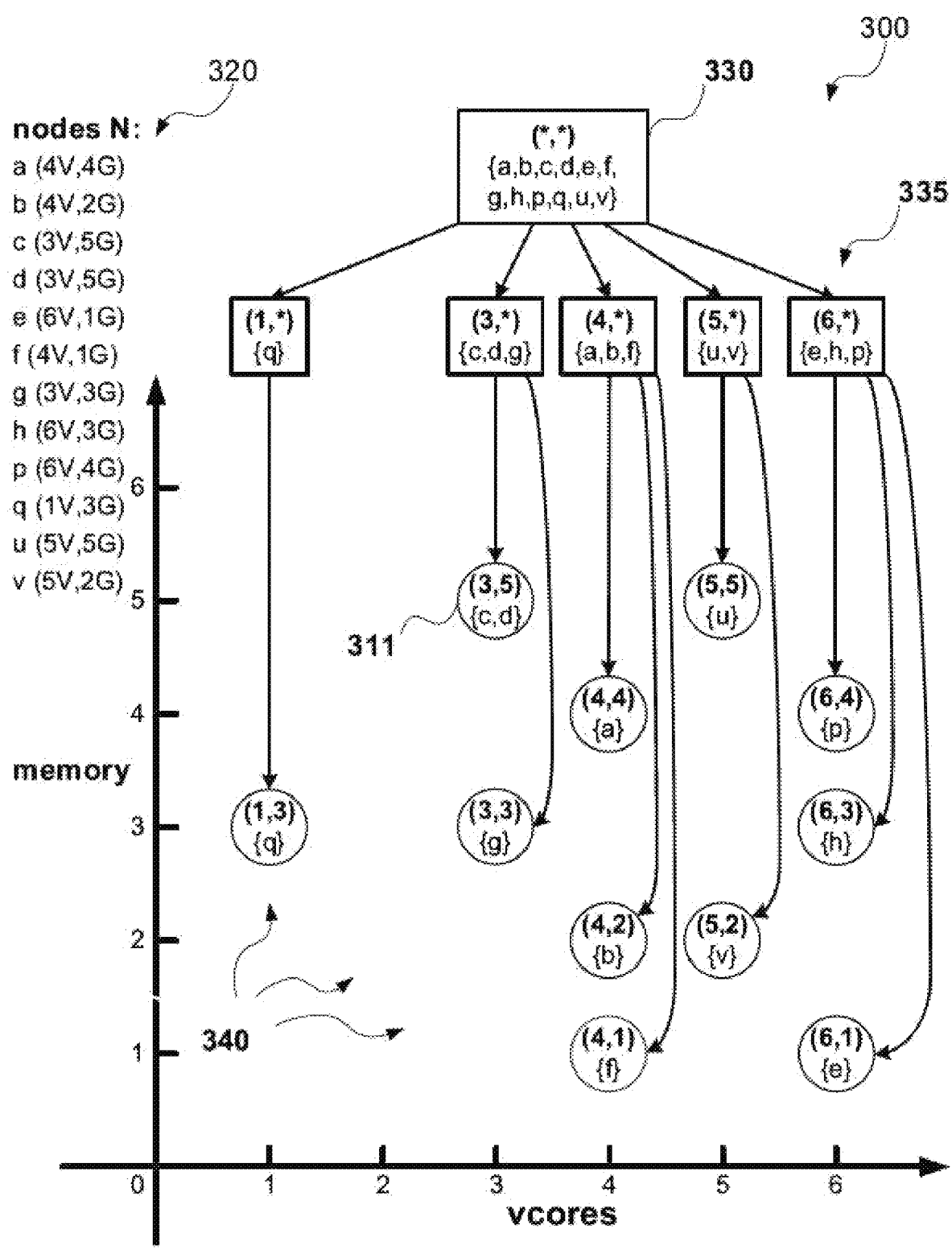
FIG. 4 shows a non-limiting example of a coordinate space with a number of nodes organized in a number of buckets mapped to the coordinate space in accordance with non-limiting embodiments of the present disclosure.

Without loss of generality, the present disclosure provides examples that involve two-dimensional resources of vcores and memory (i.e., M=2). For example, FIG. 4 shows a non-limiting example of a coordinate space with a number of nodes organized in a number of buckets mapped to a coordinate space 300. The non-limiting example of FIG. 4 shows how the RSR 160 defines the coordinate space 300 having 17 bucket instances, and a node set 320 of 12 nodes having their node data 115 organized into the coordinate space 300 as defined in equation (3):

$$N = \left\{ \begin{array}{l} a(4V, 4G), b(4V, 2G), c(3V, 5G), d(3V, 5G), \\ e(6V, 1G), f(4V, 1G), g(3V, 3G), h(6V, 3G), \\ p(6V, 4G), q(1V, 3G), u(5V, 5G), v(5V, 2G) \end{array} \right\} \quad (3)$$

The example presented in FIG. 4 and in later Figures shows a very small two-dimension coordinate space 300 that includes only 12 nodes distributed over 11 leaf buckets and over a total of 17 buckets. A practical application may include thousands, or tens of thousands of nodes distributed over a very large number of buckets defined over a multi-dimension coordinate space 300.

In equation (3), the node data 115 for each node 110 includes the ID of the node expressed as a single letter (for example letters, "a", "b", "c", and the like) and a number of node coordinates representing attribute values over a number of dimensions. On FIG. 4, each dimension of coordinate space 300 corresponds to one node attribute. In this example of FIG. 4, the dimensions of coordinate space 300 are the number of vcores and the memory. A position of a node in the two-dimensional coordinate space 300 is defined by node coordinates (v, m), where "v" corresponds to the number of vcores and "m" corresponds to the amount of memory of the node. For example, a designation "b(4V, 2G)" refers to a node having a node ID "b", 4 vcores and 2 GB of available memory. Each node is therefore denoted with an identity (ID), followed by a vector as its multi-dimensional available resource, for example c(3V, 5G) represents a node c with 3 vcores and 5 GB memory, and the resource availability vector for node c is r(c)=(3,5). It should be understood that the present disclosure may be applied to multi-dimensional resources.

A node graph structure of FIG. 4 comprises a graph structure root 330 (one bucket) with a coordinate vector (*,*), node graph structure children 335 with coordinate vectors {(1,*), (3,*), (4,*), (5,*), (6,*)} (5 buckets out of 6 possible buckets include at least one leaf), and node graph structure leaves 340 (11 buckets of 36 possible buckets include at least one node), one such leaf including at least one of the nodes $n \in N$ distributed on the coordinate space 300. Arrows illustrate parent-child relationships between different bucket instances. In the non-limiting example of FIG. 4, nodes c and d are in the same leaf bucket (3,5) 311. In a large system, for example in a datacenter, the coordinate space may include one root bucket 330, a large number of child buckets 335 and a very large number of leaf buckets 311, a large number of nodes n being included in each leaf bucket 311.

Bucket and Coordinate

As illustrated in FIG. 4, to efficiently search for the fittable node for a given task, the nodes in N are organized into a number of buckets. Each bucket $B \subseteq N$ represents an equivalence class of nodes with the same features. Feature extraction is applied based on $\varphi=(\varphi_1, \ldots, \varphi_D)$, which is a basis function vector of D dimensions. For each node $n \in N$, the RSR 160 transforms its availability vector r(n) in the original input space of resources to a coordinate $x(n)=\varphi(r(n))$ in the coordinate space, and maps nodes so that nodes having the same coordinate belong to the same bucket. Thus, the RSR 160 indexes the buckets by coordinates in the coordinate space and makes nodes inside the buckets searchable.

The RSR 160 of present disclosure is independent of the particular choice of basis functions for feature extraction. For most of the present disclosure, $\varphi$ may simply be assumed as the identity $\varphi(y)=y$ and, consequently, the coordinate space may be considered identical to the input space.

On FIG. 4, the coordinates for each node is assigned by the RSR 160 based on the identity basis. For example, node c(3V, 5G) and d(3V, 5G) have their coordinates as $x^{(c)}=r(c)=(3,5)$ and $x^{(d)}=r(d)=(3,5)$, so c and d are placed into the same bucket 311 by the RSR 160.

Each bucket B has an attribute B.x as its unique coordinate in the coordinate space. Each coordinate x is typically a D-dimensional vector, i.e., $x=(x_1 \ldots, x_D)$. The $d^{th}$ entry of x, denoted by $x_d$, may be either an integer or a wildcard symbol '*', where '*' represents all possible integers on the $d^{th}$ dimension, $d \in [1,D]$. Each coordinate x may be partitioned into two parts by a splitting index $\mu \in [0, D]$ such that the first $\mu$ entries are integers while the rest (D-$\mu$) entries being '*', as shown in equation (4):

$$x = (x_1, \ldots, x_\mu, x_{\mu+1}, \ldots, x_D) \qquad (4)$$
$$= (x_1, \ldots, x_\mu, *, \ldots, *)$$

In other words, $x_d=*$ if and only if $d>\mu$. For example, (5, 27, *, *) is a coordinate with D=4 and $\mu=2$, so the remaining 2 of the 4 dimensions beyond $\mu$ are expressed using the wildcard symbol '*'.

If $\mu=D$, then the coordinate does not contain any '*', and B.x is called a leaf coordinate and B a leaf bucket 340. If $\mu<D$, then the coordinate has at least one '*', B.x and B being called non-leaf. In the particular case of FIG. 4, which shows a 2-dimensional coordinate space 300 (M=2), the non-leaf buckets having one '*' are the child buckets 335. If $\mu=0$, then all entries of the coordinate are '*', and B is N. N is called the root bucket 330 and N.x=(*, ..., *) are the root coordinates.

Each coordinate naturally corresponds to a subspace in the coordinate space 300. More specifically, leaf coordinates may be regarded as the basic unit in the coordinate space 300, and each coordinate x corresponds to a subspace as a nonempty set of leaf coordinates, as shown on Table IV, which illustrates coordinates and corresponding subspaces:

TABLE IV

| coordinate x | subspace of x |
| --- | --- |
| (6, 4) | {(6, 4)} |
| (6, *) | {(6, 0), (6, 1), (6, 2), (6, 3), (6, 4), (6, 5), ...} |
| (*, *) | set of all lead coordinates |

If x is a leaf, then the subspace of x is {x}, which is a set containing a single coordinate. On FIG. 4, for example, the subspace of coordinate (6,4) is {(6,4)}. If x is a non-leaf, then the subspace of x is a set of many leaf coordinates. On FIG. 4, for example, the subspace of (6,*) is {(6,0),(6,1), (6,2),(6,3),(6,4),(6,5), ...}. The subspace of the root coordinate N.x=(*, ..., *) contains all possible leaf coordinates in the entire coordinate space 300. For simplicity, the present disclosure makes reference to coordinates and subspace of coordinates interchangeably. In particular, set operators are applied to coordinates by implicitly converting each coordinate to its corresponding subspace, for example $(6,4) \subseteq (6,*) \subset (*,*)$.

Thanks to the notion of subspaces for coordinates, each bucket B may be mathematically described in equation (5) by its coordinate B.x:

$$B = \{n \in N | x^{(n)} \subseteq B.x\} \qquad (5)$$

where $x^{(n)}$ denotes the coordinate of node x. In other words, B contains all nodes whose coordinates belong to the subspace of B.x.

General-to-Specific Ordering

Based on the bucket definition in equation. (5), a naturally occurring structure over coordinates translates to a general-to-specific ordering of buckets. Considering two buckets B and B' on FIG. 4 with the following coordinates:

$$B.x=(3,*)$$

$$B'.x=(3,5)$$

The above shows that B.x⊇B'.x. Now considering the elements in B and B', because B.x imposes fewer constraints on its coordinates than B'.x, B contains more elements than B'. In fact, any node in B' will be also in B, B={c,d, g}⊇B'={c,d}. Generally speaking:

$$B.x \supseteq B'.x \Rightarrow B \supseteq B' \qquad (6)$$

It may be noted that reversing the arrow of equation (6) would be incorrect, i.e., although B⊇B' is valid, B.x⊇B'.x is not valid. Considering the possibility of adding a new bucket B' at (2,2) on the coordinate space 300 of FIG. 4:

$$B.x=(3,*), B=\{c,d,g\}$$

$$B'.x=(2,2), B=\emptyset$$

Then B⊇B' is valid, but B.x⊆B' x is not valid.

Therefore, if B.x ⊇B'.x, coordinate B.x (or bucket B) is more general than coordinate B'.x (or bucket B'), and equivalently coordinate B'.x (or bucket B') is more specific than coordinate B.x (or bucket B).

This general-to-specific relation defines a partial order over coordinates, and hence over the corresponding buckets. Advantage of this partial order may be taken to efficiently organize the search for a given node n for each task t.

Implementation details will now be presented.

Fitness of Bucket and Node

In an embodiment, a few basic functions are encapsulated as building blocks of the RSR 160 for more advanced operations. Two fitness functions may be defined in Alg. 2.

Function fit(t,n) checks node n for task t. If fit(t,n) returns true, then it may be said that n fits t or, equivalently, n is fittable for t.

The RSR 160 may use function fit(t,B) to examine bucket B for task t.

Function fit(t,B) returns true if two conditions are met:

$$x^{(t)} \subseteq B.x, \text{ and} \qquad (1)$$

$$B \cap L(t) \neq 0. \qquad (2)$$

If fit(t,B) returns true, then it may be said that the bucket B fits the task t or, equivalently, that the bucket B is fittable for the task t.

According to the functions fit(t,n) and fit(t,B), there may exist a fittable node n E B for the task t if the bucket B fits the tasks t. Conversely, no node n E B may fit the task t if the bucket B is un-fittable for the task t.

In mathematical terms, it is shown that ¬ fit(t,B)⇒ ¬ fit(t,n),∀n∈B). Therefore, the search for the fittable node n for the task t may be made in fittable buckets only, while safely ignoring the un-fittable buckets. In other words, it is sufficient to search for the fittable buckets and there is no need to search further into each node contained in the buckets.

Initialization and Update of $\mathcal{G}=(\mathcal{V},\mathcal{E})$

An embodiment of the present disclosure describes how buckets may be maintained and their general-to-specific relationships in the functions initialize( ) and update( ) of SeqRSA. In this embodiment, global variables are maintained by the RSR 160 for a directed graph $\mathcal{G}=(\mathcal{V},\mathcal{E})$ throughout the entire execution of SeqRSA in Alg. 1. The vertex set $\mathcal{V}$ contains the non-empty buckets at all coordinates, and the edge set $\mathcal{E}$ represents the general-to-specific relation among buckets. It may be said that if B,B'∈ $\mathcal{V}$ and B.x⊇B'.x, then B,B'∈$\mathcal{E}$ is an ordered pair. Based on the implementation of Alg. 1, $\mathcal{G}=(\mathcal{V},\mathcal{E})$ is a tree, and the root of the tree is N coordinated at (*, ..., *). Thanks to $\mathcal{G}=(\mathcal{V},\mathcal{E})$, the problem of bucket scanning iteration may be transformed into a strategy, presented hereinbelow, of graph traversal on $\mathcal{G}=(\mathcal{V},\mathcal{E})$. FIG. 4 illustrates the status of $\mathcal{G}=(\mathcal{V},\mathcal{E})$ where the set of nodes N and the resource function r are given as equation (3).

An algorithm "Alg. 3" implemented in a non-limiting embodiment of the RSR 160 is described in Table V:

TABLE V

Alg. 3: Initialization and Update for SeqRSA

```
1   function initialize ( )
2     foreach n ∈ N do
3       add(n)
4   function update (t, n)
5     if n ≠ NIL then
6       remove(n)
7       r(n) ← r(n) − q(t)
8       add(n)
9   function add(n)
10    x⁽ⁿ⁾ ← φ(r(n))
11    ⟨x[0], x[1], ..., x[D]⟩ ← get a coordinate sequence s.t.
      (x[i] ⊇ x⁽ⁿ⁾) ∧ (x_d[i] = * iff d > i)
12    foreach x[i] sequentially i = 0, ..., D do
13      B[i] ← get B[i] s.t. B[i] ∈ V ∧ B[i].x = x[i]
14      if B[i] == NIL then
15        B[i] ← create a bucket s.t. B[i].x = x[i]
16        V ← V + {B[i]}
17        if i > 0 then
18          ε ← ε + {(B[i−1], B[i])}
19      B[i] ← B[i] + {n}
20   function remove (n)
21     x⁽ⁿ⁾ ← φ(r(n))
22     ⟨x[0], x[1], ..., x[D]⟩ ← get a coordinate sequence s.t.
       (x[i] ⊇ x⁽ⁿ⁾) ∧ (x_d[i] = * iff d > i)
23     foreach x[i] sequentially i = 0, ..., D do
24       B[i] ← get B[i] s.t. B[i] ∈ V ∧ B[i].x = x[i]
25       B[i] ← B[i] − {n}
```

In this embodiment of the RSR 160, Alg. 3 implements the initialization and update of $\mathcal{G}=(\mathcal{V},\mathcal{E})$ for SeqRSA. The function initialize( ) calls a function add(n) for each node n∈N, which adds node n to related buckets in $\mathcal{G}$. The function update( ) updates $\mathcal{G}=(\mathcal{V},\mathcal{E})$ upon each scheduling result (t,n). When a task t is scheduled at a node n, Line 6 removes the node n from $\mathcal{G}=(\mathcal{V},\mathcal{E})$, Line 7 adjusts the availability of node n, and Line 8 re-adds node n into $\mathcal{G}=(\mathcal{V},\mathcal{E})$.

A function B.add(n) adds node n to $\mathcal{G}=(\mathcal{V},\mathcal{E})$. Line 10 computes x(n), the leaf coordinate of node n. With x(n), Line 11 generates a sequence of coordinates $\langle x^{[0]}, x^{[1]}, \ldots, x^{[D]} \rangle$ that follows the general-to-specific partial order, i.e., $(*, \ldots, *)=x^{[0]} \supseteq x^{[1]} \supseteq x^{[D]}=x^{(n)}$. For example, given $x^{(n)}=(3, 5)$, Line 11 would generate a coordinate sequence of $\langle (*,*), (3,*), (3,5) \rangle$. Lines 12-19 iterate through each coordinate $x^{[i]}$ sequentially from i=0 to D. At each scanning iteration, Lines 13-18 get $B^{[i]} \in \mathcal{V}$ at coordinate $x^{[i]}$, and Line 19 adds n into each $B^{[i]}$; in particular, if $\mathcal{G}$ has no bucket at coordinate $x^{[i]}$, then Lines 14-18 would create a vertex $B^{[i]} \in \mathcal{V}$ and an edge $(B^{[i-1]}, B^{[i]}) \in \mathcal{E}$, because $x^{[x-1]} \supseteq x^{[i]}$, i∈[0, D].

A function remove(n) removes node n from $\mathcal{G}=(\mathcal{V},\mathcal{E})$. It follows similar code logic as add(n) except applying node removal (rather than adding n) at each bucket $B^{[i]}$ coordinated at $Bx^{[i]}$. Besides, remove(n) does not create a new bucket in V, which should have been constructed by earlier invocations of add(n).

Sequential Bucket Scanning Iteration for LeastFit

The present disclosure shows how function schedule( ) is implemented in SeqRSA in a non-limiting embodiment of the RSR 160 by leveraging the general-to-specific partial order to iteratively scan through buckets.

The function schedule( ) is formulated hereinabove as the procedure of searching for a fittable node through a sequence of buckets. For a variety of scheduling polices, this search may be efficiently organized by taking advantage of a naturally occurring structure over buckets on top of the coordinate space—a general-to-specific ordering of buckets. An embodiment of the present disclosure focusses on the LeastFit scheduling policy: the generic framework of schedule( ) in Alg. 2 may be followed to efficiently implement functions prepareIter( ) and nextBucket( ) for the outer scanning iteration over buckets.

LeastFit greedily selects the node with the highest availability among the fittable candidates. To clarify the notion of "the highest availability," it is possible to compare the available resource between any two nodes, especially since available resources are described in multiple dimensions. The present disclosure adopts the lexicographical order of vectors for resource availability comparison. In other words, dimensions are ranked in order to allow comparing two instances of resources based on comparisons from the most significant dimension to the least significant dimension. Considering the non-limiting example of two-dimensional resource including vcores and memory, in which vcores are ranked before memory, given two nodes p(6V, 4G) and a(4V, 4G), it may be said that r(p)=(6,4) is lexicographically higher than r(a)=(4,4), written as $(6,4) >_{lex} (4,4)$. This is because in the most significant dimension vcores, p has 6V, which is greater than 4V of a. Similarly, given a(4V, 4G) and b(4V, 2G), it may be said that $r(a)=(4,4) >_{lex} (4,2)=r(b)$, because a and b are equivalent in vcores, but a is greater than b in the second dimension of memory.

In an embodiment, the RSR 160 may traverse the global directed graph $\mathcal{G}=(\mathcal{V},\mathcal{E})$ based on depth-first search (DFS) to systematically look for the fittable leaf bucket with the highest availability. Starting from the root bucket N, $\mathcal{G}=(\mathcal{V},\mathcal{E})$ may be explored by going as deeply as possible and only retreating when necessary. Considering for example a case where the most recently discovered bucket is B, its unexplored neighbors may be explored with a specific order. In particular, a fittable with the lexicographically highest coordinate may be selected, and this translates to the LeastFit scheduling policy that favors higher availability. Once each fittable neighbor B' has been explored, the search may "backtrack" to the ascendants of B until getting to a bucket with unexplored and potentially fittable neighbors. The RSR 160 may resume the search from this point.

For each bucket $B \in \mathcal{V}$, a few attributes may be maintained to keep track of the sequential bucket scanning iteration for LeastFit. First, the neighbor currently being explored may be kept in B.β. Second, each bucket B may be marked according to its current status that, in the present disclosure, is graphically expressed as a "color" applied to each bucket B. Consequently, each bucket B may be colored by B.color. Each bucket B is initially white, becoming grayed when it is discovered, and being blackened when it is finished, i.e., when its neighbors have been examined or skipped completely. Third, each bucket may be time-stamped. Considering FIG. 4, all buckets B are initially white. Then on FIGS. 5a to 5p, which illustrate the progress of LeastFit bucket scanning iterations on the coordinate space of FIG. 4, the various buckets B are successively marked gray and then black. Using a color representation of the buckets B is illustrative, and other manners of marking each bucket B, for example using status flags, are also contemplated.

Each bucket B may have two timestamps: the first timestamp B.discover records when B is first discovered (and grayed), and the second timestamp B.finish records when examining B's neighbors is completed, at which time B is blackened. These timestamps may be integers between 1 and $2|\mathcal{V}|$, since there is at most one discovery event and one finishing event for each of bucket $B \in \mathcal{V}$. For every bucket B, B.discover<B.finish. Bucket B is white before time B.discover, becoming gray between time B.discover and B.finish, becoming black thereafter. Other manners and other information elements may be used to mark the status of the bucket B. Using B.color to mark this status is for illustration purposes and does not limit the generality of the present disclosure.

An algorithm "Alg. 4" implemented in a non-limiting embodiment of the RSR 160 is described in Table VI:

TABLE VI

Alg. 4: Sequential bucket iteration for LeastFit

```
1   function nextBucket ( )
2     upon the first call
3        prepareBucketIter( )
4     if N.color ≠ BLACK then
5        return nextBucketFrom(N)
6     else
7        return B₀
8   function prepareBucketIter ( )
9     time ← 0
10    foreach B ∈ V do
11       B.color ← WHITE
12       B.β ← B∞
13  function nextBucketFrom(B)
14    if B.color = = WHITE then
15       time ← time +1; B.discover = time; B.color ← GRAY //
         B discovered
16    while B.β ≠ B₀ do
17       if B.β ∈ V ∧ B.β.color ≠ BLACK then
18          B_next ← nextBucketFrom(B.β)
19          if B_next ≠ B₀ then
20             return B_next
21       B.β ← nextNeighbor(B)
22    time ← time + 1: B.finish = time:
       B.color ← BLACK // B finished
23    if B is leaf then
24       return B
25    else
26       return B₀
27  function nextNeighbor (B)
28    foreach B' s.t. ((B, B') ∈ ε ) ∧ (B'.x <_lex B.β.x) in
      lexicographically descending order do
29       if fit (t, B') then // exoplore (B, B')
30          return B'
31       else // prime subtree root at B'
32          time ← time + 1: B'.discover = time; B'.color ← GRAY
33          time ← time + 1: B'.finish = time; B'.color ← BLACK
34    return B₀
```

In this embodiment of the RSR 160, Alg. 4 shows the algorithm of sequential bucket scanning iteration for LeastFit. Alg. 4 implements the functions prepareIter( ) and nextBucket( ) for the schedule( ) framework of Alg. 2. Besides, Alg. 4 contains two helper functions nextBucketFrom( ) and nextNeighbor( ) The variable time is a global variable of the RSR 160 that may be used for timestamping.

The function nextBucket( ) returns the next fittable leaf bucket $B \in \mathcal{V}$, and outputs $B_\varnothing$, to indicate the end of bucket scanning iteration. The function nextBucket( ) comprises two parts. In a first part, Lines 2-3 invoke function prepareBucketIter( ) upon a very first nextBucket( ) call for a task t. In a second part, Lines 4-7 operate depending on the color of the root bucket N. If N is not blackened, Line 5 gets the next bucket reachable from N using nextBucketFrom(N); otherwise, Line 7 returns $B_\varnothing$ to terminate the entire bucket scanning iteration.

The function prepareIter( ) prepares the bucket scanning iteration, which may be invoked only once at the beginning. In Alg. 4, Line 9 resets the global time counter. Lines 10-12 color each bucket B white and initialize its neighbor attribute as $B_\infty$, a virtual bucket (i.e., $B_\infty \in \mathcal{V}$ is false) at the coordinate $(\infty, \ldots, \infty)$. It is convenient to use $B_\infty$ as the initial neighbor, because the coordinate of $B_\infty$ is lexicographically higher than that of any bucket $B \in \mathcal{V}$, and the LeastFit scheduling policy expects that the neighbors of a bucket are explored in a descending order.

Function nextBucketFrom(B) returns the next fittable leaf bucket in the tree rooted at B. In each call of nextBucketFrom(B), bucket B is either initially white or gray. If B is white, then Line 15 increments the global variable time, records the new value of time as the discovery time B.discover, and colors B.gray. Lines 16-21 iterate through each neighbor B.β in a specific order based on nextNeighbor( ) and recursively get the next bucket from B.β by calling nextBucketFrom(B.β) if B.β is not black. As each $B.\beta \in \mathcal{V}$ is considered in Lines 16-21, it may be said that edge $(B, B.\beta) \in \mathcal{E}$ is explored by Alg. 4. After every edge leaving B has been explored, Line 22 increments time, record the finishing time in B.fishin, and colors B black. Finally, in Lines 23-26, function nextBucketFrom(B) returns B if B is a leaf and $B_\varnothing$ if it is not. It may be noted that nextBucketFrom(B) may blacken B immediately after coloring it gray, if B is leaf, because a leaf bucket does not have any neighbor, and the while-loop in Lines 16-21 terminates right away.

Function nextNeighbor(B) gets the next fittable neighbor for bucket B based on a lexicographically descending order of the coordinates, which follows the LeastFit scheduling policy. If a neighbor bucket B' does not fit the task t, Lines 32-33 skip bucket B' by recording timestamps and updating colors, so that it is not necessary to explore deeper with this un-fittable bucket.

Figure 5C:
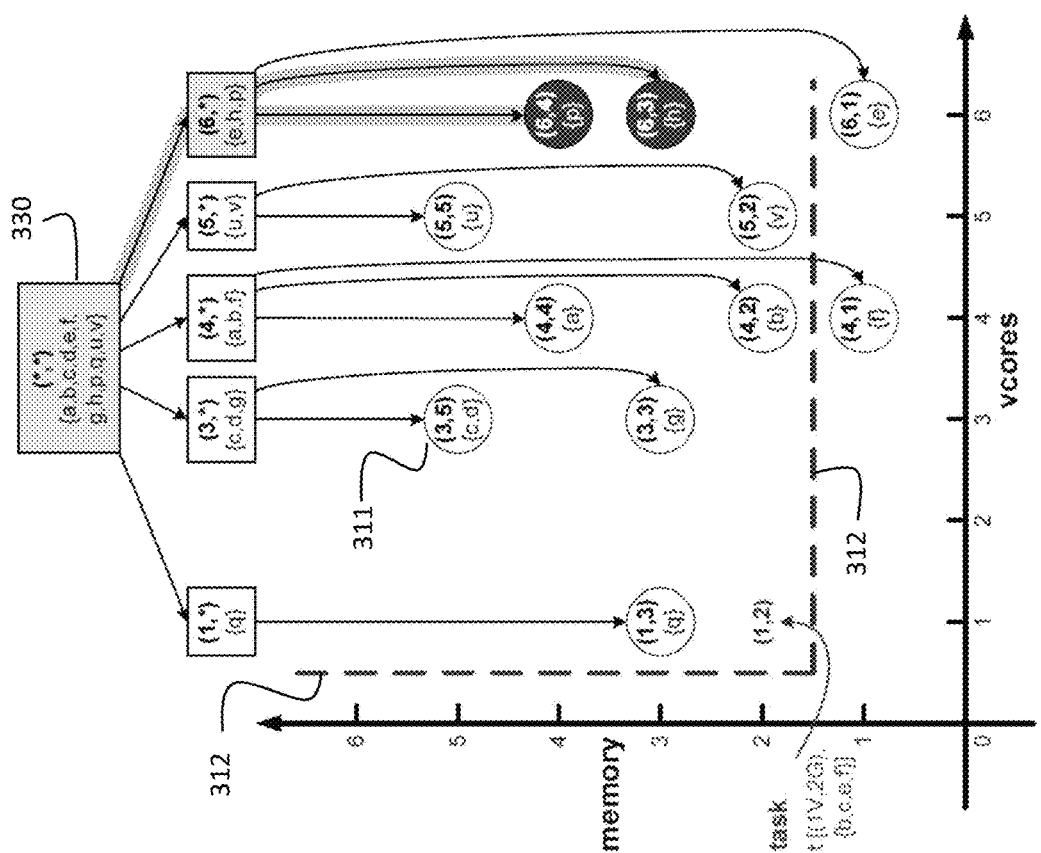
FIGS. 5a to 5p illustrate the progress of LeastFit bucket scanning iterations on the coordinate space of FIG. 4 in accordance with non-limiting embodiments of the present disclosure.
Figure 5D:
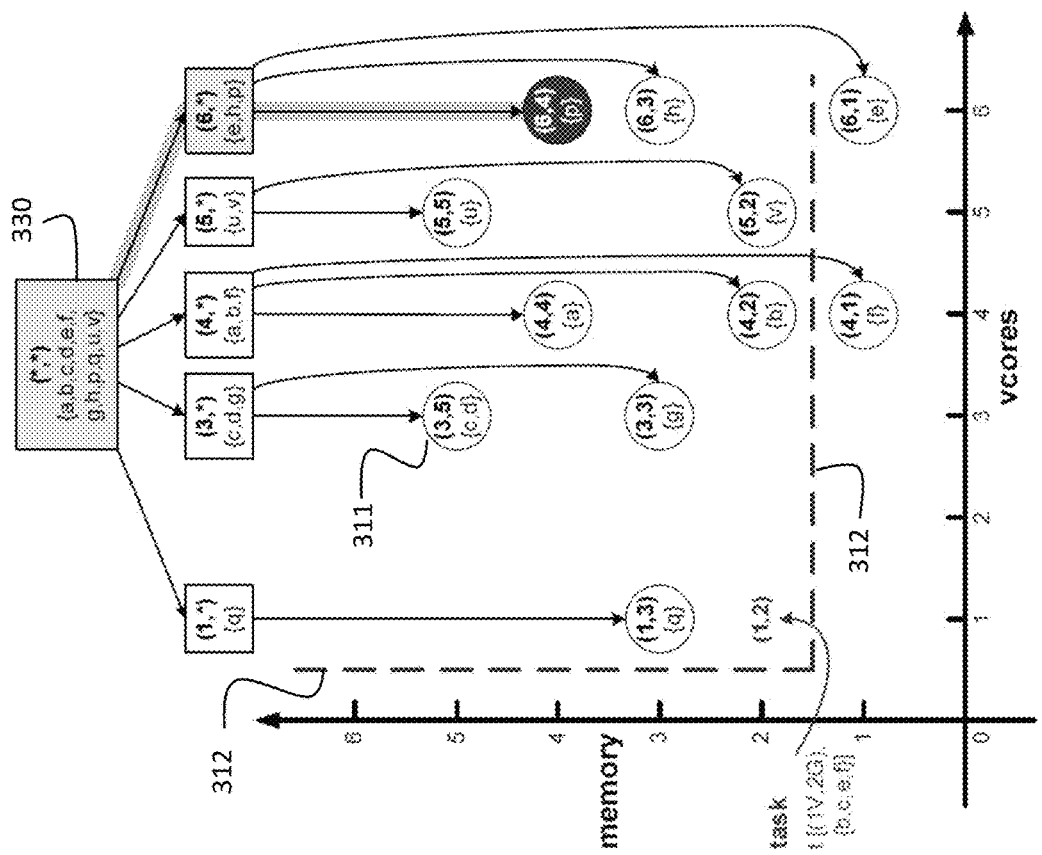
Figure 5F:
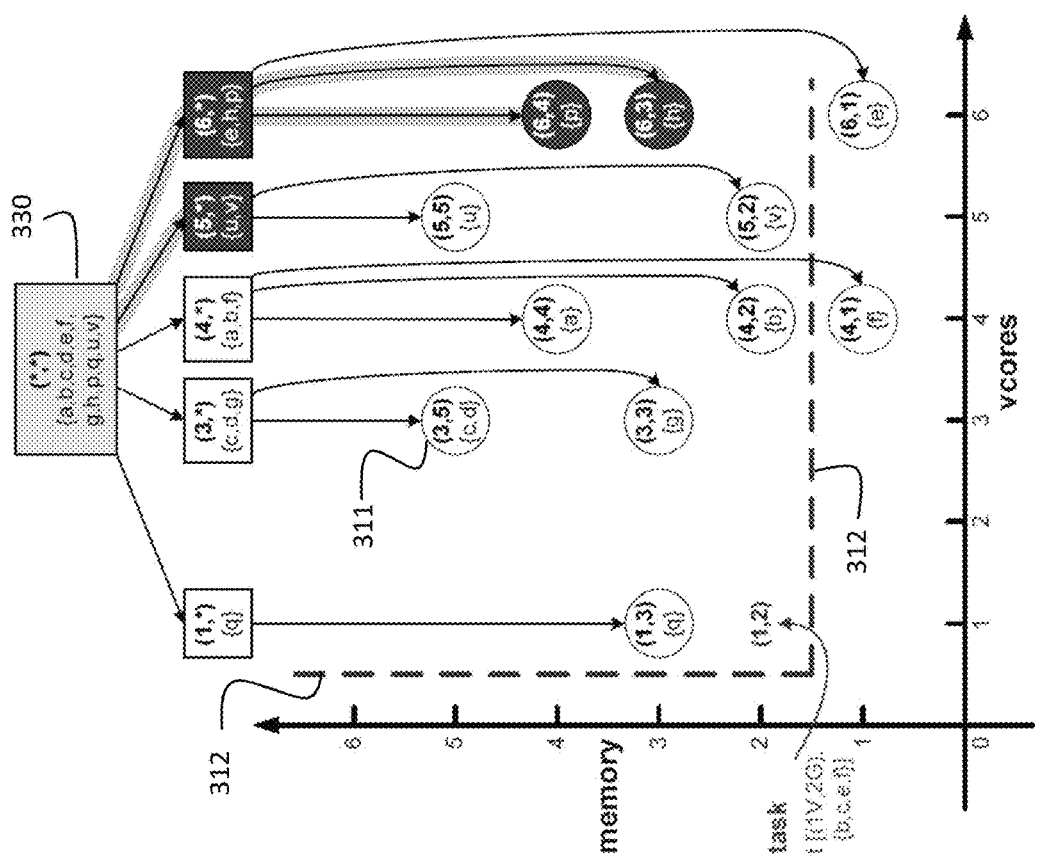
Figure 5E:
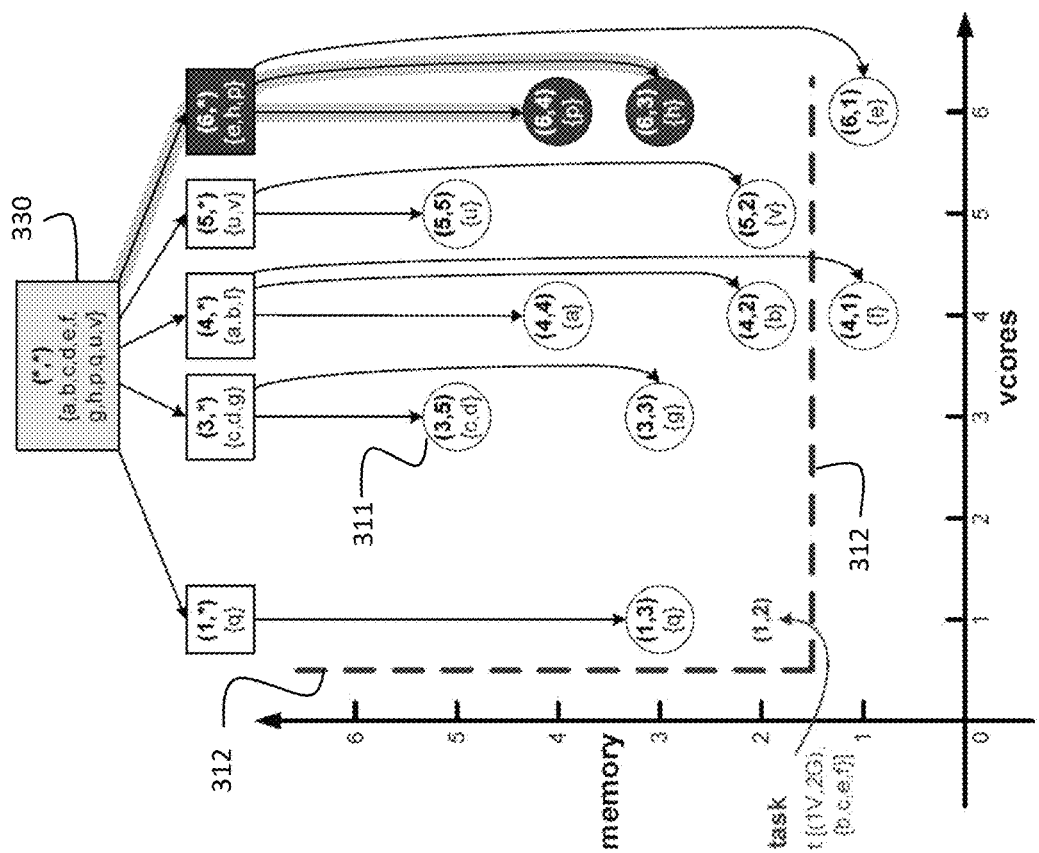
Figure 5L:
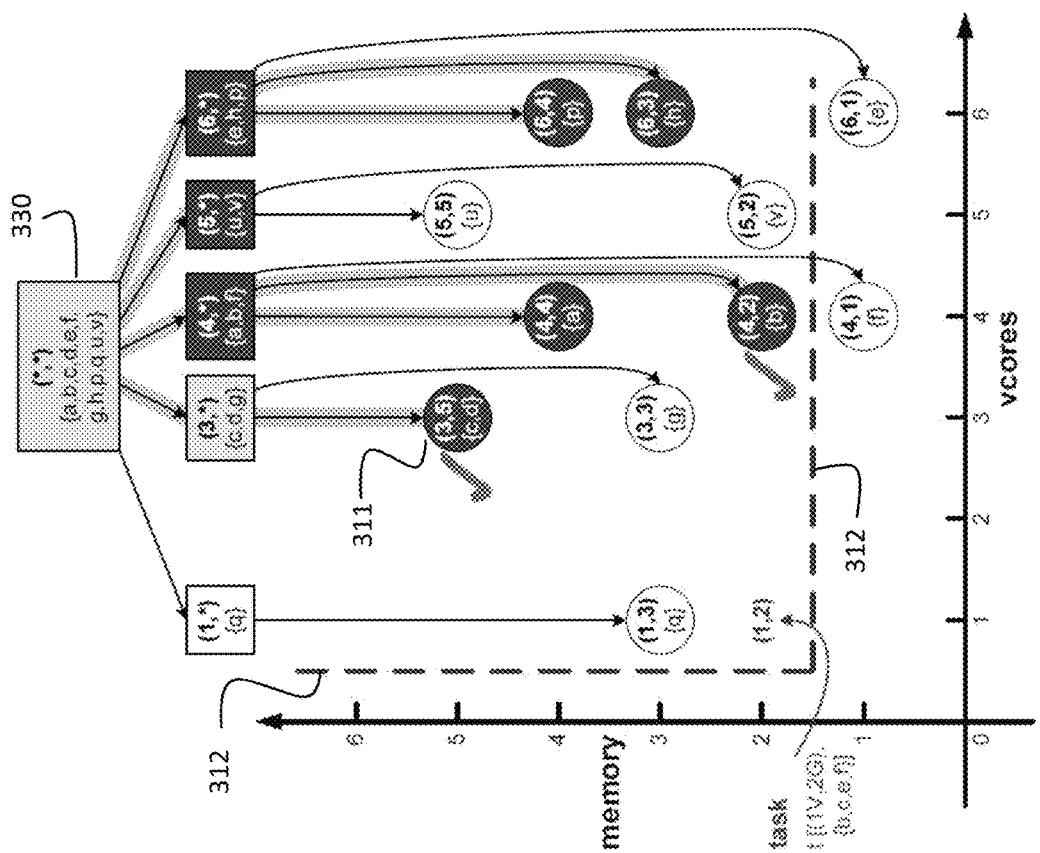
Figure 5K:
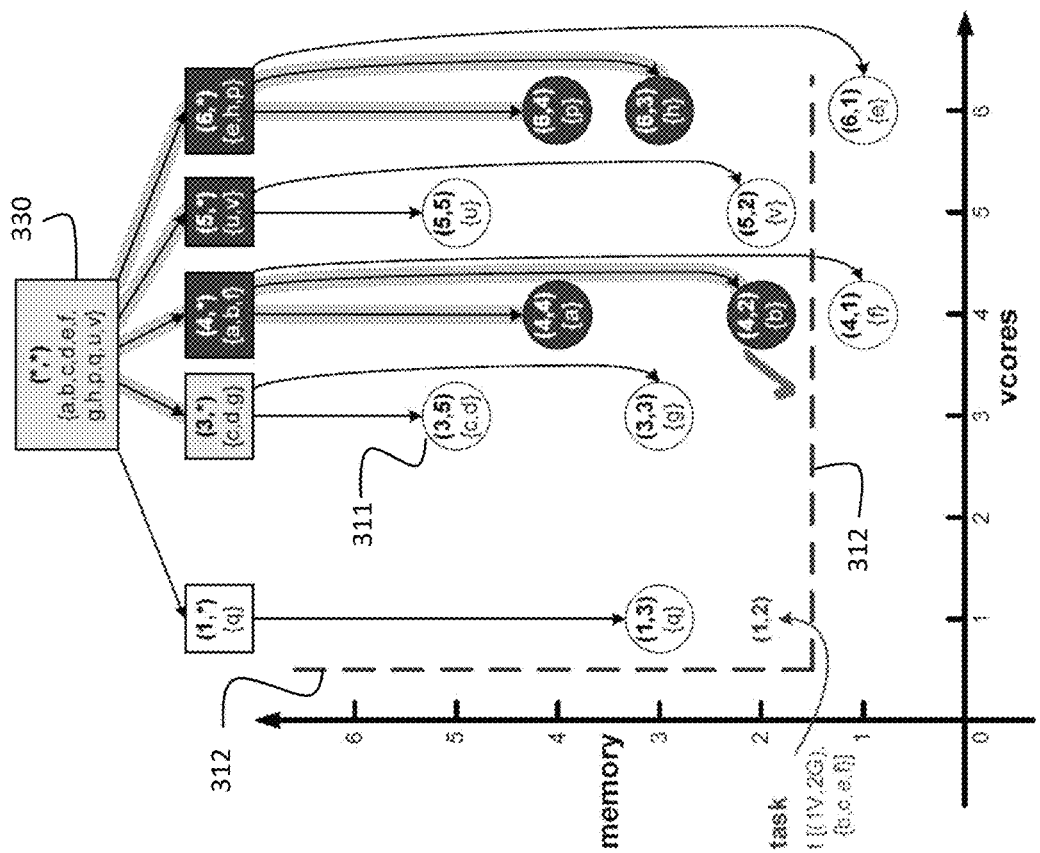
Figure 5N:
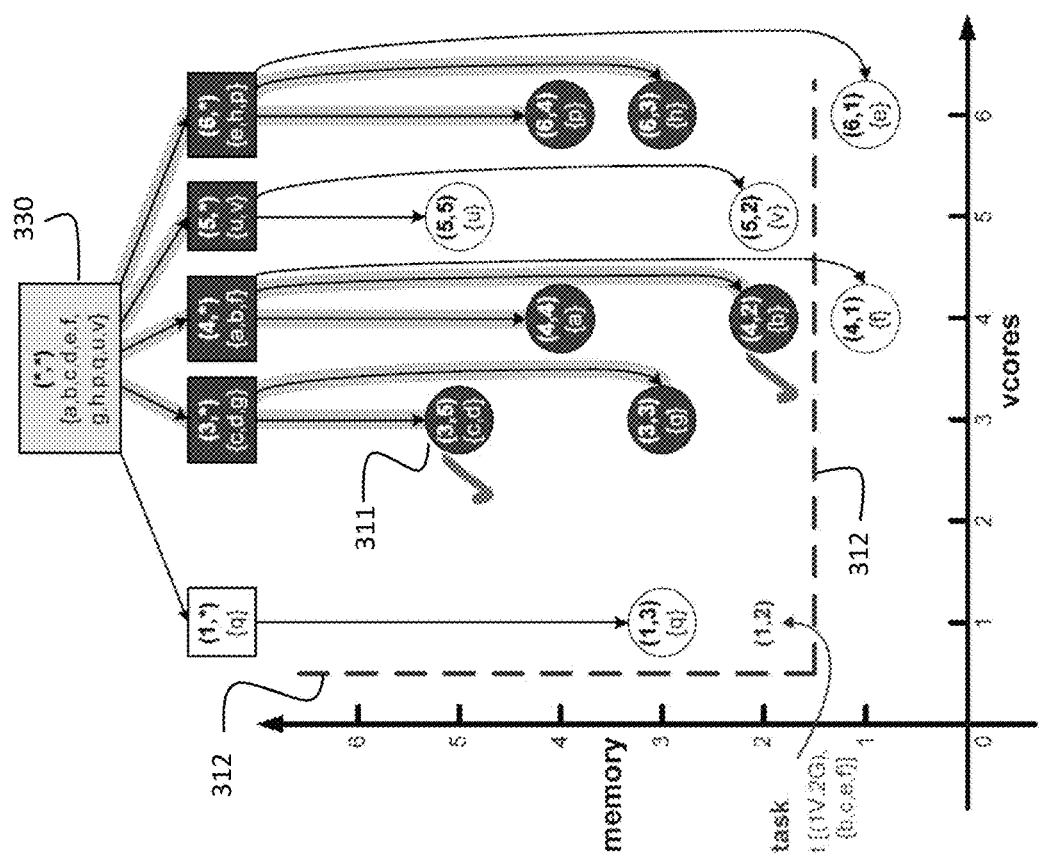
Figure 5M:
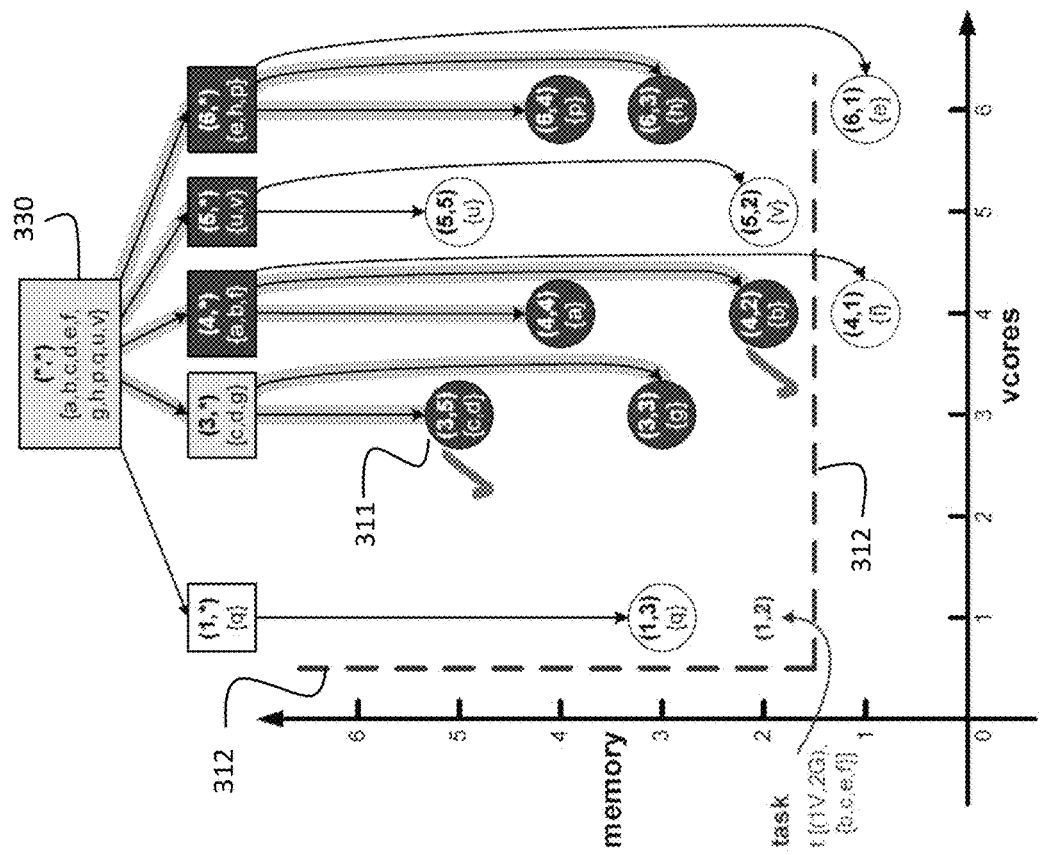
Figure 5P:
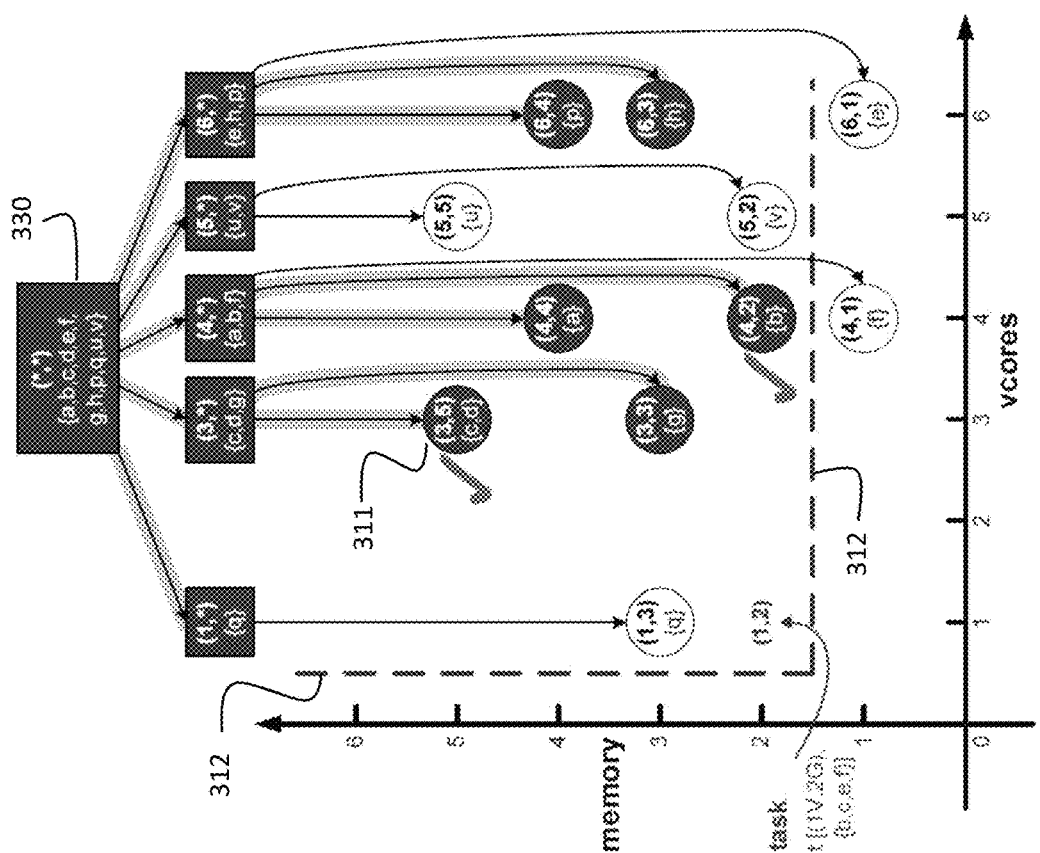
Figure 5O:
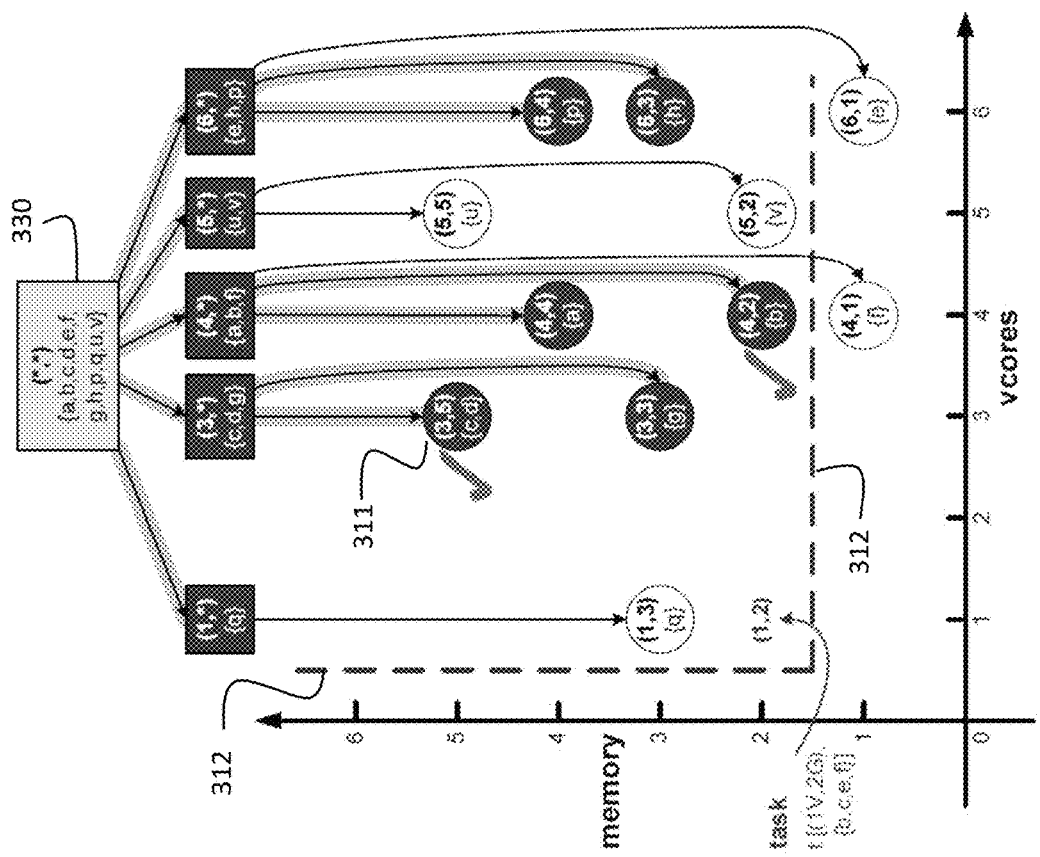

Reference is now made to FIGS. 5a to 5p and, in particular, to FIG. 5f. A child bucket 335 (5,*) in the example of FIG. 5f may be finished (and blackened) immediately after being discovered (and grayed) if B is either a leaf or un-fittable. These gray and black steps on FIGS. 5a to 5p may be combined for simplicity, as shown when considering changes to child 335 (5,*) between FIGS. 5e and 5f. As edges are explored by the RSR 160 using Alg. 4, they are shown as shaded. On FIGS. 5a to 5p, a task t[(1V,2G),{b, c,e,f}] specifies the requested resource q(t)=(1,2), with the candidate set L(t)={b,c,e,f}. Dotted lines 312 are plotted on FIGS. 5a to 5p to illustrate the boundaries for the fittable region of task t, i.e., $\{x | x \supseteq x(t)\}$; otherwise stated, the boundary defined by the dotted lines 312 exclude any node n, and conversely any bucket B, that have less than 1 vcore and 2 GB of memory. Nodes e(6V,1G), f(4V,1G) are excluded from the boundaries defined for the task t because they each have only have 1 GB of memory and do not meet the criteria q(t)=(1,2) for the requested resource.

FIGS. 5a to 5p illustrate three nextBucket( ) calls. Among these, FIGS. 5a to 5i show the steps for a first of these three calls: the LeastFit bucket scanning iteration starts from the root bucket 330 (*, *), which is marked gray on FIG. 5a. The scanning iteration continues on FIG. 5b where the child bucket (6, *) is examined. The RSR 160 notes that node e, which is part of the candidate set, is under the child bucket (6,8). The child bucket (6,*) will therefore be discovered and is marked gray. Then on FIG. 5c, the leaf bucket (6,4) is examined and marked black because although the resources are sufficient to meet the (1,2) requirement, the node p is not part of the candidate set. Likewise, on FIG. 5d, the leaf bucket (6,3) is examined and marked black because the node f is not part of the candidate set. Node e in the leaf bucket (6,1) is part of the candidate set but is outside of the boundaries for the fittable region of task t defined by the dotted lines 312 and is not examined at all. Therefore, FIG. 5e shows that the child bucket (6,*) is blackened following the black marking of all of its leaves within the boundaries.

Then on FIG. 5f, the child bucket at (5,*) is discovered (i.e. grayed) and immediately finished (i.e. blackened) without going deeper because this bucket is examined as unfittable by Function nextNeighbor(B), given that its sole leaf node u is not part of the candidate set. FIG. 5g continues with the graying of the child bucket (4,*), following which FIG. 5h shows that the leaf bucket (4,4) is blackened because node a is not part of the candidate set. FIG. 5i finds the first fittable leaf bucket with the highest availability coordinated at (4, 2) (as illustrated by the tick mark), where node b is part of the candidate set. The leaf (4,2) is finished and blackened. The leaf bucket (4,1) is outside of the boundaries and is not evaluated. The child bucket (4,*) is blackened (FIG. 5j) following the black marking of all of its leaves within the boundaries.

FIGS. 5k and 5l then show the steps for a second of the three nextBucket( ) calls for the task t. This second call returns the second fittable bucket coordinated at (3, 5), as illustrated by the second tick mark added on FIG. 5l. It may be observed that two distinct nodes c and d are in the bucket 311 coordinated at (3, 5), of which node c is part of the candidate set. FIGS. 5m to 5p show the steps for a third of the three nextBucket( ) calls for the task t. The third call returns $B_\varnothing$ because no remaining bucket fulfills the criteria q(t)=(1, 2) for the requested resource. The root bucket at (*,*) is blackened on FIG. 5p and the scanning iterations end.

In Alg. 2 of schedule( ) the RSR 160 does not need to scan through the entire bucket scanning iteration until $B_\varnothing$. Instead, the LeastFit bucket scanning iteration may be terminated at the first fittable bucket that contains at least one fittable node. In the example of FIGS. 5a to 5p, the LeastFit bucket scanning iteration terminates at the first nextBucket( ) call and returns the bucket coordinated at (4,2), where node b is found, at shown on FIG. 5i.

Figure 6:
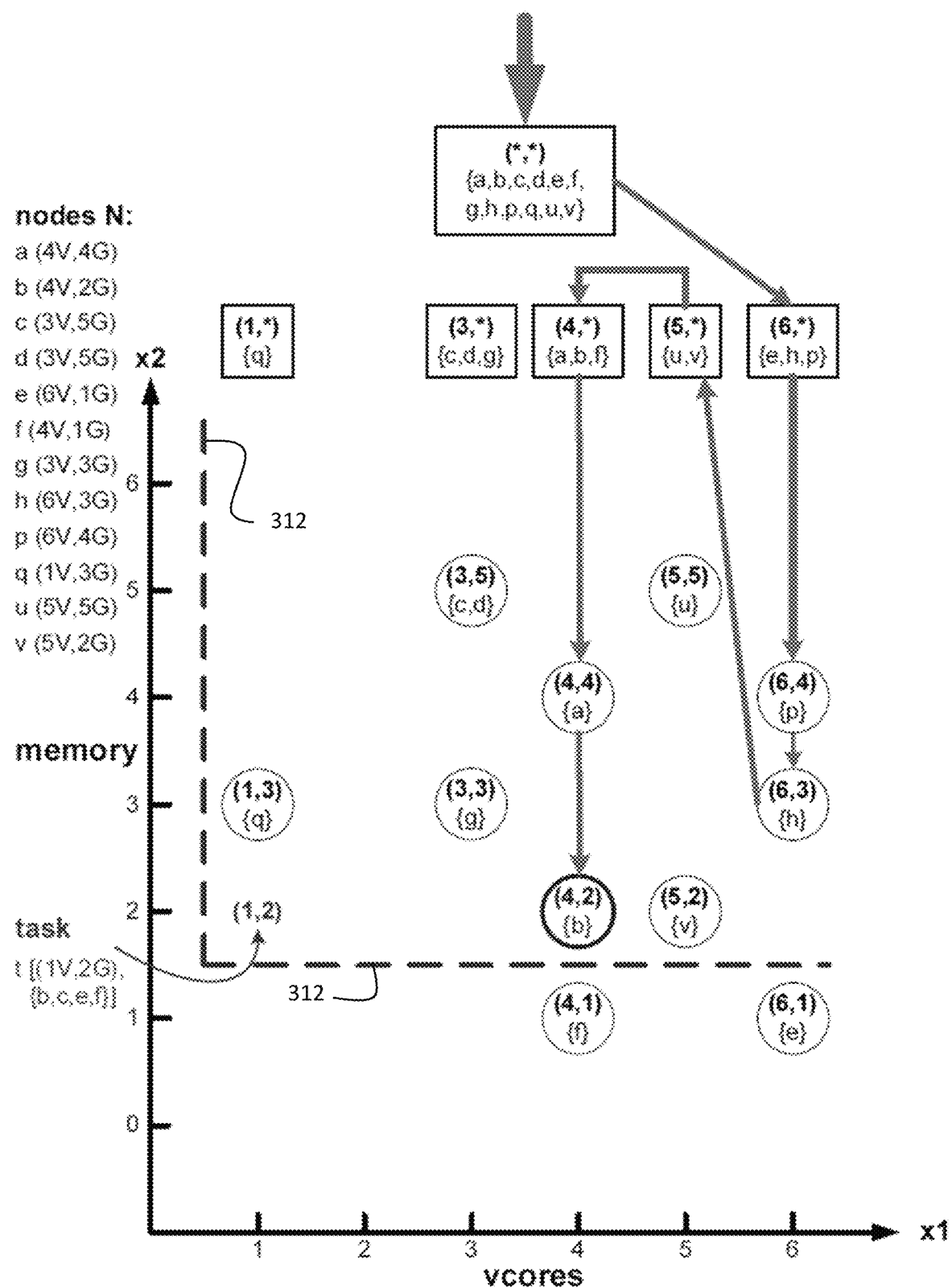
FIG. 6 summarizes the bucket trajectory on FIGS. 5a to 5i.

FIG. 6 summarizes the bucket trajectory on FIGS. 5a to 5i. As shown on FIG. 6, the RSR 160 may connect the buckets based on the timestamps of bucket discovery. Hence, if B1→B2, then discovering B1 occurs before discovering B2 (i.e., B1.discover<B2.discover), and no bucket is discovered during the time period of (B1.discover, B2.discover). It may be noted that to keep FIG. 6 uncluttered, all edges in $\mathcal{E}$ are not shown. FIG. 6 shows that the LeastFit bucket scanning iteration has discovered 8 buckets before returning the first fittable bucket. These 8 buckets were discovered in the following order from FIG. 5a to FIG. 5i: (*,*), (6,*), (6,4), (6,3),(5,*), (4,*), (4,4), and then the first fittable bucket at (4,2).

Positive Caching for Sequential Scanning Iteration

An embodiment of the present disclosure allows shortening the length of bucket trajectory by using a positive cache across different tasks. This embodiment provides an efficient implementation of SeqRSA for the LeastFit scheduling policy. This embodiment further accelerates the sequential scanning iteration. The positive caching process concentrates on the outer loop of Alg. 2 that sequentially iterates through the buckets. Increased efficiency may be obtained when using a positive caching strategy, which may skip unnecessary bucket visits by exploiting scheduling results of previous similar tasks.

The positive caching strategy realizes some form of coalescing across a plurality of tasks. Throughout resource scheduling, a number of task classes (or groups) $\{G_j\}$ are identified and maintained, so that different tasks in the same class exhibit identical or similar characteristics and behavior. Rather than performing sequential scanning iteration for each individual task t, the positive caching process keeps track of the state of sequential scanning iterations per class $G_j$. Therefore, scheduling $t \in G_j$ may utilize the state of sequential scanning iteration for previous tasks in the same class $G_j$, and the result of scheduling a given task t may be leveraged for scheduling a subsequent task t' in $G_j$. The positive cache is the knowledge of classes and their corresponding states for sequential scanning iteration, which is represented as key-value tables. In practice, a positive cache may be implemented by hash, HashMap, dictionary, and/or associative array.

A detailed embodiment of the RSR 160 implementing a positive caching strategy for sequential scanning iteration will now be presented.

Framework for Positive Caching

An embodiment of the present disclosure introduces a common algorithm framework for positive caching. An algorithm "Alg. 5" implemented in a non-limiting embodiment of the RSR 160 is described in Table VII:

TABLE VII

| Alg. 5: schedule ( ) with positive cache for LeastFit |   |
| --- | --- |
| 1 | function schedule (t) |
| 2 | do// Outer iteration across buckets |
| 3 | B ← nextBucket( ) |
| 4 | do// Inner iteration within bucket |
| 5 | n ← nextNode(B) |
| 6 | if fit(t, n) then |
| 7 | putPositive(t, B) |
| 8 | return n |
| 9 | while n ≠ NIL |
| 10 | while B ≠ $B_{518}$ |
| 11 | putPositive(t, $B_{518}$ ) |
| 12 | return NIL |
| 13 | function preparBucketIter ( ) |
| 14 | call prepareBucketIter( ) in Alg. 4 |
|  | // start from cached bucket |
| 15 | $\tilde{B}$ ← getPositive(t):$\tilde{x}$ = $\tilde{B}$.x |
| 16 | if $\tilde{B}$ ≠ NIL ∧ $\tilde{B}$ ≠ $B_0$ then |
| 17 | $(B^{[0]}, B^{[1]}, \ldots, B^{[D]})$ ← get a sequence s.t. $(x^{[i]} \supseteq \tilde{x}) \wedge (x_d^{[i]} = *$ iff $d > i)$, $x^{[i]} = B^{[i]}.x$ |
| 18 | foreach $B^{[i]}$ sequentially i = 0, . . . , D do |
| 19 | time ← time + 1 |
| 20 | $B^{[i]}$.discover ← time |
| 21 | $B^{[i]}$.color ← GRAY |
| 22 | if $B^{[i]}$ is non-leaf then |
| 23 | $B^{[i]}.\beta$ ← $B^{[i+1]}$ |
| 24 | else if $\tilde{B}$ == $B_0$ then |
| 25 | foreach B ∈ V do |
| 26 | B.color ← BLACK |
| 27 | B.β ← $B_0$ |

In this embodiment of the RSR 160, Alg. 5 implements the positive caching strategy by overwriting the functions schedule(t) and prepareBucketIter( ).

The positive cache may be implemented in the RSR 160 using a key-value table with two application programming interface (API) functions putPositive( ) and getPositive( ). In the positive cache, each key uniquely identifies a class of tasks, and a corresponding value records the last bucket of the bucket trajectory for the most recent task in the class. Function putPositive(t, B) updates the key-value entry in the positive cache, and function getPositive(t) finds the class for task t and returns the cached bucket.

In function schedule(t), Line 7 and 11 update the positive cache based on the scheduling outcome for task t.

In the function prepareBucketIter( ), Line 14 first calls the prepareBucketIter( ) described in Alg. 4. Then, Line 15 obtains $\tilde{B}$ from the positive cache so that scheduling of a new task t may reuse the scheduling results of earlier tasks. With regard to $\tilde{B}$, Lines 16-27 update timestamp, color and current neighbor for a number of related buckets in $\mathcal{V}$. If $\tilde{B}$ is neither NIL nor $B_\oslash$, Lines 16-23 get all buckets on the path from the root N to $\tilde{B}$ and mark them discovered. If $\tilde{B}$ is $B_\oslash$, then no node would fit t, and thus Lines 24-27 blacken all nodes. If $\tilde{B}$ is NIL, then the positive cache does not provide any useful information for the new task t, and prepareBucketIter( ) is not used.

Concrete implementations of the two positive cache API functions for different strategies are presented hereinbelow.

Hard Positive Caching

An embodiment of the present disclosure introduces a variant of the RSR 160 implementing a straightforward method to group tasks based on hard constraints of equivalent requests and locality preferences.

Using the hard positive caching, the RSR 160 classifies tasks based on equal resource requests and locality preferences. Tasks t and t' belong to the same class if and only if $(q(t)=q(t') \wedge L(t)=L(t'))$. Scheduling tasks in the same class output similar bucket trajectories, which may be shared to reduce redundant scanning iterations.

An algorithm "Alg. 6" implemented in a non-limiting embodiment of the RSR 160 is described in Table VIII:

TABLE VIII

| | Alg. 6: Hard positive caching for LeastFit |
|---|---|
| 1 | function getPositiveHard(t) |
| 2 | e ← get entry e ∈ $\mathcal{H}^+$ s.t. q. = q(t) ∧ e.L = L(t) |
| 3 | if e ≠ NIL then |
| 4 | return e.B |
| 5 | return NIL |
| 6 | function putPositiveHard (t, B) |
| 7 | e ← get entry e ∈ $\mathcal{H}^+$ s.t. e.q = q(t) ∧ e.L = L(t) |
| 8 | if e ≠ NIL then |
| 9 | e.B ← B |
| 10 | else |
| 11 | add to $\mathcal{H}^+$ a new entry [q(t), L(t); B] |

In this embodiment of the RSR 160, Alg. 6 implements a hard positive caching strategy. A global key-value store H+ may be maintained. Both resource request and locality preference may be used as the key H+ to uniquely identify each class of tasks, so the corresponding value is the most recent selected bucket for scheduling such tasks. Let e be an entry in H+, i.e., e∈H+, then the entry may be represented in the form of e=[e.q,e.L; e.B], where ';' is used to separate key and value of the entry and ',' is used to separate different components of the key or the value.

In Alg. 6, a function getPositiveHard( ) attempts to find the cached entry∈H+, under a hard condition defined according to equation (7):

$$e.q=q(t) \wedge e.L=L(t) \qquad (7)$$

A function putPositiveHard( ) modifies or adds an entry [q(t),l(t);B] *l* in H+ It may be noted that functions getPositiveHard( ) and putPositiveHard( ) each incur a runtime cost of O(1) per invocation.

Figure 7:
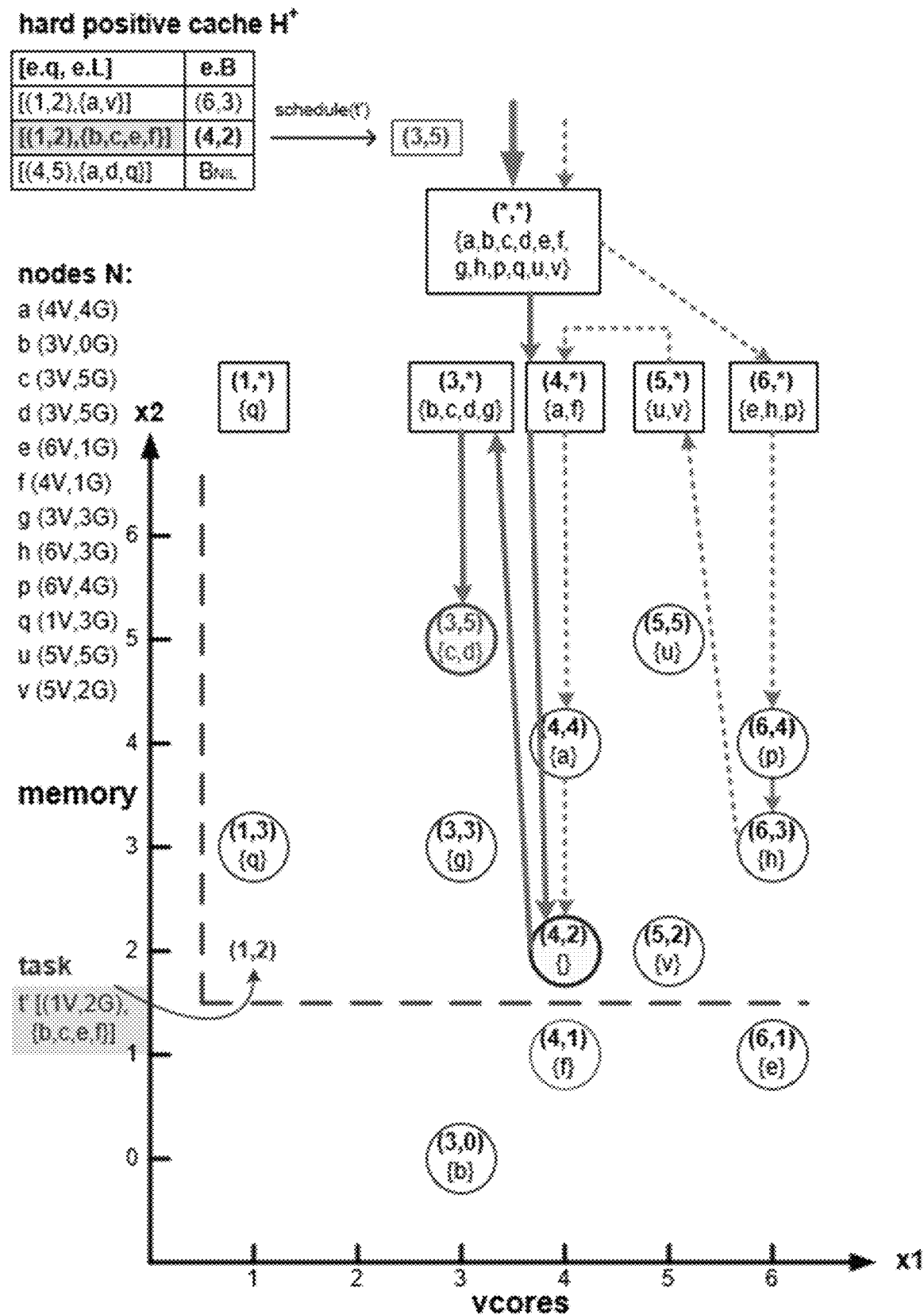
FIG. 7 illustrates a reduced bucket trajectory obtained using a positive caching strategy in accordance with non-limiting embodiments of the present disclosure.

For example, given a task sequence T= ⟨ t,t' ⟩ with t[(1V,2G),{b,c,e,f}] and t'[(1V,2G),{b,c,e,f}], FIG. 6 shows the bucket trajectory adopted by the RSR 160 for scheduling t (i.e. the sequence shown in FIGS. 5*a* to 5*i*). In contrast with FIG. 6, FIG. 7 illustrates a reduced bucket trajectory obtained when the RSR 160 uses a positive caching strategy. In more details, the reduced bucket trajectory for scheduling t' immediately after t is illustrated on FIG. 7. A slight difference between the global $\mathcal{G}$'s on FIGS. 5 and 6 may be noted: on FIG. 7, the RSR 160 has moved node b from the leaf (4,2) to a newly created leaf (3, 0). Given that task t has been scheduled at node b and consumes 1 vcore and 2 GB of memory, remaining resources available at node b are limited to (3,0) (i.e. 3 vcores and no memory left). As shown, there is no node left at (4,2). Comparing FIGS. 6 and 7, the RSR 160 rapidly locates the node c from the leaf (3,5) by using the knowledge, stored in the positive cache, that scheduling of t had been found in a leaf node under the child (4,\*), which was marked gray but not blackened in FIG. 5*i*.

Soft Positive Caching

In another embodiment of the present disclosure, the RSR 160 uses positive caching with soft constraints to encourage sharing across different classes with similar properties.

In the hard positive caching described hereinabove, a number of tasks within each class have equal resource requests and locality preferences. This other embodiment of the RSR 160 uses a form of soft positive caching that also encourages to explore classes with similar properties, so that scheduling results may be shared across different classes regardless of slight differences among tasks. Soft positive caching may be understood as applying some sort of clustering on top of hard-constrained classes to better share scheduling results.

An algorithm "Alg. 7" implemented in a non-limiting embodiment of the RSR 160 is described in Table IX:

TABLE IX

| | Alg. 7: Soft positive caching for LeastFit |
|---|---|
| 1 | function getPositivesoft (t) |
| 2 | E ← {e ∈ S+ |e.q = q(t) ∧ |e.L| ≥ |L(t)|} |
| 3 | foreach e ∈ E in an ascending order of |e.L| do |
| 4 | if e.L ⊇ L(t) then |
| 5 | return e.B |
| 6 | return NIL |
| 7 | function putPositiveSoft (t, B) |
| 8 | e ← get entry e ∈ S+ s.t. e.q = q(t) ∧ e.L = L(t) |
| 9 | if e ≠ NIL then |
| 10 | e.B ← B |
| 11 | else |
| 12 | add to S+ a new entry [q(t), L(t); B] |
| 13 | if |S+| ≥ K then |
| 14 | remove from S+ then least recently used entry |

In this embodiment of the RSR 160, Alg. 7 presents the soft positive caching strategy. As in the case of hard positive caching in Alg. 6, a global key-value store S+ may be maintained with entries of the form e=[e.q,e.L; e.B]. A function getPositiveSoft(t), attempts to find a cached entry e∈S+ under a soft condition defined in equation (8):

$$e.q=q(t) \wedge e.L \supseteq L(t) \qquad (8)$$

To efficiently perform such entry search, entries in S+ are organized differently than in H+. H+ simply maintains a hashmap from key [e.q,e.L] to value e.B. In contrast, S+ maintains all entries with a hierarchy of indexing. In S+, entries are first classified by e.q. Entries with the same e.q are then sorted based on the size of the locality set |e.L|. Then a hasmap is maintained from e.L to e.B.

In function getPositiveSoft( ) Line 2 computes E, which is a subset of entries in S+ that may satisfy the soft condition. Lines 3-5 check each entry e∈E one by one. If some entry e∈E satisfies the soft condition in Line 4 according to equation (8), then the cached bucket of this entry may be returned for scheduling task t. It may be noted that the time complexity of getPositiveSoft( ) is no longer O(1) but O(|E|)=O(|S$^+$|). As a result, a least recently used cache replacement policy may be applied to control the size of S$^+$ in Lines 13 and 14 of the function putPositiveSoft(t, B).

In another use case, on FIG. 7, t' is [(1V,2G),{b,c}] instead of [(1V,2G),{b,c,e,f}]. In that particular case, the hard positive caching in Alg. 6 would return NIL, because H$^+$ does not contain a key [(1V,2G),{b,c}]. In contrast, by using the soft positive caching in Alg. 7, the cached entry at key [(1V,2G),{b,c,e,f}] for t'[(1V,2G),{b,c}] may be leveraged at the cost of scanning a subset of entries in S.

Soft Positive Caching with Contextual Knowledge

An embodiment of the present disclosure shows how positive caching may take advantage of some prior knowledge, such as a context function to label tasks.

In practice, tasks may be classified or clustered based on some contextual knowledge a priori. Assuming that access is given to a contextual function to label tasks, i.e., c(t):T→{1, . . . , C}, tasks with the same label having similar resource requests and locality preferences.

It is common that tasks of the same job exhibit similar resource requests and locality preferences. For example, in Big Data or cloud computing systems with a set of shared resource nodes, multiple jobs frequently run in parallel, and each job (for example and without limitation MapReduce jobs or Spark jobs) is composed of many tasks. In such cases, the contextual function c may be defined by the job tag of each task. For example, if t1 and t2 come from the same job j0, then c(t1)=c(t2)=j0.

An algorithm "Alg. 8" implemented in a non-limiting embodiment of the RSR 160 is described in Table X:

TABLE X

| | Alg. 8: Soft positive caching with contextual knowledge |
|---|---|
| 1 | function getPositiveContext (t) |
| 2 | E ← {e ∈ C$^+$ |e.c = c(t) ∧ e.q = q(t) ∧ |e.L| ≥ |L(t)|} |
| 3 | foreach e ∈ E in an ascending order of |e.L| do |
| 4 |   if e.L ⊇ L(t) then |
| 5 |     return e.B |
| 6 | return NIL |
| 7 | function putPositiveContext (t, B) |
| 8 | e ← get entry e ∈ C$^+$ s.t. e.c = c(t) ∧ e.q = q(t) ∧ e.L = L(t) |
| 9 | if e ≠ NIL then |
| 10 |   e.B ← B |
| 11 | else |
| 12 |   add to C$^+$ a new entry [c(t), q(t), L(t); B] |

In this embodiment of the RSR 160, Alg. 8 presents a soft positive caching that leverages a context labelling function.

As in the cases of Alg. 6 and Alg. 7, a global key-value store C$^+$ may be maintained in Alg. 8. There are however two main distinctions. First, a global key-value store C$^+$ is maintained, in which entries are of the form e=[e.c,e.q,e.L; e.B]. As a result, one or more entries are retrieved by an additional index e. c in Line 2 and Line 8 of Alg. 8. In particular, function getPositiveContext(t) attempts to find a cached entry e∈C$^+$ under a soft condition with contextual knowledge according to equation (9):

$$e.c=c(t) \wedge e.q=q(t) \wedge e.L \supseteq L(t) \quad (9)$$

An embodiment may omit a cache replacement policy to confine the cache size of C$^+$ because entries are searched within the same job. It is safe to assume that each job has limited numbers of resource requests and of locality preferences, so the running time of getPositiveContext(t) and putPositiveContext(t) is O(1).

If there is a new task t[(1V,2G),{b,c}] with c(t)=j$_2$, given C$^+$ as shown in Table XIX (below), Alg. 8 will rapidly find a cached entry e with e.c=j$_2$∧e.q=(1,2)∧|e.L|=4∧e.L={b, c,e,f} for this new task t and use the cached bucket for scheduling of the new task.

Combining Multiple Strategies

An embodiment of the present disclosure introduces more advanced strategies to combine multiple positive caching strategies. An algorithm "Alg. 9" implemented in a non-limiting embodiment of the RSR 160 is described in Table XI:

TABLE XI

| | Alg. 9: Combined postive caching |
|---|---|
| 1 | function getPositiveCombined (t) |
| 2 | B ← getPositiveHard(t) |
| 3 | if B == NIL then |
| 4 |   return getPositiveSoft(t) |
| 5 | else |
| 6 |   return B |
| 7 | function putPositiveCombined (t,B) |
| 8 | putPositiveHard(t, B) |
| 9 | putPositiveSoft(t, B) |

In this embodiment of the RSR 160, Alg. 9 maintains both a hard positive cache H$^+$ and a soft positive cache S$^+$. The soft positive cache S$^+$ may be queried if the hard positive cache H$^+$ returns NIL for a particular task t.

Negative Cache for Random Scanning Iteration

Positive caching to accelerate sequential scanning iteration is described hereinabove. However, there are use cases in which remembering the last randomly selected element may not provide useful information for a next random selection.

In an embodiment of the present disclosure, the RSR 160 may use a negative cache, which may be implemented for random scanning iteration. As in the case of positive caching, a number of task classes (or groups) {G$_j$} may be identified and maintained by the RSR 160. However, instead of remembering the last selection, the negative cache keeps a record of the buckets that have been tried and failed to meet the requirements of a task. This strategy may reduce the number of scanning iterations in the random search.

Framework for Negative Caching

An algorithm "Alg. 10" implemented in a non-limiting embodiment of the RSR 160 is described in Table XII:

TABLE XII

| | Alg. 10: schedule( ) with negative cache |
|---|---|
| 1 | function schedule (t) |
| 2 | L$^-$ ← getNegative(t) |
| 3 | L(t) ← L(t) − L$^-$ |
| 4 | do// Outer iteration across buckets |
| 5 |   B ← nextBucket( ) |
| 6 |   do// Inner iteration within bucket |
| 7 |     n ← nextNode(B) |
| 8 |     if fit(t, n) then |
| 9 |       return n |
| 10 |     else |
| 11 |       putNegative(t, n) |
| 12 |   while n ≠ NIL |
| 13 | while B ≠ B$_0$ |
| 14 | return NIL |

In this embodiment of the RSR 160, Alg. 10 shows the function schedule( ) with negative caching that improves the inner loop for random node selection. The negative cache may be implemented as a key-value table with two API functions putNegative( ) and getNegative( ). In the negative cache, each key uniquely identifies a class of tasks, and the corresponding value is a set of nodes that have been checked to be un-fittable for this class of tasks. Function putNegative (t, n) updates the key-value entry in the negative cache, and function getNegative(t) finds the class for task t and returns the negative node set for the class.

Hard Negative Caching

An algorithm "Alg. 11" implemented in a non-limiting embodiment of the RSR 160 is described in Table XIII:

TABLE XIII

| | Alg. 11: Hard negative caching for LeastFit |
|---|---|
| 1 | function getNegativeHard (t) |
| 2 | e ← get entry e ∈ $\mathcal{H}^-$ s.t. e.q = q(t) |
| 3 | return e.L$^-$ |
| 4 | function putNegativeHard (t, n) |
| 5 | e ← get entry e ∈ $\mathcal{H}^-$ s.t. e.q = q(t) |
| 6 | if e ≠ NIL then |
| 7 | e.L$^-$ ← e.L$^-$ + {n} |
| 8 | else |
| 9 | add to $\mathcal{H}^-$ a new entry [q(t); {n}] |

In this embodiment of the RSR 160, Alg. 11 implements the hard negative caching strategy. A global key-value store H$^-$ may be maintained such that each entry e∈H$^-$ is in the form=[e.q; e.L$^-$], wherein e.q is resource request of tasks, and e.L$^-$ is the negative set of nodes for such tasks. The entry in the negative cache indicates that the node n∈e.L$^-$ is not fittable for tasks with resource request e.q. A function getNegativeHard(t) attempts to find a cached entry e∈H$^-$ under a hard condition defined in equation (10):

$$e.q = q(t) \quad (10)$$

A function putNegativeHard(t) modifies or adds an entry [q(t); L$^-$]. It may be noted that functions getNegative-Hard( ) and putNegativeHard( ) each incur a runtime cost of O(1) per invocation.

With H$^-$, Lines 2-3 of Alg. 10 update the candidate set of task t by removing the negative node set that corresponds to q(t). Besides, in Line 11 of Alg. 10, an un-fittable node n may be added to H$^-$ when fit(t,n) fails.

In contrast with FIG. 6, which shows the bucket trajectory without cache, FIG. 8 illustrates a reduced bucket trajectory obtained using a negative caching strategy. On FIG. 8, given a task t[(1V,2G),{b,c,e,f}] and a negative cache with three entries, the candidate set of t may be updated by L(t)={b, c,e,f}−{e,f}={b,c}. As a consequence, it is not necessary to go deeper along bucket at (6,*), because none of the nodes in bucket (6,*) is in the updated L(t). As in the case of FIG. 5f, bucket (5,*) is not examined because it does not relate to any node of the candidate set {b,c}.

Soft Negative Caching

An algorithm "Alg. 12" implemented in a non-limiting embodiment of the RSR 160 is described in Table XIV:

TABLE XIV

| | Alg. 12: Soft negative caching for LeastFit |
|---|---|
| 1 | function getNegativeSoft (t) |
| 2 | E ← {e ∈ S$^-$ \|e.q ≤ q(t)} |
| 3 | return ∪$_{e \in E}$ e.L$^-$ |
| 4 | function putNegativeSoft (t, n) |
| 5 | e ← get entry e ∈ S$^-$ s.t. e.q = q(t) |
| 6 | if e ≠ NIL then |
| 7 | e.L$^-$ ← e.L$^-$ + {n} |
| 8 | else |

TABLE XIV-continued

| | Alg. 12: Soft negative caching for LeastFit |
|---|---|
| 9 | add to S$^-$ a new entry [q(t); {n}] |
| 10 | if \|S$^-$\| ≥ K then |
| 11 | remove from S$^-$ the least recently used entry |

In this embodiment of the RSR 160, Alg. 12 presents soft negative caching. Similar to hard negative caching in Alg. 11, a global key-value store S$^-$ may be maintained with entries of the form e=[e.q; e.L$^-$].

A function getNegativeSoft(t) selects E, which is a subset of cached entries e∈S$^-$ in Line 2, under a soft condition defined in equation (11):

$$e.q \leq q(t) \quad (11)$$

Then Line 3 of getNegativeSoft(t) returns the union of all entries' cached negative node sets, i.e., ∪$_{e \in E}$e.L$^-$. The time complexity of getNegativeSoft( ) is no longer of O(1), but O(\|E\|)=O(\|S$^-$\|). A cache replacement policy, for example a least recently used cache replacement policy, may be applied in Line 11 of function putNegativeSoft(t, n) to control the size of S$^-$.

When a new incoming task [(1V,3G),{b,c,e,f} is submitted, assuming a negative cache content as shown in Table XX (below), the hard negative caching of Alg. 11 would return NIL, because H$^-$ does not contain a key (1, 3). In contrast, by using the soft negative caching of Alg. 12, Line 2 constructs E with one cached entry e s.t. e.q=(1, 2), and Line 3 returns {e,f}. Consequently, task t may be updated from [(1V, 3G),{b,c,e,f}] to [(1V,3G),{b,c}] reducing its candidate set by 2 nodes. It may be observed that this comes with a cost for scanning S$^-$ for computing E.

Soft Negative Caching with Contextual Knowledge

In practice, it is possible to classify or cluster a number of tasks based on some a priori contextual knowledge. For example, access may be given to a contextual function to label tasks, i.e., c(t): T→{1, . . . , C}, and tasks with the same label may have similar resource requests and locality preferences, for example for Big Data or cloud computing applications.

An algorithm "Alg. 13" implemented in a non-limiting embodiment of the RSR 160 is described in Table XV:

TABLE XV

| | Alg. 13: Soft negative caching with contextual knowledge |
|---|---|
| 1 | function getNegativeContext (t) |
| 2 | E ← {e ∈ C$^-$ \|e.c = c(t) ∧ e.q ≤ q(t)} |
| 3 | return ∪$_{e \in E}$ e.L$^-$ |
| 4 | function putNegativeContext (t, B) |
| 5 | e ← get entry e ∈ C$^-$ s.t. e.c = c(t) ∧ e.q = q(t) |
| 6 | if e ≠ NIL then |
| 7 | e.L$^-$ ← e.L$^-$ + {n} |
| 8 | else |
| 9 | add to C$^-$ a new entry [c(t), q(t); {n}] |

In this embodiment of the RSR 160, Alg. 13 presents soft negative caching that leverages a context labelling function.

Alg. 13 is similar to Alg. 12 with the following exceptions. First, a global key-value store C$^-$ may be maintained, in which entries are of the form e=[e.c, e.q; e.B]. One or more entries are retrieved by an additional index e.c in Line 2 and Line 5. In particular, function getNegativeContext(t) collects all cached entries e∈S$^-$ under a soft condition with contextual knowledge defined in equation (12):

$$e.c = c(t) \land e.q < q(t) \quad (12)$$

Second, an embodiment may omit a performance cache replacement policy to confine the cache size of $C^-$ because entries are searched within the same job. It is safe to assume that each job has limited numbers of resource requests and of locality preferences. The running time of getNegativeContext( ) and putNegativeContext( ) is O(1), When a new task $t[(1V,3G),\{b,c\}]$ is submitted with $c(t)=j_1$, and $C^-$ is as presented in Table XXI (below), given the contextual labeling, function getNegativeContext(t) in Alg. 8 quickly collects cached entries based on the soft condition with contextual knowledge, i.e., $E=\{e \in C^-=j_1 \wedge e.q<(1,3)\}$. Line 2 constructs E with one cached entry e s.t. $e.c=j_1 \wedge e.q=(1,2)$, and Line 3 returns $\{e,f\}$. Consequently, task t may be updated from $[(1V,3G),\{b,c,e,f\}]$ to $[(1V,3G),\{b,c\}]$, reducing its candidate set by 2 nodes.

Combining Multiple Strategies

The above hard and soft strategies may also be combined. For example, an algorithm "Alg. 14" implemented in a non-limiting embodiment of the RSR 160 is described in Table XVI:

TABLE XVI

| | Alg. 14: Combined negative caching |
|---|---|
| 1 | function getNegativeCombined (t) |
| 2 | $L^- \leftarrow$ getNegativeHard(t) |
| 3 | if $L^-$ == NIL then |
| 4 | return getNegativeSoft (t) |
| 5 | else |
| 6 | return $L^-$ |
| 7 | function putNegativeCombined (t, n) |
| 8 | putNegativeHard(t, n) |
| 9 | putNegativeSoft(t, n) |

In this embodiment of the RSR 160, Alg. 14 maintains both a hard negative cache $H^-$ and a soft negative cache $S^-$. The soft negative cache $S^-$ may be queried if the hard negative cache $H^-$ returns NIL for a particular task t.

Referring to the above examples, TABLE XVII shows a content of a hard positive cache $H^+$, TABLE XVIII shows a content of a soft positive cache $S^+$, TABLE XIX shows a content of a soft positive cache with context $C^+$. TABLE XX shows a content of a hard or soft negative cache $H^-$ or $S^-$, and TABLE XXI shows a content of a soft negative cache with content $C^-$.

TABLE XVII

| [e.q|, e.L] | e.B |
|---|---|
| [(1, 2), {a, v}] | (6, 3) |
| [(1, 2), {a, b, e, f}] | (5, 5) |
| [(1, 2), {b, c, e, f}] | (4, 2) |
| [(2, 4), {a}] | (4, 4) |
| [(2, 4), {b, f}] | (5, 4) |

TABLE XVIII

| e.q | |e.L| | e.L | e.B |
|---|---|---|---|
| (1,2) | 2 | {a, v} | (6, 3) |
| | 4 | {a, b, e, f} | (5, 5) |
| | | {b, c, e, f} | (4, 2) |
| (2,4) | 1 | {a} | (4, 4) |
| | 2 | {b, f} | (5, 4) |

TABLE XVIII

| e.c | e.q | |e.L| | e.L | e.B |
|---|---|---|---|---|
| $j_0$ | (1, 2) | 2 | {a, v} | (6, 3) |
| | (2, 4) | 1 | {a} | (4, 4) |
| $j_1$ | (1, 2) | 4 | {a, b, e, f} | (5, 5) |
| | (2, 4) | 2 | {b, f} | (5, 4) |
| $j_2$ | (1, 2) | 4 | {b, c, e, f} | (4, 2) |

TABLE XX

| e.q | $L^-$ |
|---|---|
| (2, 1) | {q} |
| (1, 2) | {e, f} |
| (2, 4) | {b, q, v} |

TABLE XXI

| e.c | e.q | e.$L^-$ |
|---|---|---|
| $j_0$ | (2, 1) | {q} |
| $j_1$ | (1, 2) | {e, f} |
| | (2, 4) | {b, v} |
| $j_2$ | (2, 4) | {b, q, v} |

Combining Both Positive and Negative Caches

An embodiment of the RSR 160 may apply both positive and negative caching together. For example and without limitation, in Alg. 2, positive caching may be used for the sequential bucket scanning iteration in the outer loop and negative caching may be used for the random node scanning iteration in the inner loop. In particular, a configuration parameter in the RSR 160 may cause to select one of positive caching, negative caching, or a combination of both positive and negative caching. In a non-limiting example, given a task $t[(1V,2G),\{b,c,e,f\}]$, an option may be to first apply the negative cache to reduce its candidate set to be $\{b,c\}$. The positive cache may be used with both $[(1V,2G),\{b,c,e,f\}]$ and $[(1V,2G),\{b,c\}]$, following which the cached bucket with the smallest availability may be selected. FIG. 7 shows an entry for $[(1V,2G),\{b,c,e,f\}]$ and no entry $[(1V,2G),\{b,c\}]$, so the scanning iteration may start from the leaf bucket at (4,2).

Using the Schedule

Once the RSR 160 has found a matching node 110 for a task 125 using one of the above-described strategies, the RSR 160 transmits an identifier of the task 125 with the ID of the matching node 110, as part of a generated scheduling scheme 150, to the scheduling engine 135. The scheduling engine 135 receives scheduling scheme 150 with identities of the matching tasks 125 and nodes 110 from the RSR 160. Based on the scheduling scheme 150, the scheduling engine 135 generates a schedule for execution of the tasks 125 on the nodes 110. The RM 100 allocates the various tasks 125 to the matching nodes 110 based on the schedule.

Figure 9:
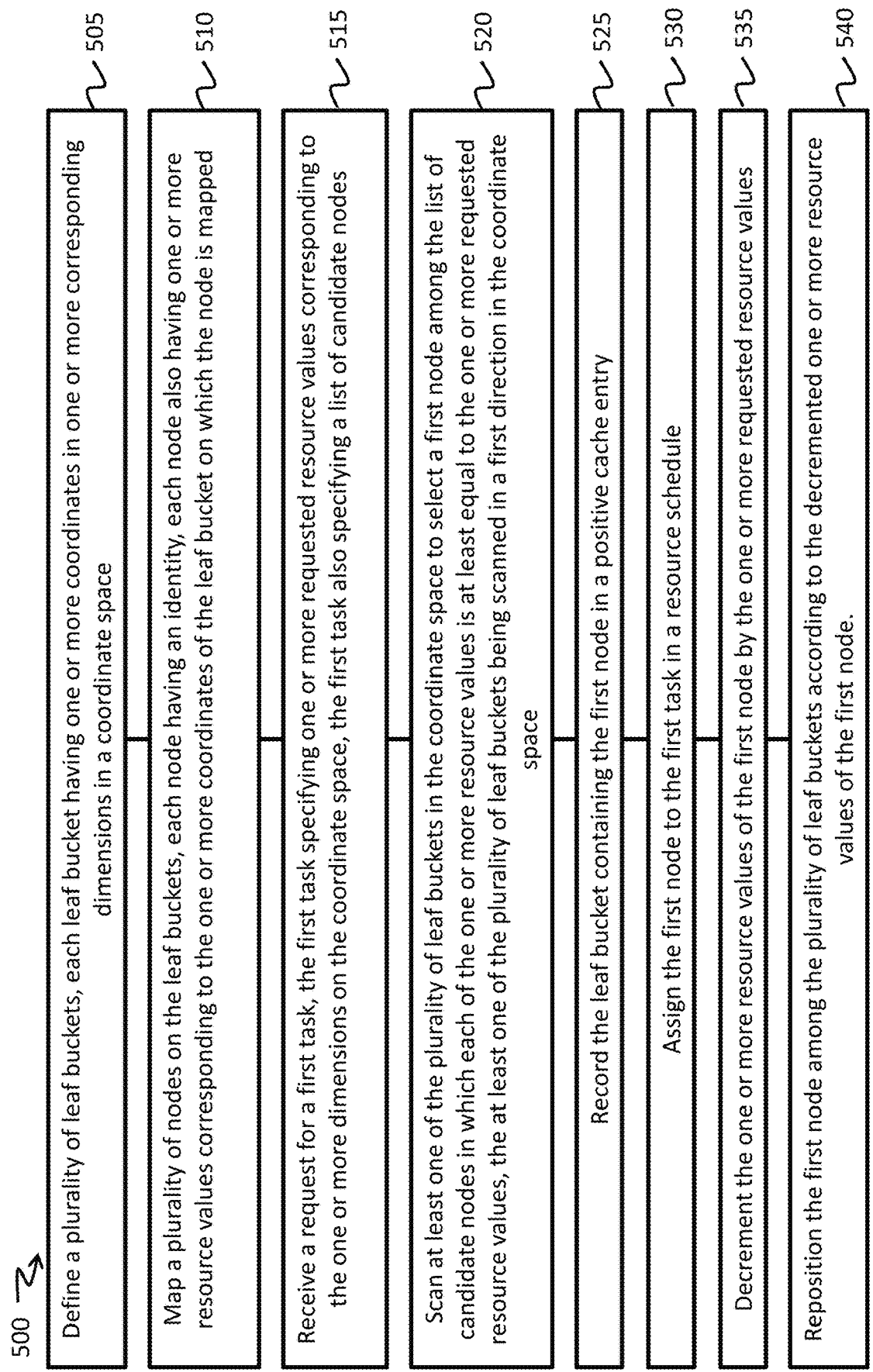
FIG. 9 shows a flowchart showing operations of a resource scheduling method recording an entry in a positive cache in accordance with non-limiting embodiments of the present disclosure.

FIG. 9 shows a flowchart showing operations of a resource scheduling method recording an entry in a positive cache in accordance with non-limiting embodiments of the present disclosure. On FIG. 9 a sequence 500 comprises a plurality of operations, some of which may be executed in variable order, some of the operations possibly being executed concurrently, some of the operations being optional. The sequence 500 begins at operation 505 with defining a plurality of leaf buckets, each leaf bucket having one or more coordinates in one or more corresponding dimensions in a coordinate space. A plurality of nodes at mapped on the leaf buckets at operation 510, each node having an identity, each node also having one or more resource values corresponding to the one or more coordinates of the leaf bucket on which the node is mapped. A request for a first task is received at operation 515, the first task specifying one or more requested resource values corresponding to the one or more dimensions on the coordinate space, the first task also specifying a list of candidate nodes. In an embodiment, the first task may be part of a first task group, each one of a plurality of tasks in the first task group comprising the one or more requested resource values and the list of candidate nodes defined by the first task.

At operation 520, at least one of the plurality of leaf buckets in the coordinate space is scanned to select a first node among the list of candidate nodes in which each of the one or more resource values is at least equal to the one or more requested resource values, the at least one of the plurality of leaf buckets being scanned in a first direction in the coordinate space. This scanning may for example be performed using Alg. 2 as described hereinabove, so that an outer loop scan of the leaf buckets is executed to select a fittable bucket, followed by an inner loop scan of the fittable bucket to select the first node. In an embodiment, scanning at least one of the plurality of leaf buckets in the first direction in the coordinate space may comprise scanning the leaf buckets associated to a first child bucket before scanning the leaf buckets associated to a next child bucket. Then at operation 525, the leaf bucket containing the first node is recorded in a positive cache entry. A plurality of positive cache entries may be defined for a corresponding plurality of task groups.

The first node being assigned to the first task in a resource schedule at operation 530, some of its resources are no longer available. As a result, its one or more resource values are reduced at operation 535 by the one or more requested resource values, following which the first node is repositioned among the plurality of leaf buckets according to the reduced one or more resource values of the first node at operation 540. Otherwise stated, resources of the first node that are allocated to the first task at operation 530 will no longer be available when another task request is received. As a consequence, the number of remaining resource values of the first node is reduced by the assignment and the first node is now moved to a leaf bucket according to its remaining resources.

Figure 10:
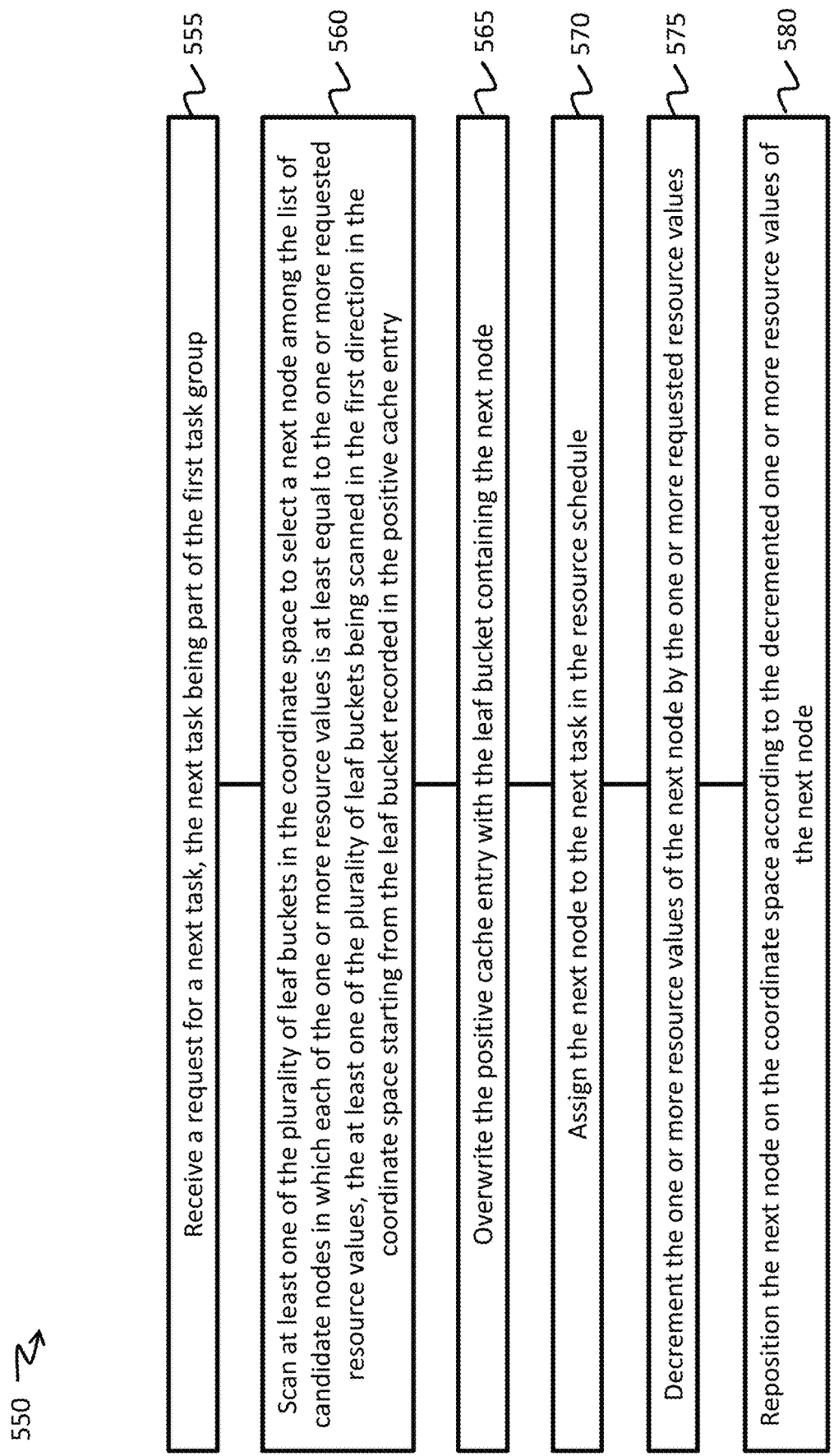
FIG. 10 shows a flowchart showing operations of a resource scheduling method using the positive cache entry in hard mode in accordance with non-limiting embodiments of the present disclosure.

In various embodiments, the positive cache entry may be used in a hard mode, a soft mode, or a soft mode with context. For example, FIG. 10 shows a flowchart showing operations of a resource scheduling method using the positive cache entry in hard mode in accordance with non-limiting embodiments of the present disclosure. On FIG. 10 a sequence 550 comprises a plurality of operations, some of which may be executed in variable order, some of the operations possibly being executed concurrently, some of the operations being optional. A request for a next task is received at operation 555. The next task being part of the first task group, the positive cache entry stored at operation 525 will be used in the following operations. At least one of the plurality of leaf buckets is scanned at operation 560, in the coordinate space, to select a next node among the list of candidate nodes in which each of the one or more resource values is at least equal to the one or more requested resource values. The at least one of the plurality of leaf buckets is scanned in the first direction in the coordinate space starting from the leaf bucket recorded in the positive cache entry.

At operation 565, the positive cache entry is overwritten with the leaf bucket containing the next node.

Then, operations 570 to 580 are similar to operations 530 to 540, being applied on the next node. The next node is assigned to the next task in the resource schedule at operation 570. Its one or more resource values are reduced at operation 575 by the one or more requested resource values, following which the next node is repositioned among the plurality of leaf buckets according to the reduced one or more resource values of the next node at operation 580.

Figure 11:
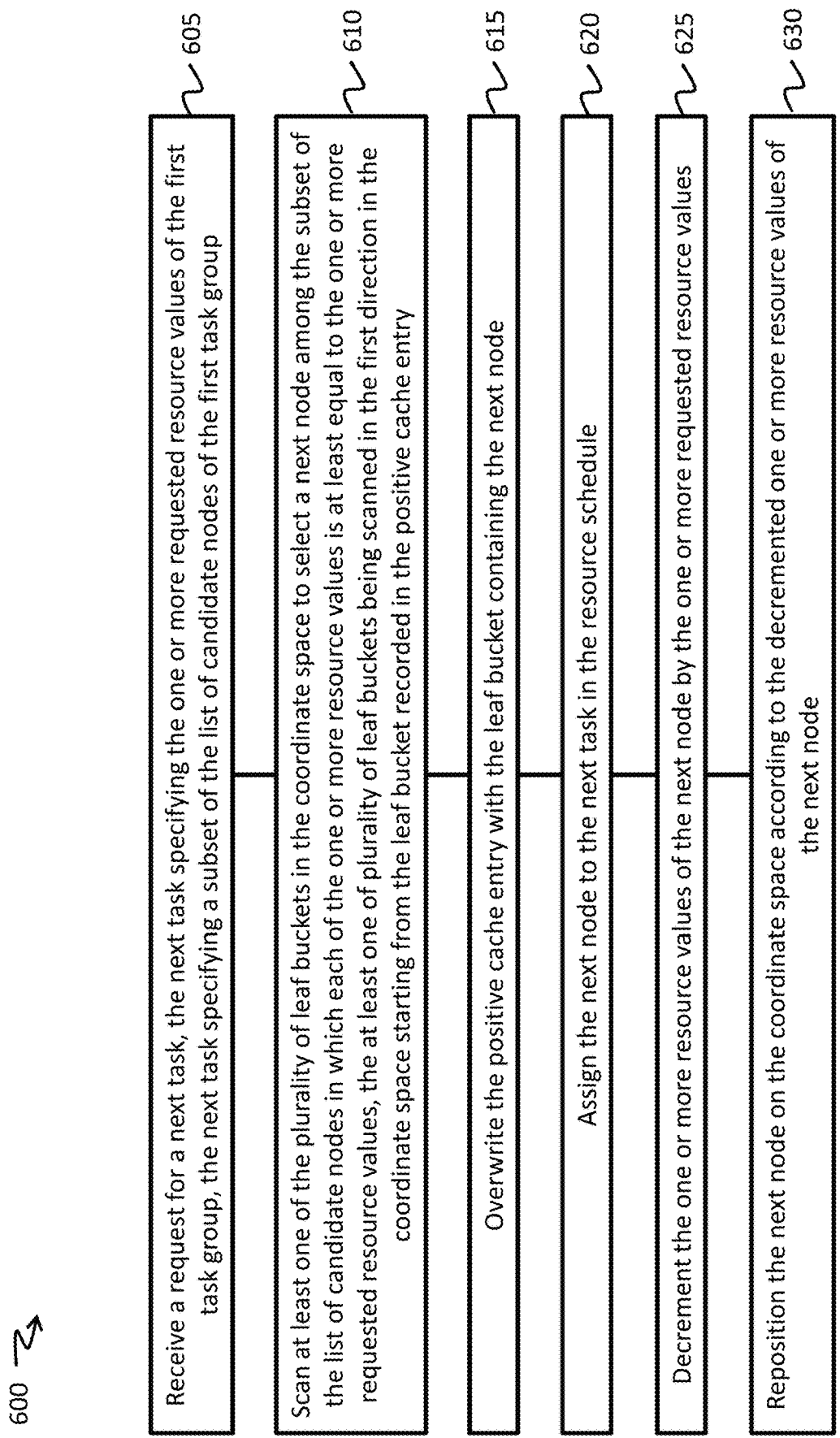
FIG. 11 shows a flowchart showing operations of a resource scheduling method using the positive cache entry in soft mode in accordance with non-limiting embodiments of the present disclosure.

FIG. 11 shows a flowchart showing operations of a resource scheduling method using the positive cache entry in soft mode in accordance with non-limiting embodiments of the present disclosure. On FIG. 11 a sequence 600 comprises a plurality of operations, some of which may be executed in variable order, some of the operations possibly being executed concurrently, some of the operations being optional. A request for a next task is received at operation 605, the next task specifying the one or more requested resource values of the first task group, the next task being different from that of operation 555 in that it specifies a subset of the list of candidate nodes of the first task group. A scanning operation 610 is thus different from that of operation 560 in that it involves scanning at least one of the plurality of leaf buckets in the coordinate space to select a next node among the subset of the list of candidate nodes in which each of the one or more resource values is at least equal to the one or more requested resource values. As in the case of operation 560, the at least one of plurality of leaf buckets is scanned in the first direction in the coordinate space starting from the leaf bucket recorded in the positive cache entry.

Thereafter, operations 615 to 630 are similar to operations 565 to 580. At operation 615, the positive cache entry is overwritten with the leaf bucket containing the next node. The next node is assigned to the next task in the resource schedule at operation 620. Its one or more resource values are reduced at operation 625 by the one or more requested resource values, following which the next node is repositioned among the plurality of leaf buckets according to the reduced one or more resource values of the first node at operation 630.

Figure 12:
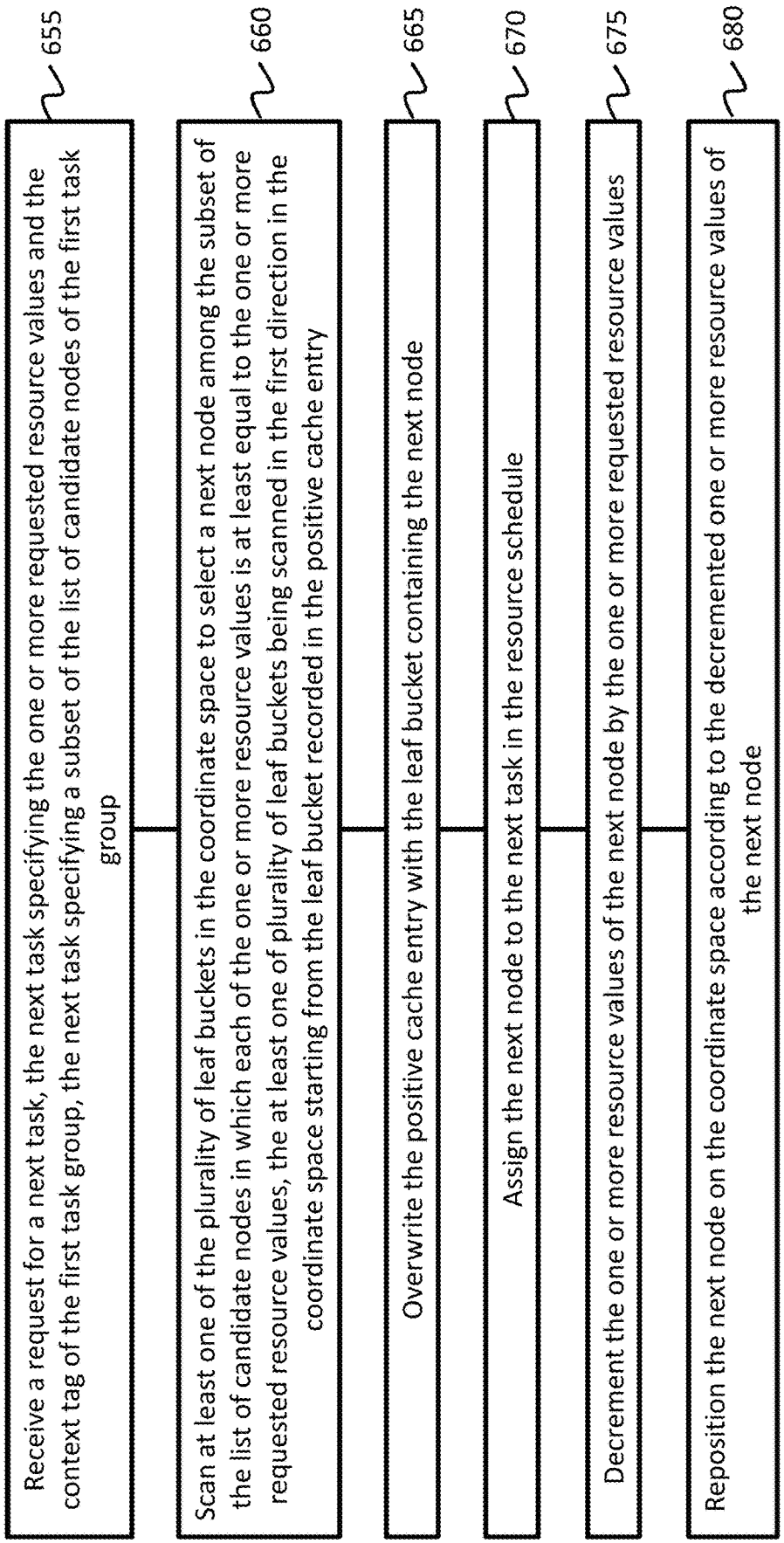
FIG. 12 shows a flowchart showing operations of a resource scheduling method using the positive cache entry in soft mode with context in accordance with non-limiting embodiments of the present disclosure.

The soft mode resource scheduling method of FIG. 11 may be complemented by the addition of contextual information. Returning to the sequence 500, a context tag may have been attached to the first task, and recording the leaf bucket containing the first node in the positive cache entry at operation 525 may have included recording the context tag in the positive cache entry. FIG. 12 shows a flowchart showing operations of a resource scheduling method using the positive cache entry in soft mode with context in accordance with non-limiting embodiments of the present disclosure. On FIG. 12 a sequence 650 comprises a plurality of operations, some of which may be executed in variable order, some of the operations possibly being executed concurrently, some of the operations being optional.

A request for a next task is received at operation 655, the next task specifying the one or more requested resource values of the first task group, the next task specifying a subset of the list of candidate nodes of the first task group, the next task being different from that of operation 605 in that it further specifies the context tag of the first task group. Operation 660 is similar to operation 610 and involves scanning at least one of the plurality of leaf buckets in the coordinate space to select a next node among the subset of the list of candidate nodes in which each of the one or more resource values is at least equal to the one or more requested resource values. As in the case of operations 560 and 610, the at least one of plurality of leaf buckets is scanned in the first direction in the coordinate space starting from the leaf bucket recorded in the positive cache entry. The context tag of the first task group, which is specified in the request for the next task received at operation 655, may be used as a key for quickly locating the positive cache entry in view of determining the starting point for the scanning operation 660.

Once the next node has been found at operation 660, operations 665 to 680 are similar to operations 565 to 580 and to operations 615 to 630. At operation 665, the positive cache entry is overwritten with the leaf bucket containing the next node. The next node is assigned to the next task in the resource schedule at operation 670. Its one or more resource values are reduced at operation 675 by the one or more requested resource values, following which the next node is repositioned among the plurality of leaf buckets according to the reduced one or more resource values of the first node at operation 680.

Figure 13:
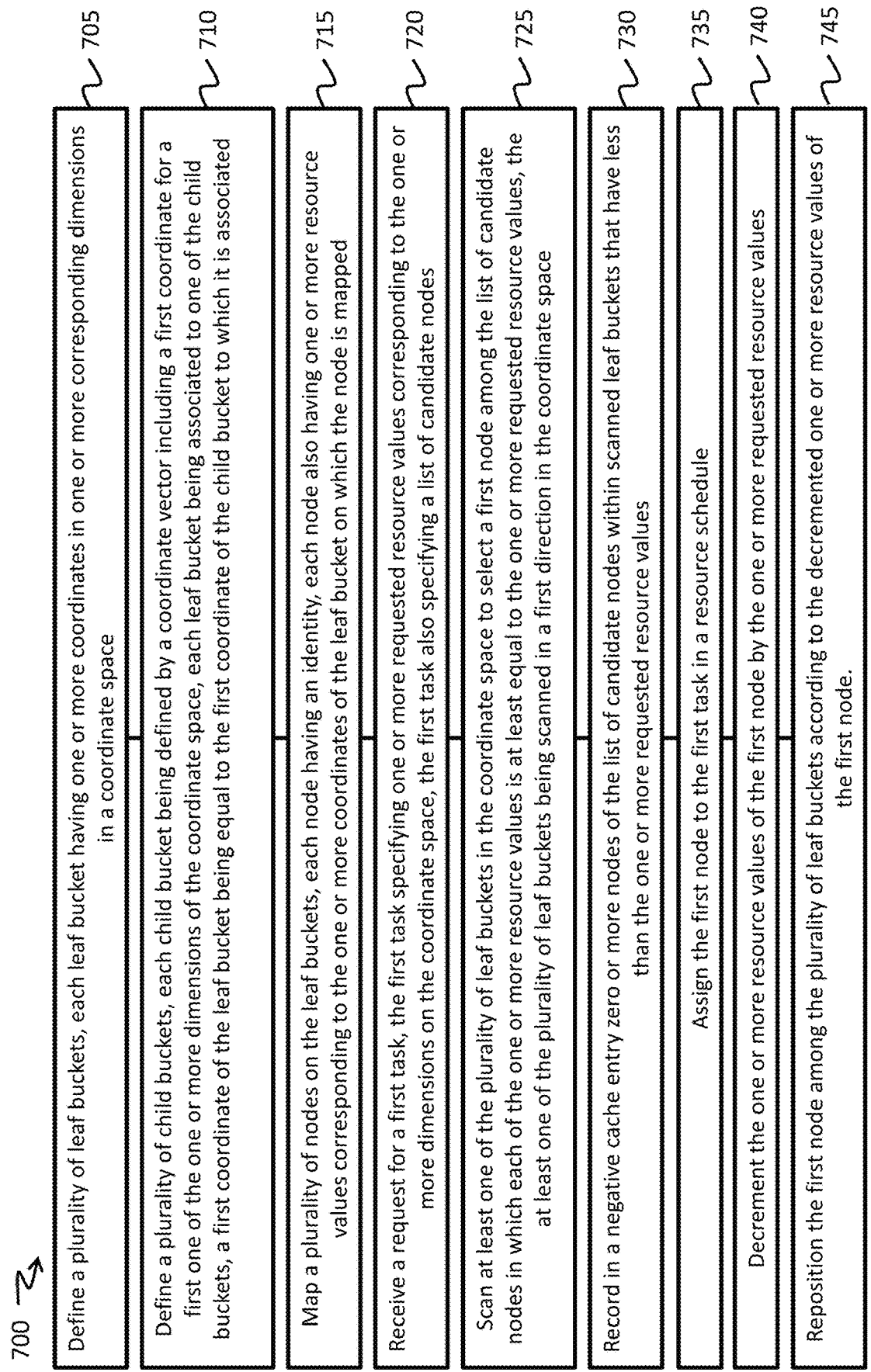
FIG. 13 shows a flowchart showing operations of a resource scheduling method recording entries in a negative cache in accordance with non-limiting embodiments of the present disclosure.

Methods using negative caching functions share some similarities with those using position caching functions, but also comprise different features. For example, FIG. 13 shows a flowchart showing operations of a resource scheduling method recording entries in a negative cache in accordance with non-limiting embodiments of the present disclosure. On FIG. 13, a sequence 700 comprises a plurality of operations, some of which may be executed in variable order, some of the operations possibly being executed concurrently, some of the operations being optional. A plurality of leaf buckets are defined are defined at operation 705, each leaf bucket having one or more coordinates in one or more corresponding dimensions in a coordinate space. A plurality of child buckets are also defined at operation 710, each child bucket being defined by a coordinate vector including a first coordinate for a first one of the one or more dimensions of the coordinate space, each leaf bucket being associated to one of the child buckets, a first coordinate of the leaf bucket being equal to the first coordinate of the child bucket to which it is associated. A root bucket encompassing all dimensions of the coordinate space may further be defined in the coordinate space.

Then at operation 715, a plurality of nodes are mapped on the leaf buckets, each node having an identity, each node also having one or more resource values corresponding to the one or more coordinates of the leaf bucket on which the node is mapped.

A request for a first task is received at operation 720, the first task specifying one or more requested resource values corresponding to the one or more dimensions on the coordinate space, the first task also specifying a list of candidate nodes. In an embodiment, the first task may be part of a first task group, each one of a plurality of tasks in the first task group comprising the one or more requested resource values and the list of candidate nodes defined by the first task. At operation 725, at least one of the plurality of leaf buckets in the coordinate space is scanned to select a first node among the list of candidate nodes in which each of the one or more resource values is at least equal to the one or more requested resource values, the at least one of the plurality of leaf buckets being scanned in a first direction in the coordinate space. In an embodiment, scanning at least one of the plurality of leaf buckets in the first direction in the coordinate space may comprise scanning the leaf buckets associated to a first child bucket before scanning the leaf buckets associated to a next child bucket.

It may be observed that operations 720 and 725 may be similar to operations 515 and 520. The sequence 700 is however different from the sequence 500 in that operation 730 comprises recording, in a negative cache entry, zero or more nodes of the list of candidate nodes within scanned leaf buckets that have less than the one or more requested resource values. In an embodiment, a plurality of negative cache entries may be defined for a corresponding plurality of task groups.

The sequence ends with operations 735 to 745, which are similar to operations 530 to 540. The first node is assigned to the first task in a resource schedule at operation 735 and, as a result, some of its resources are no longer available. The one or more resource values of the first node are reduced at operation 740 by the one or more requested resource values, following which the first node is repositioned among the plurality of leaf buckets according to the reduced one or more resource values of the first node at operation 745.

Figure 14:
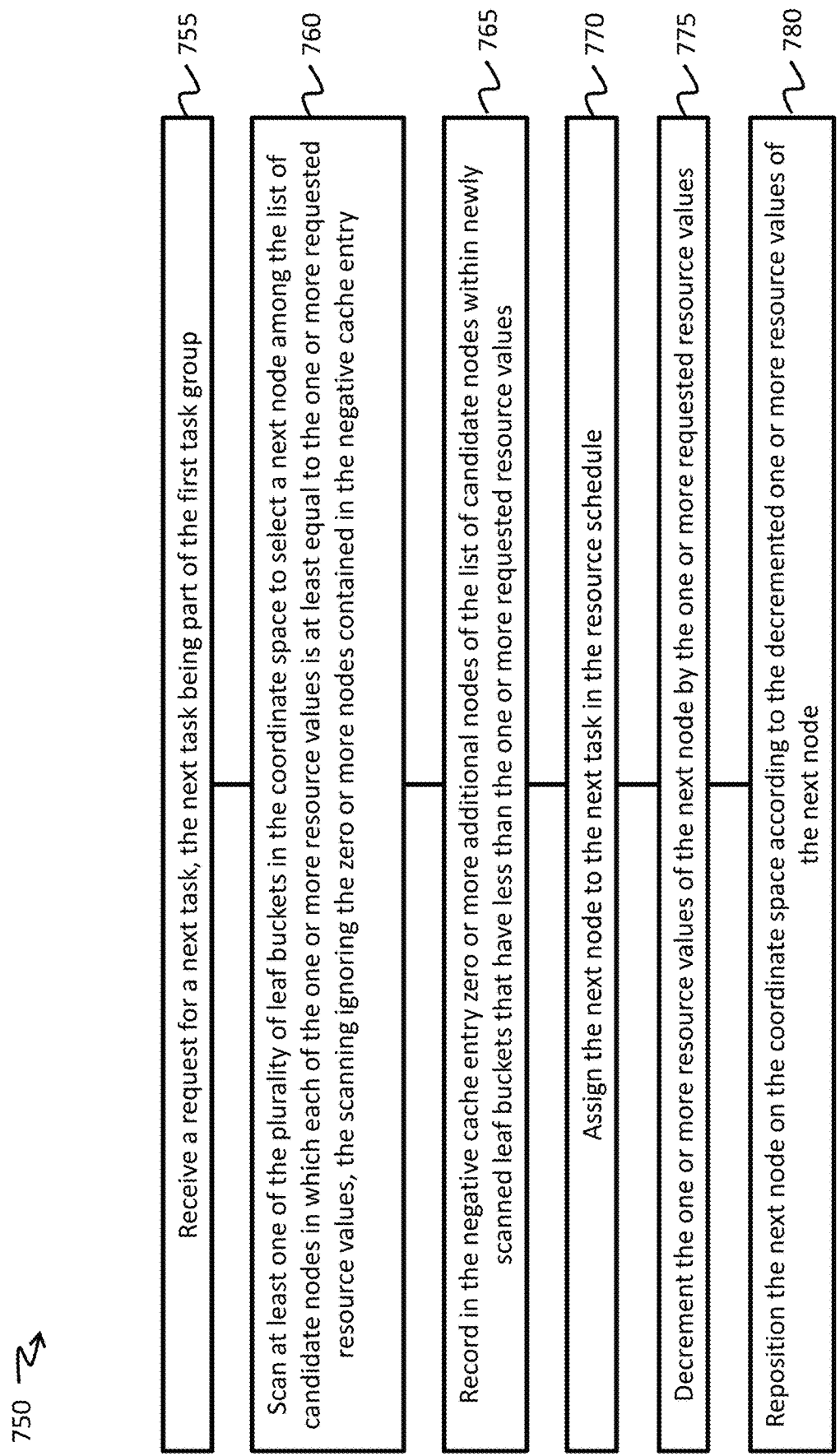
FIG. 14 shows a flowchart showing operations of a resource scheduling method using the negative cache entries in hard mode in accordance with non-limiting embodiments of the present disclosure.

In various embodiments, the negative cache entries may be used in a hard mode, a soft mode, or a soft mode with context. For example, FIG. 14 shows a flowchart showing operations of a resource scheduling method using the negative cache entries in hard mode in accordance with non-limiting embodiments of the present disclosure. On FIG. 14 a sequence 750 comprises a plurality of operations, some of which may be executed in variable order, some of the operations possibly being executed concurrently, some of the operations being optional.

Operation 755 is similar to operation 555 in that a request for a next task is received, the next task being part of the first task group. However, the negative cache being different from the negative cache, the next operation 760 is specific to the sequence 700. In operation 760, at least one of the plurality of leaf buckets in the coordinate space is scanned to select a next node among the list of candidate nodes in which each of the one or more resource values is at least equal to the one or more requested resource values, the at least one of the plurality of leaf buckets being scanned in the first direction in the coordinate space, the scanning ignoring the zero or more nodes contained in the negative cache entry. Then operation 765 comprises recording, in the negative cache, entry zero or more additional nodes of the list of candidate nodes within newly scanned leaf buckets that have less than the one or more requested resource values.

Thereafter, operations 770 to 780 are similar to operations 735 to 745, being applied on the next node. The next node is assigned to the next task in the resource schedule at operation 770. Its one or more resource values are reduced at operation 775 by the one or more requested resource values, following which the next node is repositioned among the plurality of leaf buckets according to the reduced one or more resource values of the next node at operation 780.

Figure 15:
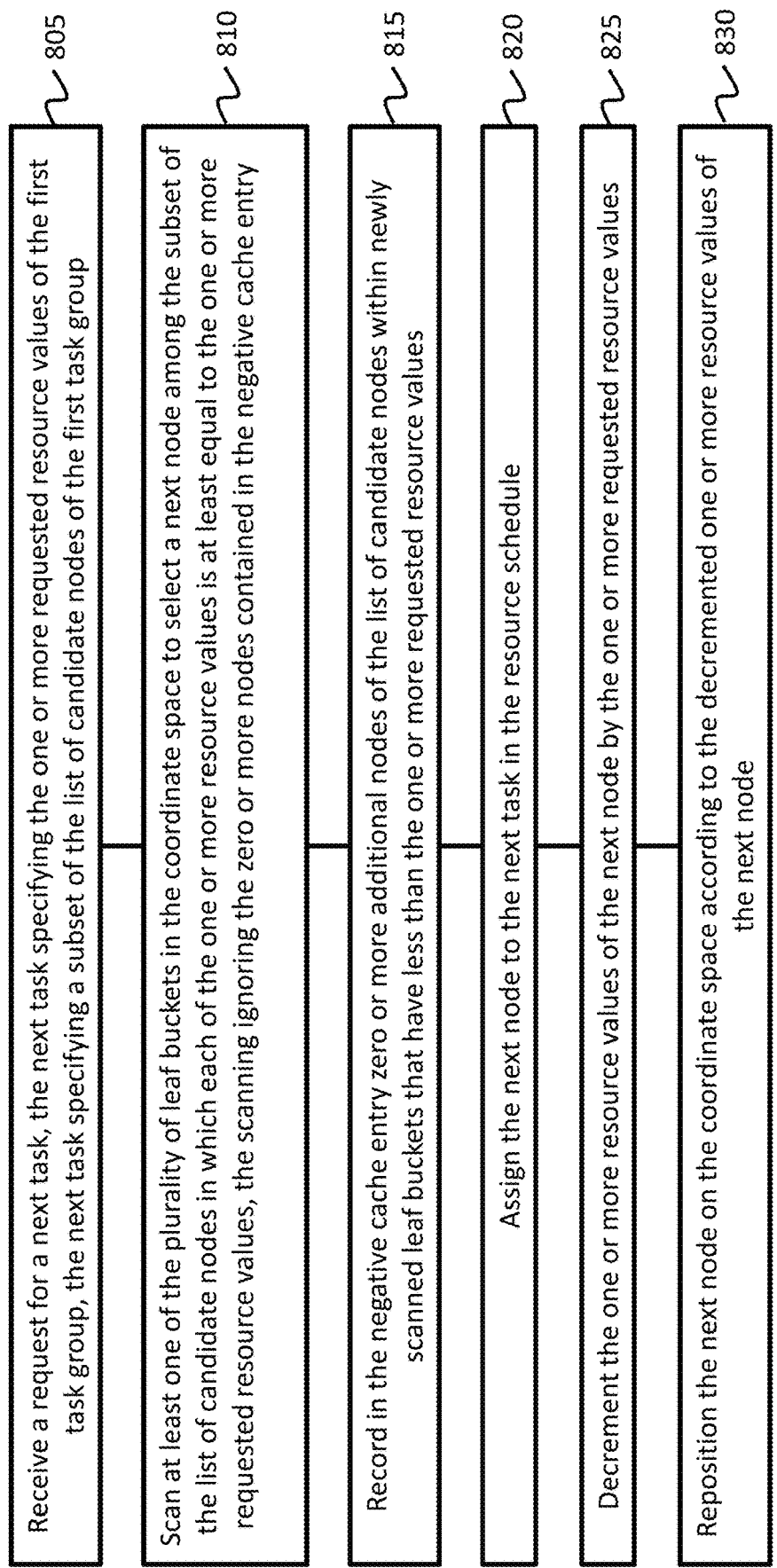
FIG. 15 shows a flowchart showing operations of a resource scheduling method using the negative cache entries in soft mode in accordance with non-limiting embodiments of the present disclosure.

FIG. 15 shows a flowchart showing operations of a resource scheduling method using the negative cache entries in soft mode in accordance with non-limiting embodiments of the present disclosure. On FIG. 15 a sequence 800 comprises a plurality of operations, some of which may be executed in variable order, some of the operations possibly being executed concurrently, some of the operations being optional. At operation 805, a request for a next task is received, the next task specifying the one or more requested resource values of the first task group, the next task specifying a subset of the list of candidate nodes of the first task group. Then at operation 810, at least one of the plurality of leaf buckets in the coordinate space is scanned to select a next node among the subset of the list of candidate nodes in which each of the one or more resource values is at least equal to the one or more requested resource values, the at least one of the plurality of leaf buckets being scanned in the first direction in the coordinate space, the scanning ignoring the zero or more nodes contained in the negative cache entry. Zero or more additional nodes of the list of candidate nodes, within newly scanned leaf buckets, that have less than the one or more requested resource values are recorded in the negative cache entry at operation 815.

Thereafter, operations 820 to 830 are similar to operations 770 to 780. The next node is assigned to the next task in the resource schedule at operation 820. Its one or more resource values are reduced at operation 825 by the one or more requested resource values, following which the next node is repositioned among the plurality of leaf buckets according to the reduced one or more resource values of the next node at operation 830.

Figure 16:
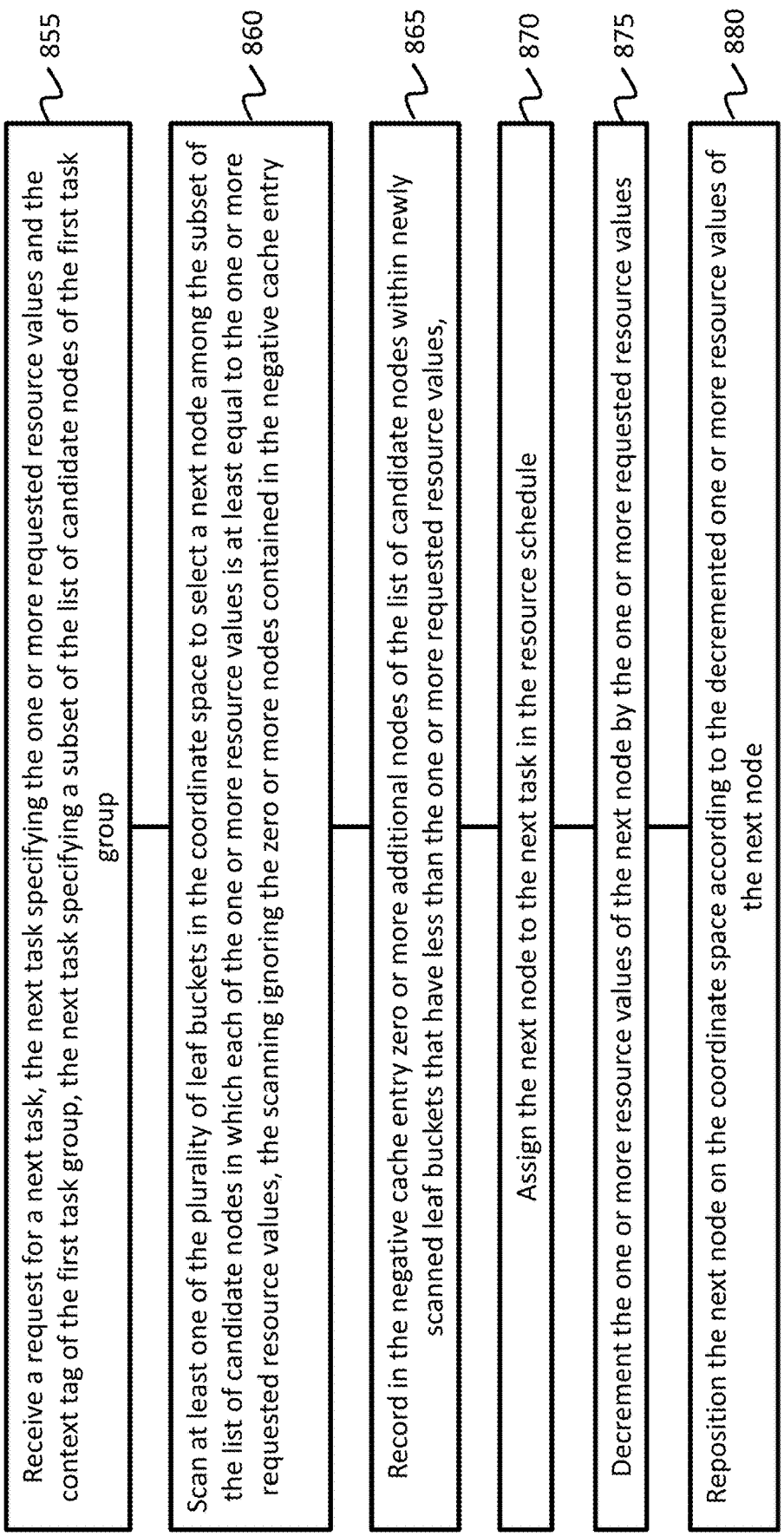
FIG. 16 shows a flowchart showing operations of a resource scheduling method using the negative cache entries in soft mode with context in accordance with non-limiting embodiments of the present disclosure.

The soft mode resource scheduling method of FIG. 15 may be complemented by the addition of contextual information. Returning to the sequence 700, a context tag may have been attached to the first task, and recording the zero or more nodes of the list of candidate nodes in the negative cache entry at operation 730 may have included recording the context tag in the negative cache entry. FIG. 16 shows a flowchart showing operations of a resource scheduling method using the negative cache entries in soft mode with context in accordance with non-limiting embodiments of the present disclosure. On FIG. 18 a sequence 850 comprises a plurality of operations, some of which may be executed in variable order, some of the operations possibly being executed concurrently, some of the operations being optional.

A request for a next task is received at operation 855, the next task specifying the one or more requested resource values and the context tag of the first task group, the next task specifying a subset of the list of candidate nodes of the first task group. Operation 860 is similar to operation 810 and involves scanning at least one of the plurality of leaf buckets in the coordinate space to select a next node among the subset of the list of candidate nodes in which each of the one or more resource values is at least equal to the one or more requested resource values. As in the case of operations 760 and 810, the at least one of the plurality of leaf buckets is scanned in the first direction in the coordinate space and the scanning ignores the zero or more nodes contained in the negative cache entry. The context tag of the first task group, which is specified in the request for the next task received at operation 855 may be used as a key for quickly locating the negative cache entry in view of determining the starting point for the scanning operation 860.

Once the next node has been found at operation 860, operations 865 to 880 are similar to operations 765 to 780 and to operations 815 to 830. Operation 865 comprises recording, in the negative cache entry, zero or more additional nodes of the list of candidate nodes within newly scanned leaf buckets that have less than the one or more requested resource values. The next node is assigned to the next task in the resource schedule at operation 870. Its one or more resource values are reduced at operation 875 by the one or more requested resource values, following which the next node is repositioned among the plurality of leaf buckets according to the reduced one or more resource values of the next node at operation 880.

Each of the sequences 500 to 850 may be carried out by routines, subroutines, or engines of the software of the RM 100. Coding of the software of the RM 100 for carrying out the sequences 500 to 850 is well within the scope of a person of ordinary skill in the art having regard to the present disclosure. Referring to FIG. 2, computer-readable instructions executable by the processor 102 of the RM 100 to perform some or all of the sequences 500 to 850 may be stored in the memory device 104 of the RM 100, for example in the non-transitory computer-readable medium 105. The database 107 may store relevant information for execution of some of all of the sequences 500 to 850, including without limitation the coordinate space 300 and its various buckets, the mapping of the nodes 110 in the coordinate space 300, and the contents of the various positive and/or negative cache entries as shown on Tables to XVII to XXI.

The technology as described herein may enable fast implementations for a variety of resource node scheduling policies that consider both multiple dimensions (such as vcores, memory, and GPU) and locality constraints. Using the methods and structures described herein, the search of a suitable resource node for scheduling may be performed in a multi-dimensional coordination system, which maps resources of resource nodes and tasks to coordinates which enables fast scheduling of execution of the tasks on the resource nodes. The search for the suitable resource node may be limited to the fittable area in order to increase the speed of search. The technology described herein may support a variety of search paths within the fittable area and allow for speedy selection of the suitable resource node for scheduling to perform the task. The granularity parameter described herein may help to further speed up the resource scheduling of the resource nodes for execution of the tasks.

Although the present invention has been described with reference to specific features and embodiments thereof, it is evident that various modifications and combinations may be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A resource scheduling method for a plurality of nodes mapped on a coordinate space defining a plurality of leaf buckets, each leaf bucket having one or more coordinates in one or more dimensions in the coordinate space, the method comprising:
   mapping the plurality of nodes on the leaf buckets, each node having an identity, each node also having one or more resource values corresponding to the one or more coordinates of the leaf bucket on which the node is mapped;
   receiving a request for a first task, the first task specifying one or more requested resource values corresponding to the one or more dimensions on the coordinate space, the first task also specifying a list of candidate nodes;
   scanning at least one of the plurality of leaf buckets in the coordinate space to select a first node among the list of candidate nodes in which each of the one or more resource values is at least equal to the one or more requested resource values, the at least one of the plurality of leaf buckets being scanned in a first direction in the coordinate space;
   recording the leaf bucket containing the first node in a positive cache entry;
   assigning the first node to the first task in a resource schedule;
   reducing the one or more resource values of the first node by the one or more requested resource values; and repositioning the first node among the plurality of leaf buckets according to the reduced one or more resource values of the first node.

2. The method of claim 1, wherein the first task is part of a first task group, each one of a plurality of tasks in the first task group comprising the one or more requested resource values and the list of candidate nodes defined by the first task.

3. The method of claim 2, wherein a plurality of positive cache entries are defined for a corresponding plurality of task groups.

4. The method of claim 2, further comprising:
receiving a request for a next task, the next task being part of the first task group;
scanning at least one of the plurality of leaf buckets in the coordinate space to select a next node among the list of candidate nodes in which each of the one or more resource values is at least equal to the one or more requested resource values, the at least one of the plurality of leaf buckets being scanned in the first direction in the coordinate space starting from the leaf bucket recorded in the positive cache entry;
overwriting the positive cache entry with the leaf bucket containing the next node;
assigning the next node to the next task in the resource schedule;
reducing the one or more resource values of the next node by the one or more requested resource values; and
repositioning the next node on the coordinate space according to the reduced one or more resource values of the next node.

5. The method of claim 2, further comprising:
receiving a request for a next task, the next task specifying the one or more requested resource values of the first task group, the next task specifying a subset of the list of candidate nodes of the first task group;
scanning at least one of the plurality of leaf buckets in the coordinate space to select a next node among the subset of the list of candidate nodes in which each of the one or more resource values is at least equal to the one or more requested resource values, the at least one of plurality of leaf buckets being scanned in the first direction in the coordinate space starting from the leaf bucket recorded in the positive cache entry;
overwriting the positive cache entry with the leaf bucket containing the next node;
assigning the next node to the next task in the resource schedule;
reducing the one or more resource values of the next node by the one or more requested resource values; and
repositioning the next node on the coordinate space according to the reduced one or more resource values of the next node.

6. The method of claim 2, wherein:
a context tag is attached to the first task; and
recording the leaf bucket containing the first node in the positive cache entry comprises recording the context tag in the positive cache entry;
the method further comprising:
receiving a request for a next task, the next task specifying the one or more requested resource values and the context tag of the first task group, the next task specifying a subset of the list of candidate nodes of the first task group,
scanning at least one of the plurality of leaf buckets in the coordinate space to select a next node among the subset of the list of candidate nodes in which each of the one or more resource values is at least equal to the one or more requested resource values, the at least one of plurality of leaf buckets being scanned in the first direction in the coordinate space starting from the leaf bucket recorded in the positive cache entry, wherein the context tag of the first task group is used to identify the positive cache entry,
overwriting the positive cache entry with the leaf bucket containing the next node,
assigning the next node to the next task in the resource schedule,
reducing the one or more resource values of the next node by the one or more requested resource values, and
repositioning the next node on the coordinate space according to the reduced one or more resource values of the next node.

7. The method of claim 1, wherein the following buckets are further defined in the coordinate space:
a root bucket encompassing all dimensions of the coordinate space; and
a plurality of child buckets, each child bucket being defined by a coordinate vector including a first coordinate for a first one of the one or more dimensions of the coordinate space;
wherein:
each leaf bucket is associated to one of the child buckets, a first coordinate of the leaf bucket being equal to the first coordinate of the child bucket to which it is associated; and
scanning at least one of the plurality of leaf buckets in the first direction in the coordinate space comprises scanning the leaf buckets associated to a first child bucket before scanning the leaf buckets associated to a next child bucket.

8. The method of claim 1, wherein scanning the at least one of the plurality of leaf buckets to select the first node among the list of candidate nodes comprises:
executing an outer loop scan of the leaf buckets to select a fittable bucket; and
executing an inner loop scan of the fittable bucket to select the first node.

9. A resource scheduling method for a plurality of nodes mapped on a coordinate space defining a plurality of leaf buckets, each leaf bucket having one or more coordinates in one or more dimensions in the coordinate space, the method comprising:
mapping the plurality of nodes on the leaf buckets, each node having an identity, each node also having one or more resource values corresponding to the one or more coordinates of the leaf bucket on which the node is mapped;
receiving a request for a first task, the first task specifying one or more requested resource values corresponding to the one or more dimensions on the coordinate space, the first task also specifying a list of candidate nodes;
scanning at least one of the plurality of leaf buckets in the coordinate space to select a first node among the list of candidate nodes in which each of the one or more resource values is at least equal to the one or more requested resource values, the at least one of the plurality of leaf buckets being scanned in a first direction in the coordinate space;
recording in a negative cache entry zero or more nodes of the list of candidate nodes within scanned leaf buckets that have less than the one or more requested resource values;

assigning the first node to the first task in a resource schedule;

reducing the one or more resource values of the first node by the one or more requested resource values; and repositioning the first node among the plurality of leaf buckets according to the reduced one or more resource values of the first node.

10. The method of claim 9, wherein the first task is part of a first task group, each one of a plurality of tasks in the first task group comprising the one or more requested resource values and the list of candidate nodes defined by the first task.

11. The method of claim 10, wherein a plurality of negative cache entries are defined for a corresponding plurality of task groups.

12. The method of claim 10, further comprising:

receiving a request for a next task, the next task being part of the first task group;

scanning at least one of the plurality of leaf buckets in the coordinate space to select a next node among the list of candidate nodes in which each of the one or more resource values is at least equal to the one or more requested resource values, the at least one of the plurality of leaf buckets being scanned in the first direction in the coordinate space, the scanning ignoring the zero or more nodes contained in the negative cache entry;

recording in the negative cache entry zero or more additional nodes of the list of candidate nodes within newly scanned leaf buckets that have less than the one or more requested resource values;

assigning the next node to the next task in the resource schedule;

reducing the one or more resource values of the next node by the one or more requested resource values; and repositioning the next node on the coordinate space according to the reduced one or more resource values of the next node.

13. The method of claim 10, further comprising:

receiving a request for a next task, the next task specifying the one or more requested resource values of the first task group, the next task specifying a subset of the list of candidate nodes of the first task group;

scanning at least one of the plurality of leaf buckets in the coordinate space to select a next node among the subset of the list of candidate nodes in which each of the one or more resource values is at least equal to the one or more requested resource values, the scanning ignoring the zero or more nodes contained in the negative cache entry;

recording in the negative cache entry zero or more additional nodes of the list of candidate nodes within newly scanned leaf buckets that have less than the one or more requested resource values;

assigning the next node to the next task in the resource schedule;

reducing the one or more resource values of the next node by the one or more requested resource values; and repositioning the next node on the coordinate space according to the reduced one or more resource values of the next node.

14. The method of claim 10, wherein:

a context tag is attached to the first task; and recording zero or more nodes of the list of candidate nodes in the negative cache entry comprises recording the context tag in the negative cache entry;

the method further comprising:

receiving a request for a next task, the next task specifying the one or more requested resource values and the context tag of the first task group, the next task specifying a subset of the list of candidate nodes of the first task group, scanning at least one of the plurality of leaf buckets in the coordinate space to select a next node among the subset of the list of candidate nodes in which each of the one or more resource values is at least equal to the one or more requested resource values, the scanning ignoring the zero or more nodes contained in the negative cache entry, wherein the context tag of the first task group is used to identify the negative cache entry, recording in the negative cache entry zero or more additional nodes of the list of candidate nodes within newly scanned leaf buckets that have less than the one or more requested resource values, assigning the next node to the next task in the resource schedule, reducing the one or more resource values of the next node by the one or more requested resource values, and repositioning the next node on the coordinate space according to the reduced one or more resource values of the next node.

15. The method of claim 9, wherein a root bucket encompassing all dimensions of the coordinate space is further defined in the coordinate space.

16. The method of claim 9, wherein:

the coordinate space also defines a plurality of child buckets, each child bucket being defined by a coordinate vector including a first coordinate for a first one of the one or more dimensions of the coordinate space, each leaf bucket being associated to one of the child buckets, a first coordinate of the leaf bucket being equal to the first coordinate of the child bucket to which it is associated; and scanning at least one of the plurality of leaf buckets in the first direction in the coordinate space comprises scanning the leaf buckets associated to a first child bucket before scanning the leaf buckets associated to a next child bucket.

17. A resource manager, comprising:

a memory device adapted to store:

a coordinate space defining a plurality of leaf buckets, each leaf bucket having one or more coordinates in one or more dimensions in the coordinate space, a mapping of a plurality of nodes on the leaf buckets, each node having an identity, each node also having one or more resource values corresponding to the one or more coordinates of the leaf bucket on which the node is mapped, and one or more positive cache entries;

an input/output device adapted to receive a request for a first task, the first task specifying one or more requested resource values corresponding to the one or more dimensions on the coordinate space, the first task also specifying a list of candidate nodes;

a processor operatively connected to the memory and to the input/output device, the processor being configured to:

receive the request for the first task from the input/output device, scan, in the memory device, at least one of the plurality of leaf buckets in the coordinate space to select a first node among the list of candidate nodes in which each of the one or more resource values is at least equal to the one or more requested resource values, the at least one of the plurality of leaf buckets being scanned in a first direction in the coordinate space;
record, in a positive cache entry of the memory device, the leaf bucket containing the first node,
assign the first node to the first task in a resource schedule,
reduce, in the memory device, the one or more resource values of the first node by the one or more requested resource values,
reposition, in the memory device, the first node among the plurality of leaf buckets according to the reduced one or more resource values of the first node, and
cause the input/output device to transmit the assignment of the first node to the first task.

18. The resource manager of claim 17, wherein the processor is further configured to scan the at least one of the plurality of leaf buckets to select the first node among the list of candidate nodes by:
executing an outer loop scan of the leaf buckets to select a fittable bucket; and
executing an inner loop scan of the fittable bucket to select the first node.

19. A resource manager, comprising:
a memory device adapted to store:
a coordinate space defining a plurality of leaf buckets, each leaf bucket having one or more coordinates in one or more dimensions in the coordinate space, the coordinate space also defining a plurality of child buckets, each child bucket being defined by a coordinate vector including a first coordinate for a first one of the one or more dimensions of the coordinate space, each leaf bucket being associated to one of the child buckets, a first coordinate of the leaf bucket being equal to the first coordinate of the child bucket to which it is associated,
a mapping of a plurality of nodes on the leaf buckets, each node having an identity, each node also having one or more resource values corresponding to the one or more coordinates of the leaf bucket on which the node is mapped, and
one or more negative cache entries;
an input/output device adapted to receive a request for a first task, the first task specifying one or more requested resource values corresponding to the one or more dimensions on the coordinate space, the first task also specifying a list of candidate nodes;
a processor operatively connected to the memory and to the input/output device, the processor being configured to:
receive the request for the first task from the input/output device,
scan, in the memory device, at least one of the plurality of leaf buckets in the coordinate space to select a first node among the list of candidate nodes in which each of the one or more resource values is at least equal to the one or more requested resource values, the at least one of plurality of leaf buckets being scanned in a first direction in the coordinate space,
record, in a negative cache entry of the memory device, zero or more nodes of the list of candidate nodes within scanned leaf buckets that have less than the one or more requested resource values,
assign the first node to the first task in a resource schedule,
reduce, in the memory device, the one or more resource values of the first node by the one or more requested resource values,
reposition, in the memory device, the first node among the plurality of leaf buckets according to the reduced one or more resource values of the first node, and
cause the input/output device to transmit the assignment of the first node to the first task.

* * * * *